(12) United States Patent
Caspall

(10) Patent No.: US 11,796,661 B2
(45) Date of Patent: Oct. 24, 2023

(54) ORIENTATION DEVICE FOR MARINE SONAR SYSTEMS

(71) Applicant: Navico, Inc., Tulsa, OK (US)

(72) Inventor: Jayme Caspall, Tulsa, OK (US)

(73) Assignee: NAVICO, INC., Tulsa, OK (US)

( * ) Notice: Subject to any disclaimer, the term of this patent is extended or adjusted under 35 U.S.C. 154(b) by 0 days.

(21) Appl. No.: 17/731,383

(22) Filed: Apr. 28, 2022

(65) Prior Publication Data

US 2022/0373663 A1 Nov. 24, 2022

Related U.S. Application Data

(63) Continuation-in-part of application No. 17/405,067, filed on Aug. 18, 2021, which is a
(Continued)

(51) Int. Cl.
*G01S 7/521* (2006.01)
*B63B 45/08* (2006.01)
*B63B 34/00* (2020.01)

(52) U.S. Cl.
CPC .............. *G01S 7/521* (2013.01); *B63B 45/08* (2013.01); *B63B 34/05* (2020.02); *B63B 2201/18* (2013.01)

(58) Field of Classification Search
CPC ......... G01S 7/521; B63B 45/08; B63B 34/05; B63B 2201/18
See application file for complete search history.

(56) References Cited

U.S. PATENT DOCUMENTS

| | | |
|---|---|---|
| 2,877,733 A | 3/1959 | Harris |
| 3,598,947 A | 8/1971 | Osborn |

(Continued)

FOREIGN PATENT DOCUMENTS

| | | |
|---|---|---|
| CA | 2887031 A1 | 10/2015 |
| CA | 2984303 C | 8/2022 |

(Continued)

OTHER PUBLICATIONS

"Minn Kota RIPTIDE ST Foot Pedal Accessory User Manual;" retrieved Dec. 7, 2017 from file:///C:/Users/PForbes/Downloads/2377123rc_RT_ST_Foot_Pedal_Manual.pdf.; 4 pages.
(Continued)

*Primary Examiner* — Isam A Alsomiri
*Assistant Examiner* — Abdallah Abulaban
(74) *Attorney, Agent, or Firm* — Nelson Mullins Riley & Scarborough LLP

(57) ABSTRACT

A sonar system for a watercraft, including a shaft defining a top and a bottom end. The system includes a first attachment operatively connected to the top end of the shaft, and a second attachment operatively connected to the bottom end of the shaft including a transducer assembly. The first attachment defines a first member pivotably connected to the top end of the shaft, and a handle member rotatably attached about the first member. The second attachment defines a second member pivotably connected to the bottom end of the shaft, and a bracket member rotatably attached about the second member. The system comprises a first connector extending between the first and second members and configured to cause reciprocal movement between the first and second members. The system comprises a second connector extending between the first and second members and configured to cause reciprocal rotation between the first and second members.

18 Claims, 40 Drawing Sheets

Related U.S. Application Data continuation-in-part of application No. 17/326,409, filed on May 21, 2021.

(56) References Cited

U.S. PATENT DOCUMENTS

| | | |
|---|---|---|
| 3,807,345 A | 4/1974 | Peterson |
| 5,293,351 A | 3/1994 | Noponen |
| 5,420,828 A | 5/1995 | Geiger |
| 5,892,338 A | 4/1999 | Moore et al. |
| 6,054,831 A | 4/2000 | Moore et al. |
| 6,181,644 B1 | 1/2001 | Gallagher |
| 6,325,684 B1 | 12/2001 | Knight |
| 6,447,347 B1 | 9/2002 | Steinhauser |
| 6,504,794 B2 | 1/2003 | Haase et al. |
| 6,507,164 B1 | 1/2003 | Healey et al. |
| 6,524,144 B2 | 2/2003 | Pasley |
| 6,661,742 B2 | 12/2003 | Hansen |
| 6,678,589 B2 | 1/2004 | Robertson et al. |
| 6,868,360 B1 | 3/2005 | Olstad et al. |
| 6,870,794 B2 | 3/2005 | Healey |
| 6,899,574 B1 | 5/2005 | Kalis et al. |
| 6,902,446 B1 | 6/2005 | Healey |
| 6,909,946 B1 | 6/2005 | Kabel et al. |
| 6,919,704 B1 | 7/2005 | Healey |
| 7,004,804 B2 | 2/2006 | Bernloehr et al. |
| 7,190,636 B1 | 3/2007 | Depaola |
| 7,195,526 B2 | 3/2007 | Bernloehr et al. |
| 7,268,703 B1 | 9/2007 | Kabel et al. |
| 7,303,595 B1 | 12/2007 | Janitz |
| 7,371,218 B2 | 5/2008 | Walston et al. |
| 7,430,461 B1 | 9/2008 | Michaels |
| 7,452,251 B2 | 11/2008 | Boebel |
| 7,538,511 B2 | 5/2009 | Samek |
| D594,034 S | 6/2009 | Bernloehr et al. |
| 7,542,376 B1 | 6/2009 | Thompson et al. |
| 7,633,431 B1 | 12/2009 | Wey |
| 7,722,417 B2 | 5/2010 | Bernloehr et al. |
| 7,889,600 B2 | 2/2011 | Thompson et al. |
| 8,106,617 B1 | 1/2012 | Holley |
| 8,195,084 B2 | 6/2012 | Xiao |
| 8,221,175 B2 | 7/2012 | Mynster |
| 8,305,844 B2 | 11/2012 | DePasqua |
| 8,645,012 B2 | 2/2014 | Salmon et al. |
| 8,761,976 B2 | 6/2014 | Salmon et al. |
| 8,814,129 B2 | 8/2014 | Todd et al. |
| 8,879,359 B2 | 11/2014 | DePasqua |
| 8,888,065 B2 | 11/2014 | Logan |
| 8,896,480 B1 | 11/2014 | Wilson et al. |
| 8,991,280 B2 | 3/2015 | Wireman |
| 9,127,707 B1 | 9/2015 | Huntley |
| 9,132,900 B2 | 9/2015 | Salmon et al. |
| 9,135,731 B2 | 9/2015 | Lauenstein et al. |
| 9,160,210 B2 | 10/2015 | Perry |
| 9,162,743 B1 | 10/2015 | Grace et al. |
| 9,201,142 B2 | 12/2015 | Antao |
| 9,278,745 B2 | 3/2016 | Kooi, Jr. et al. |
| 9,290,256 B1 | 3/2016 | Wireman et al. |
| 9,296,455 B2 | 3/2016 | Bernloehr et al. |
| 9,322,915 B2 | 4/2016 | Betts et al. |
| 9,354,311 B2 | 5/2016 | Chen et al. |
| 9,394,040 B2 | 7/2016 | Grace et al. |
| 9,459,350 B2 | 10/2016 | Betts et al. |
| 9,505,477 B2 | 11/2016 | Grace et al. |
| 9,507,562 B2 | 11/2016 | Bailey |
| 9,594,375 B2 | 3/2017 | Jopling |
| 9,596,839 B2 | 3/2017 | Bailey |
| 9,676,462 B2 | 6/2017 | Bernloehr et al. |
| 9,746,874 B2 | 8/2017 | Johnson et al. |
| 9,758,222 B2 | 9/2017 | Grace et al. |
| 9,784,825 B2 | 10/2017 | Brown et al. |
| 9,812,118 B2 | 11/2017 | Matson et al. |
| 9,836,129 B2 | 12/2017 | Clark |
| 9,947,309 B2 | 4/2018 | Stokes et al. |
| 10,012,731 B2 | 7/2018 | Pelin et al. |
| 10,025,312 B2 | 7/2018 | Langford-Wood |
| 10,061,025 B2 | 8/2018 | Kirmani |
| 10,107,908 B2 | 10/2018 | Betts et al. |
| 10,114,119 B2 | 10/2018 | Horner et al. |
| 10,114,470 B2 | 10/2018 | Clark |
| 10,203,403 B2 | 2/2019 | Fabrizio et al. |
| 10,241,200 B2 | 3/2019 | Sayer et al. |
| 10,247,823 B2 | 4/2019 | Brown et al. |
| 10,281,576 B2 | 5/2019 | Depasqua |
| 10,310,062 B2 | 6/2019 | Coleman et al. |
| 10,311,715 B2 | 6/2019 | Jopling |
| 10,324,175 B2 | 6/2019 | Laster |
| 10,325,582 B2 | 6/2019 | Antao et al. |
| 10,451,732 B2 | 10/2019 | Laster |
| 10,460,484 B2 | 10/2019 | Hovland et al. |
| 10,514,451 B2 | 12/2019 | Brown et al. |
| 10,545,226 B2 | 1/2020 | Wigh et al. |
| 10,545,235 B2 | 1/2020 | Pelin et al. |
| 10,684,368 B2 | 6/2020 | Pelin et al. |
| 10,723,428 B1 | 7/2020 | Vicari et al. |
| 10,890,660 B2 | 1/2021 | Wigh et al. |
| 11,059,556 B2 * | 7/2021 | Ahlgren ................ B63H 20/32 |
| 11,061,136 B2 | 7/2021 | Abbas et al. |
| 11,217,216 B2 | 1/2022 | Vance |
| 11,370,516 B2 | 6/2022 | Ridl |
| 11,525,907 B2 | 12/2022 | Wigh et al. |
| 11,536,820 B2 | 12/2022 | Wigh et al. |
| 2003/0191562 A1 | 10/2003 | Robertson et al. |
| 2003/0203684 A1 | 10/2003 | Healey |
| 2003/0214483 A1 | 11/2003 | Hammer et al. |
| 2003/0214880 A1 | 11/2003 | Rowe |
| 2005/0255761 A1 | 11/2005 | Bernloehr et al. |
| 2006/0116031 A1 | 6/2006 | Bernloehr et al. |
| 2009/0037040 A1 | 2/2009 | Salmon et al. |
| 2009/0227158 A1 | 9/2009 | Bernloehr et al. |
| 2012/0014220 A1 | 1/2012 | DePasqua |
| 2012/0015566 A1 | 1/2012 | Salmon |
| 2012/0060733 A1 | 3/2012 | Maki et al. |
| 2012/0204467 A1 | 8/2012 | Palmer et al. |
| 2012/0232719 A1 | 9/2012 | Salmon et al. |
| 2012/0299764 A1 | 11/2012 | Haneda et al. |
| 2013/0044569 A1 | 2/2013 | DePasqua |
| 2013/0215719 A1 | 8/2013 | Betts et al. |
| 2014/0203162 A1 | 7/2014 | Logan |
| 2014/0249698 A1 | 9/2014 | Salmon et al. |
| 2014/0269164 A1 | 9/2014 | Betts et al. |
| 2014/0277851 A1 | 9/2014 | Grace et al. |
| 2014/0336854 A1 | 11/2014 | Salmon et al. |
| 2015/0016130 A1 | 1/2015 | Davis et al. |
| 2015/0063059 A1 | 3/2015 | DePasqua |
| 2015/0063060 A1 | 3/2015 | DePasqua |
| 2015/0151824 A1 | 6/2015 | Wireman |
| 2015/0346729 A1 | 12/2015 | Grace et al. |
| 2016/0016651 A1 | 1/2016 | Anderson et al. |
| 2016/0253150 A1 | 9/2016 | Williams et al. |
| 2017/0038460 A1 | 2/2017 | Clark |
| 2017/0285167 A1 | 10/2017 | Proctor et al. |
| 2017/0371039 A1 | 12/2017 | Clark et al. |
| 2018/0244361 A1 | 8/2018 | Laster |
| 2018/0288990 A1 | 10/2018 | Laster et al. |
| 2018/0329056 A1 | 11/2018 | Smith et al. |
| 2018/0365246 A1 | 12/2018 | Laster et al. |
| 2019/0064348 A1 * | 2/2019 | Clark ................ G01S 15/96 |
| 2019/0072951 A1 | 3/2019 | Clark et al. |
| 2019/0176952 A1 | 6/2019 | Clark et al. |
| 2019/0176953 A1 | 6/2019 | Clark et al. |
| 2019/0219692 A1 | 7/2019 | Depasqua |
| 2019/0265354 A1 | 8/2019 | Antao et al. |
| 2019/0331779 A1 | 10/2019 | Sandretto |
| 2020/0070943 A1 | 3/2020 | Clark et al. |
| 2020/0072953 A1 | 3/2020 | Wigh et al. |
| 2020/0103512 A1 | 4/2020 | Brown et al. |
| 2020/0256967 A1 | 8/2020 | Wigh et al. |
| 2020/0271782 A1 | 8/2020 | Rolt et al. |
| 2020/0401143 A1 | 12/2020 | Johnson et al. |
| 2021/0056944 A1 * | 2/2021 | Vance ................ G10K 11/355 |
| 2021/0141086 A1 | 5/2021 | Sloss et al. |
| 2021/0255627 A1 | 8/2021 | Snyder et al. |
| 2021/0278514 A1 | 9/2021 | Hughes |
| 2022/0018958 A1 | 1/2022 | Wagner |

(56) References Cited

U.S. PATENT DOCUMENTS

| | | |
|---|---|---|
| 2022/0108677 A1 | 4/2022 | Vance |
| 2022/0120882 A1 | 4/2022 | Coleman et al. |
| 2022/0381891 A1 | 12/2022 | Roland et al. |

FOREIGN PATENT DOCUMENTS

| | | |
|---|---|---|
| CN | 109 471 116 A | 3/2019 |
| EP | 2 602 639 A1 | 6/2013 |
| EP | 1 891 461 B1 | 5/2014 |
| EP | 3170021 A1 | 5/2017 |
| EP | 3315993 A1 | 5/2018 |
| EP | 3171200 B1 | 6/2021 |
| GB | 2 421 312 A | 6/2006 |
| KR | 2018096482 A | 8/2018 |
| WO | WO 95/28682 A1 | 10/1995 |
| WO | WO 2013/126761 A1 | 8/2013 |
| WO | WO 2014/144471 A1 | 9/2014 |
| WO | WO 2016/010619 A1 | 1/2016 |
| WO | WO 2019/129068 A1 | 7/2019 |
| WO | WO 2020/114107 A1 | 6/2020 |

OTHER PUBLICATIONS

"Bass Resource The Ultimate Bass Fishing Resource Guide: Bass Fishing Forums Trolling Motor Foot Pedal—Do You Mount to Deck?;" retrieved Dec. 8, 2017 from https://www.bassresource.com/bass-fishing-forums/topic/190825-trolling-motor-foot-pedal-do-you-mount-to-deck/.

Shepardson; "Google wins U.S. approval for new radar-based motion sensor;" Reuters; Jan. 1, 2019; retrieved Feb. 13, 2020 from https://www.reuters.com/article/us-google-sensor/google-wins-u-s-approval-for-radar-based-hand-motion-sensor-idUSKCN1OV1SH.

Feldler; "Teaching With NYT Virtual Reality Across Subjects;" The New York Times; Mar. 28, 2019; retrieved Feb. 13, 2020 from https://www.nytimes.com/2019/03/28/learning/lesson-plans/teaching-with-nyt-virtual-reality-across-subjects.html.

Smolan et al; "The Click Effect;" New York Times VR; retrieved Feb. 13, 2020 from https://www.with.in/watch/CnVHWFg.

Porathe; "3-D Nautical Charts and Safe Navigation;" Department of Innovation, Design and Product Development; Doctoral Dissertation No. 27, Mälardalen University; Jan. 1, 2006; pp. 1-307 (XP055119720).

U.S. Appl. No. 16/791,335 entitled "Systems and Methods for Controlling Operations of Marine Vessels;" filed Feb. 14, 2020 in the name of Kristopher C. Snyder et al.

U.S. Appl. No. 17/326,409 entitled "Sonar Steering Systems and Associated Methods;" filed May 21, 2021 in the name of Christopher D. Crawford et al.

"LiveSweep (Wired or Wireless Pedal) Mounting Hardware Included;" *Cornfield Crappie Gear;* retrieved Jul. 19, 2021 from https://www.cornfieldcrappiegear.com/product-page/livesweep-wired-pedal-mounting-hardware-included.

"Google Glass;" *Wikipedia;* retrieved Apr. 18, 2013 from http://en.wikipedia.org/wiki/Google_Glass.

"Navico set to GoFree"; May 1, 2012; retrieved Apr. 18, 2013 from http://www.marinebusiness.com.au/archive/navico-set-to-gofree.

Jun. 16, 2014 Search Report and Written Opinion issued in International Patent Application No. PCT/US2014/021133.

"Motor Guide Xi5 Wireless Foot Pedal;" retrieved Dec. 7, 2017 from http://www.motorguide.com/store/accessory/xi5-wireless-foot-pedal0.

"Magic Leap Quick Start Guide;" 2018; retrieved Feb. 13, 2020 from https://assets.ctfassets.net/b173eiperqoo/4H4PJgU9C0GySyie4QeuWE/c7ef230a10147e86173dd9250ce5b064/180606_QSG_277x190mm_PANTONE_v1.pdf.

*Cornfield Crappie Gear;* retrieved Jul. 19, 2021 from https://www.cornfieldcrappiegear.com/.

"The LiveScanner with True Scan Technology;" retrieved Mar. 24, 2022 from https://www.thelivescanner.com/.

Sealock; "Rite-Hite Turret Livescope Mount Review;" Dec. 17, 2020; retrieved Mar. 24, 2022 from https://www.wired2fish.com/electronics/rite-hite-turret-livescope-mount-review/.

*LSMount;* retrieved Mar. 24, 2022 from https://lsmounts.com.

* cited by examiner

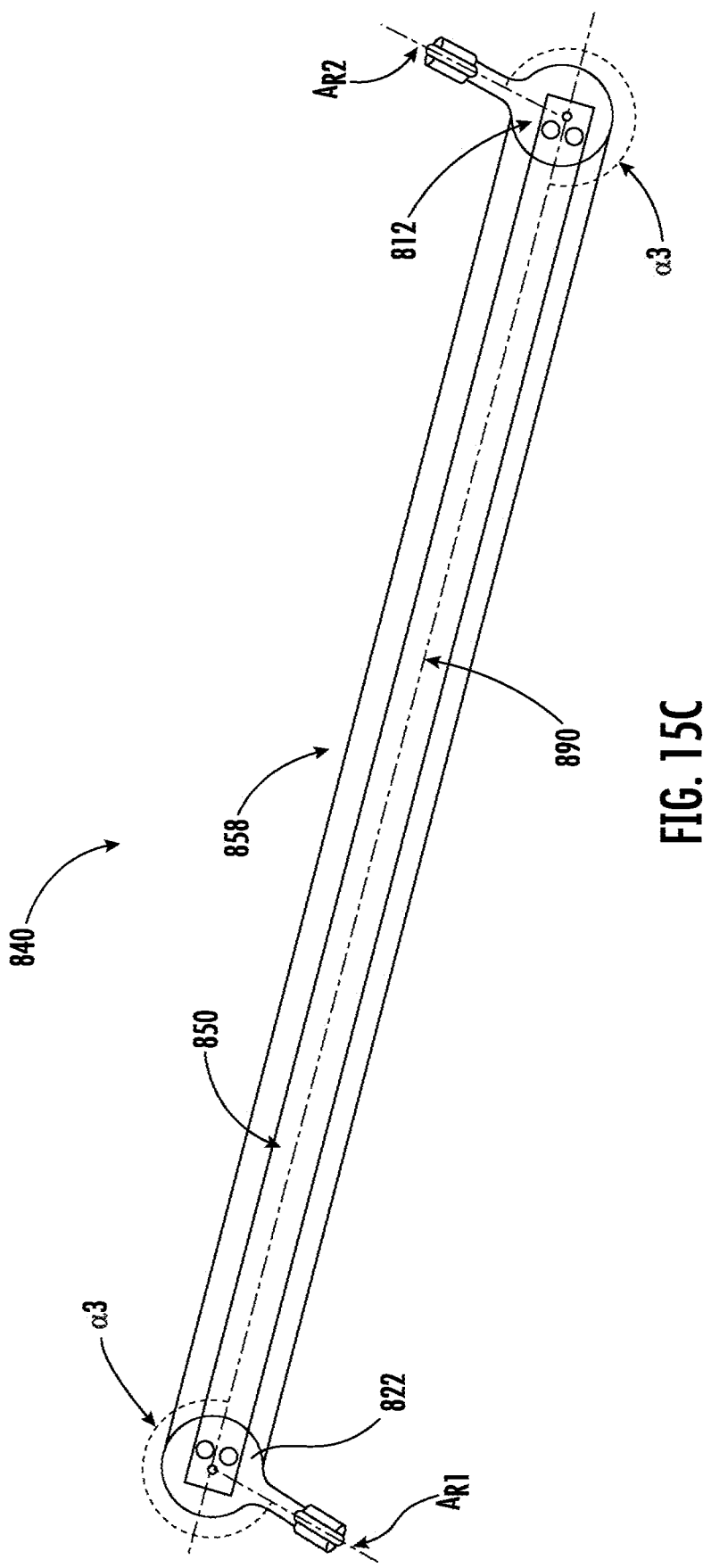

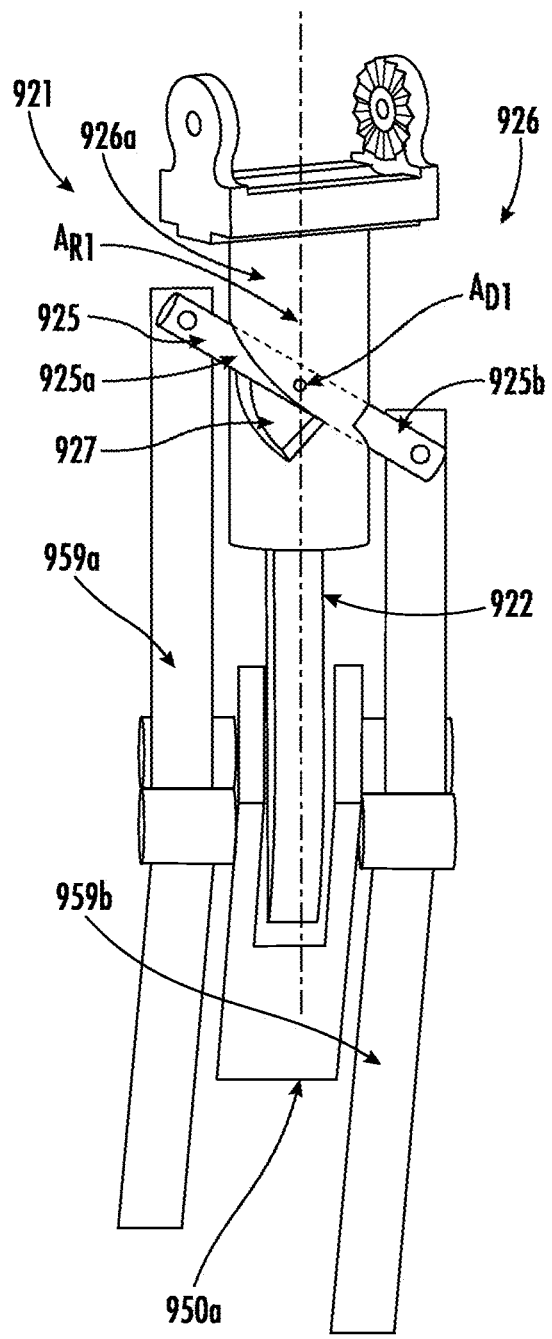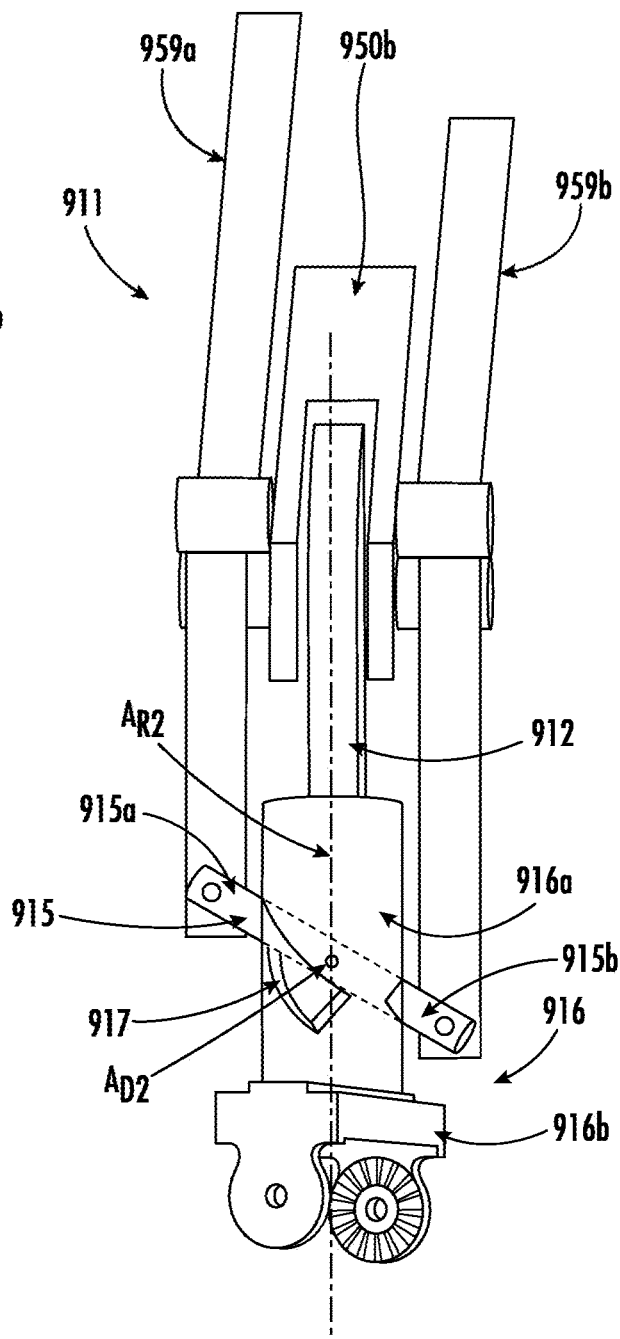
FIG. 16A
FIG. 16B

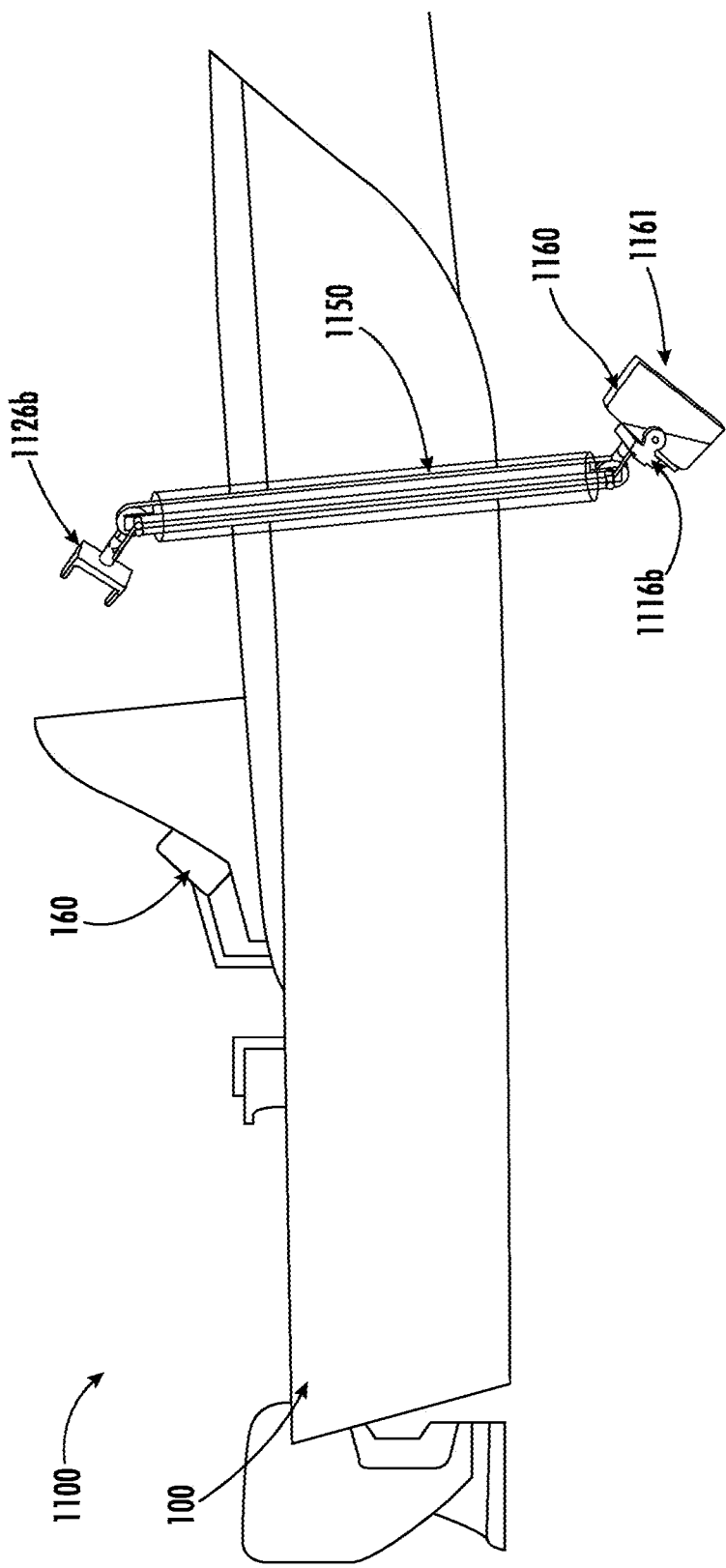

ORIENTATION DEVICE FOR MARINE SONAR SYSTEMS

CROSS-REFERENCE TO RELATED APPLICATION(S)

This application claims priority to and is a continuation-in-part of U.S. Non-provisional application Ser. No. 17/405,067, entitled "Sonar Tilt Angle Control Steering Device", filed Aug. 18, 2021, which is a continuation-in-part of U.S. Non-provisional application Ser. No. 17/326,409, entitled "Sonar Steering Systems and Associated Methods", filed May 21, 2021, each of which is hereby incorporated by reference in its entirety.

FIELD OF THE INVENTION

Embodiments of the present invention relate generally to marine sonar systems and, more particularly, to controlling orientation of marine sonar systems.

BACKGROUND OF THE INVENTION

Sonar (SOund Navigation and Ranging) systems are often used during fishing or other marine activities. Sonar transducer elements convert electrical energy into sound or vibrations. Sonar signals are transmitted into and through the water and reflected from encountered objects (e.g., fish, bottom surface, underwater structure, etc.). The transducer elements receive the reflected sound as sonar returns and convert the sound energy into electrical energy (e.g., sonar return data). Based on the known speed of sound, it is possible to determine the distance to and/or location of the waterborne or underwater objects. The sonar return data can also be processed to be displayed on a display device, giving the user a "picture" (or image) of the underwater environment.

Sonar systems are used to detect waterborne or underwater objects. For example, sonar devices may be used to determine depth and bottom topography, detect fish, locate wreckage, etc. In this regard, due to the extreme limits to visibility underwater, sonar is typically the most accessible and accurate way to locate objects underwater and provide an understanding of the underwater environment. That said, further innovation with respect to the operation of sonar systems, particularly in the area of simplifying the ease of use, is desirable. In particular, there is a need for sonar systems with improved functionality regarding adjustment of the direction of transmission of the sonar system to allow a user to obtain the desired direction of transmission.

BRIEF SUMMARY OF THE INVENTION

According to various example embodiments, a sonar system is provided for simplified operations by a user. Sonar systems are able to transmit and receive sonar signals to produce an image of an underwater environment. Sonar systems are limited by the number of transducers in a transducer assembly, the orientation of the transducers within the transducer assembly, and the ability to maneuver and rotate the transducer assembly. A single linear sonar transducer is able to produce a single slice of the underwater environment, while a plurality of linear transducers aligned in an array are capable of producing a plurality of slices that may be compiled into a single image. When a plurality of sonar transducers are utilized along with frequency steering, for example, and are aimed in differing directions, a "live" sonar image is produced. A "live" sonar image produces an image of the underwater environment corresponding to the sonar signals being emitted and returned, however, rather than compiling historical slices to form an image, as with a single transducer. In this regard, the plurality of slices are compiled into an image, which all update with subsequent pings, thus, producing a "live" image.

Example embodiments of the present invention provide an orientation device for a transducer assembly. The orientation device provides a mechanism to maneuver the transducer assembly, such as between commonly used transducer orientations, including down mode, forward mode, and scout mode, although any orientation may be obtained.

Example embodiments of the present invention provide an orientation device for a transducer assembly. In example embodiments, the orientation device is able to rotate 360 degrees about a shaft, and pivot up to 180 degrees or more under the watercraft with respect to the surface of the water.

Example embodiments of the orientation device provide for reciprocal movements between a first attachment (e.g., a handle) and a second attachment (e.g., a mounted transducer) connected at opposite ends of a shaft to transition the transducer assembly to a desired orientation—thereby allowing a user to perform intuitive orientation changes at the handle that result in corresponding orientation changes of the transducer.

In an example embodiment, a sonar system for a watercraft is provided. The system comprises a shaft defining top end and a bottom end defining a shaft axis extending between the top end and the bottom end. The system further comprises a first member extending along a first rotation axis. The first member is pivotably connected at the top end of the shaft and pivotable about a first axis which is perpendicular to the shaft axis. The system further comprises a handle member defining a handle member body extending along the first rotation axis and defining a first guide path. The first handle member further comprises a first arm attached to the first member and extending through the first guide path. The first arm is pivotable about a first dowel axis, which is perpendicular to the first rotation axis. The rotation of the handle member about the first rotation axis causes pivoting of the first arm about the first dowel axis due to interaction between the first guide path and the first arm.

The system further comprises a second member, extending along a second rotation axis, pivotably connected at the bottom end of the shaft and pivotable about a second axis parallel to the first axis. The system further comprises a bracket member defining a mounting portion and a bracket member body. The bracket member body extends along the second rotation axis and defines a second guide path. The system further comprises a second arm attached to the second member which extends through the second guide path. The second arm is pivotable about a second dowel axis which is perpendicular to the second rotation axis. As the second arm pivots about the second dowel axis, the second arm travels along the second guide path to cause the bracket member to rotate about the second rotation axis.

The system further comprises a first connector secured between the first member and the second member. The first connector rotationally connects the first member to the second member such that rotation of the handle member and the first member about the first axis causes corresponding rotation of the second member and the bracket member about the second axis.

The system further comprises a second connector secured between the first arm and the second arm. The second connector connects movement of the first arm to movement of the second arm such that pivoting of the first arm about the first dowel axis causes corresponding pivoting of the second arm about the second dowel axis such that the bracket member rotates about the second rotation axis.

The system further comprises a transducer assembly secured to the mounting portion of the bracket member. Rotation of the handle member about the first axis causes corresponding rotation of the transducer assembly about the second axis. Rotation of the handle member about the first rotation axis causes corresponding rotation of the transducer assembly about the second rotation axis.

In some embodiments, the first guide path may comprise a first path and a second path. The first path and the second path may be symmetrical about the first rotation axis. The second guide path may comprise a third path and a fourth path. The third path and the fourth path may be symmetrical about the second rotation axis.

In some embodiments, the first path and the second path may extend diagonally along the handle member body, and the third path and the fourth path may extend diagonally along the bracket member body.

In some embodiments, the second connector may comprise a first flexible link extending between a first side of the first arm and a first side of the second arm, and a second flexible link extending between a second side of the first arm and a second side of the second arm.

In some embodiments, the system may further comprise a rod having a top end and a bottom end. The rod may be disposed within the shaft, the top end of the rod being operatively connected to the first member, and the bottom end of the rod being operatively connected to the second member.

In some embodiments, the first connector is a flexible connector defining a first opening and a second opening. The first opening may be configured to receive the first member, and the second opening may be configured to receive the second member.

In some embodiments, the system may further comprise a marine electronics device associated with the watercraft. The marine electronics device may be in data communication with the transducer assembly. In some embodiments, the marine electronics may comprise a display, a processor, and a computer program code. The computer program code, when executed, causes the processor to receive sonar return data from the transducer assembly, and generate a sonar image of an underwater environment relative to the watercraft using the sonar return data.

In some embodiments, the computer program code is further configured to, when executed, cause the processor to present, on the display, indication of rotation instructions. The rotation instructions may indicate rotation of the handle member so as to steer the transducer assembly.

In some embodiments, the system may further comprise a motor in data communication with the marine electronics device. The motor may be connected to the handle member and configured to rotate the handle member so as to steer the transducer assembly.

In some embodiments, the computer program code may be further configured to, when executed, cause the processor to store a plurality of preset modes corresponding to orientations of the transducer assembly, receive a selection mode of one of the preset modes of the transducer assembly, cause the motor to steer the transducer assembly to an orientation according to the selection mode.

In some embodiments, the plurality of preset modes may include scout mode, forward mode, and down mode. In some embodiments, the computer program code may be further configured to, when executed, cause the processor to receive selection of an indication of an object within a sonar image, track the object as additional sonar data is captured by the transducer assembly, and cause rotation of the handle member, via the motor, to rotate the transducer assembly so as to follow the object within an updated sonar image.

In another embodiment a sonar system for a watercraft is provided. The sonar system comprises a shaft defining top end and a bottom end defining a shaft axis extending between the top end and the bottom end. The system further comprises a first member, extending along a first rotation axis. The first member is pivotably connected at the top end of the shaft and pivotable about a first axis, which is perpendicular to the shaft axis. The system further comprises a handle member defining a handle member body extending along the first rotation axis. The handle member defines a first guide path. A first arm is attached to the first member and extends through the first guide path. The first arm is pivotable about a first dowel axis, which is perpendicular to the first rotation axis. In some embodiments, the rotation of the handle member about the first rotation axis causes pivoting of the first arm about the first dowel axis due to interaction between the first guide path and the first arm.

The system further comprises a second member extending along a second rotation axis. The second member is pivotably connected at the bottom end of the shaft and pivotable about a second axis, which is parallel to the first axis. The system further comprises a bracket member defining a mounting portion and a bracket member body. The bracket member body extends along the second rotation axis. The bracket member body further defines a second guide path. A second arm is attached to the second member and extends through the second guide path. The second arm is pivotable about a second dowel axis, which is perpendicular to the second rotation axis. As the second arm pivots about the second dowel axis, the second arm travels along the second guide path to cause the bracket member to rotate about the second rotation axis.

The system further comprises a first connector secured between the first member and the second member. The first connector rotationally connects the first member to the second member such that rotation of the handle member and the first member about the first axis causes corresponding rotation of the second member and the bracket member about the second axis.

The system further comprises a second connector secured between the first arm and the second arm. The second connector connects movement of the first arm to movement of the second arm such that pivoting of the first arm about the first dowel axis causes corresponding pivoting of the second arm about the second dowel axis such that the bracket member rotates about the second rotation axis.

The system further comprises a transducer assembly secured to the mounting portion of the bracket member. Rotation of the handle member about the first axis causes corresponding rotation of the transducer assembly about the second axis, and rotation of the handle member about the first rotation axis causes corresponding rotation of the transducer assembly about the second rotation axis.

The system further comprises a motor configured to maneuver the handle member in response to an electrical signal. The system further comprises a user input assembly, configured to detect user activity related to controlling the direction of the handle member, a processor; and a memory having a computer program code stored thereon. The computer program code is configured to, when executed, cause the processor to determine a desired orientation of transducer assembly based on the user activity detected by the user input assembly, generate an electrical signal indicating a desired maneuver for the handle member, and direct the motor, via the electrical signal, to maneuver the handle member to the desired orientation of the transducer assembly.

In some embodiments, the first guide path may comprise a first path and a second path. The first path and the second path may be symmetrical about the first rotation axis. The second guide path may comprise a third path and a fourth. The third path and the fourth path may be symmetrical about the second rotation axis.

In some embodiments, the first path and the second path may extend diagonally along the handle member body and the third path and the fourth path may extend diagonally along the bracket member body.

In some embodiments, the second connector comprise a first flexible link extending between a first side of the first arm and a first side of the second arm, and a second flexible link extending between a second side of the first arm and a second side of the second arm.

In some embodiments, the system may further comprise a rod having a top end and a bottom end. The rod may be disposed within the shaft, the top end of the rod being operatively connected to the first member, and the bottom end of the rod being operatively connected to the second member.

In some embodiments, the first connector is a flexible connector defining a first opening and a second opening. The first opening may be configured to receive the first member, and the second opening may be configured to receive the second member.

In yet another embodiment an orientation device for a watercraft is provided. The orientation device comprises a shaft defining top end and a bottom end defining a shaft axis extending between the top end and the bottom end. The orientation device further comprises a first member extending along a first rotation axis. The first member is pivotably connected at the top end of the shaft and pivotable about a first axis which is perpendicular to the shaft axis. The orientation device further comprises a handle member defining a handle member body extending along the first rotation axis and defining a first guide path. A first arm is attached to the first member and extends through the first guide path. The first arm is pivotable about a first dowel axis, which is perpendicular to the first rotation axis. Rotation of the handle member about the first rotation axis causes the first arm to pivot about the first dowel axis due to interaction between the first guide path and the first arm.

The orientation device further comprises a second member extending along a second rotation axis, pivotably connected at the bottom end of the shaft. The second member is pivotable about a second axis, which is parallel to the first axis. The orientation device further comprises a bracket member defining a mounting portion and a bracket member body, which extends along the second rotation axis and defines a second guide path. A second arm is attached to the second member and extends through the second guide path. The second arm is pivotable about a second dowel axis, which is perpendicular to the second rotation axis. As the second arm pivots about the second dowel axis, the second arm travels along the second guide path to cause the bracket member to rotate about the second rotation axis.

The orientation device further comprises a first connector secured between the first member and the second member. The first connector rotationally connects the first member to the second member such that rotation of the handle member and the first member about the first axis causes corresponding rotation of the second member and the bracket member about the second axis.

The orientation device further comprises a second connector secured between the first arm and the second arm. The second connector connects movement of the first arm to movement of the second arm such that pivoting of the first arm about the first dowel axis causes corresponding pivoting of the second arm about the second dowel axis such that the bracket member rotates about the second rotation axis.

In some embodiments, the first guide path may comprise a first path and a second path. The first path and the second path may be symmetrical about the first rotation axis. The second guide path may comprise a third path and a fourth path. The third path and the fourth path may be symmetrical about the second rotation axis.

BRIEF DESCRIPTION OF THE DRAWINGS

Figure 1:
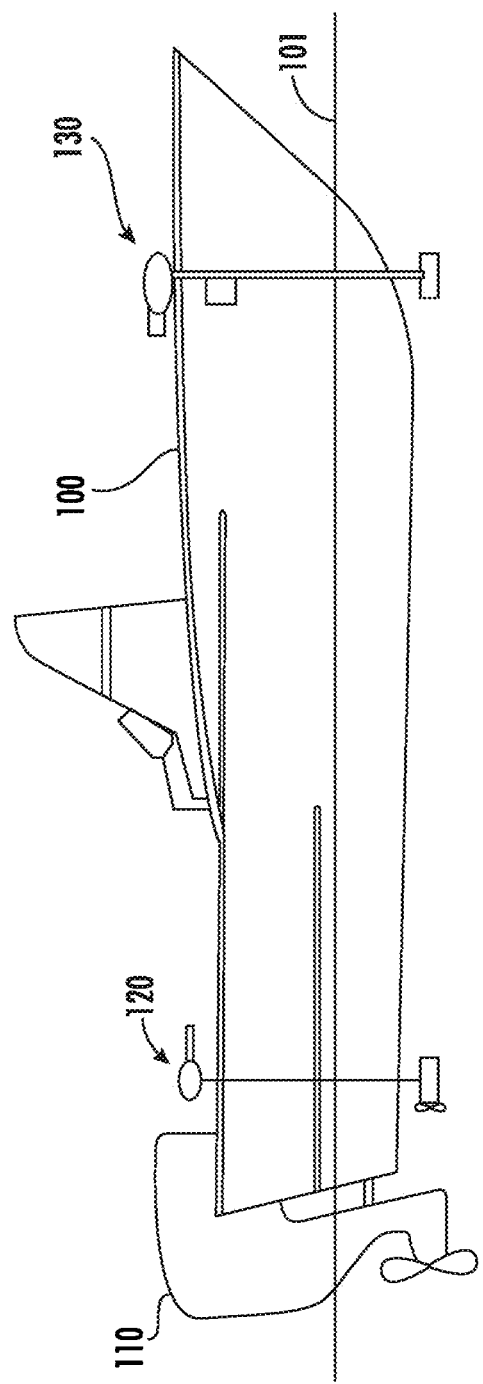
Figure 5:
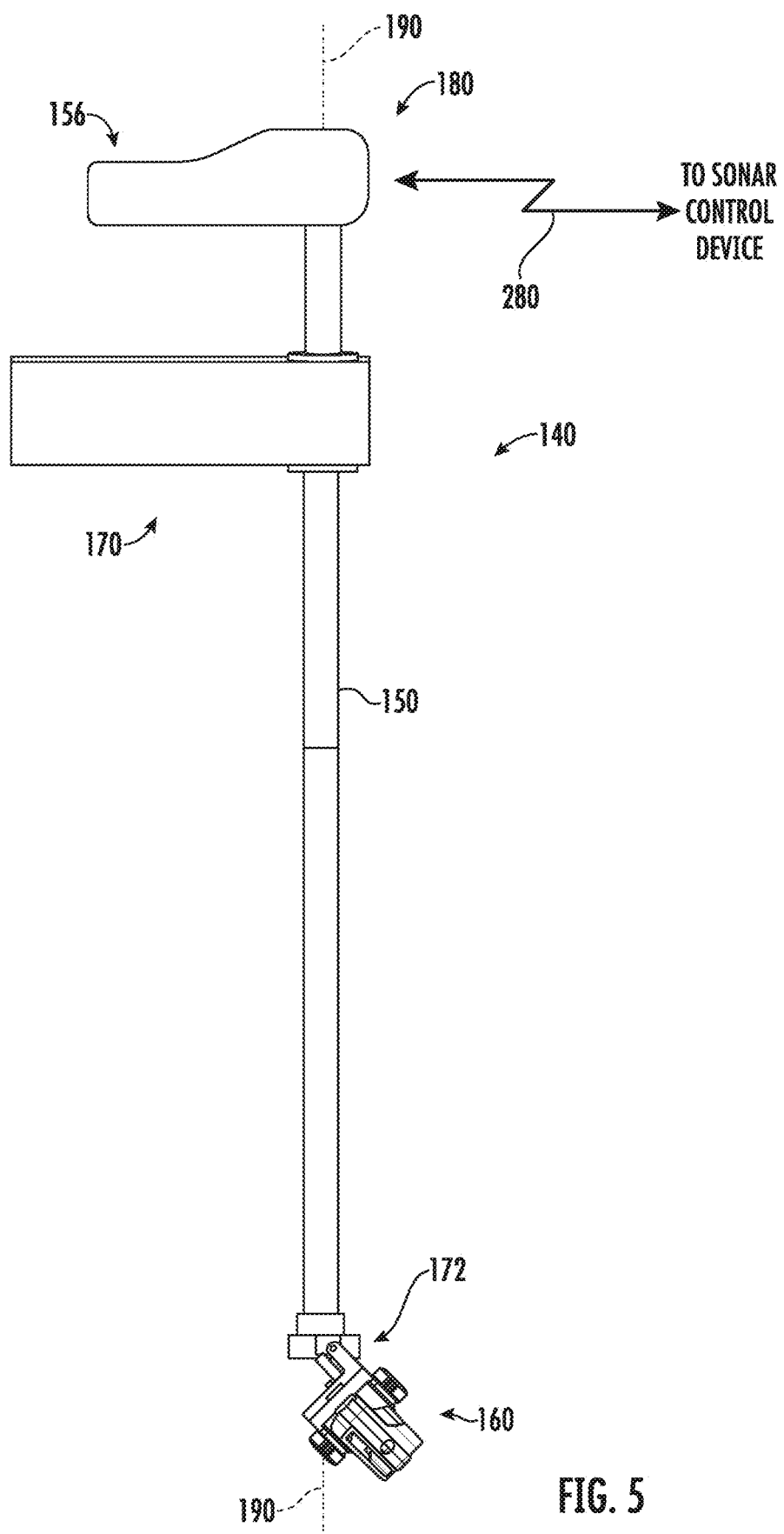
Figure 6:
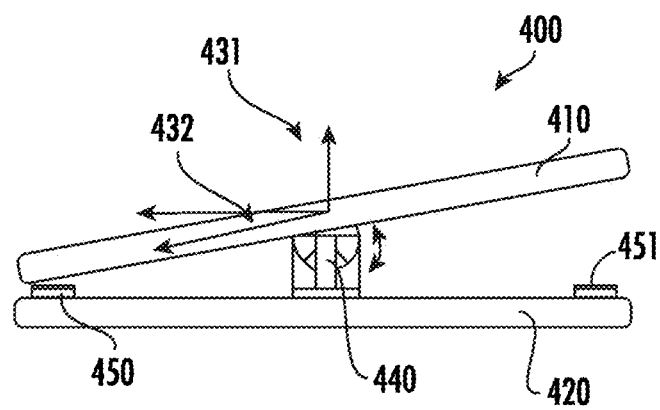
Figure 7A:
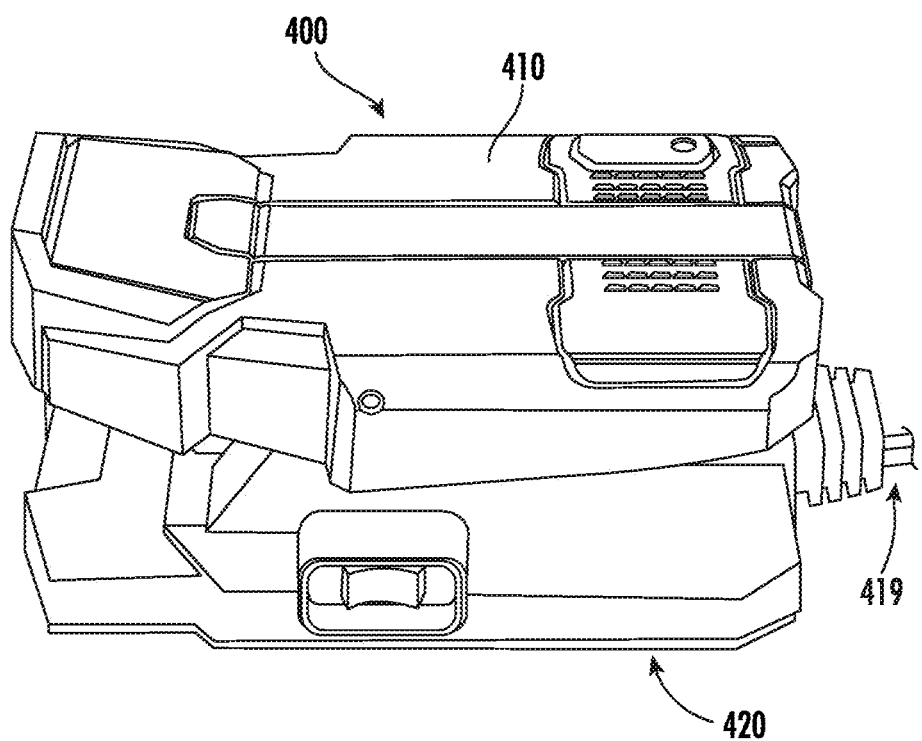
Figure 7B:
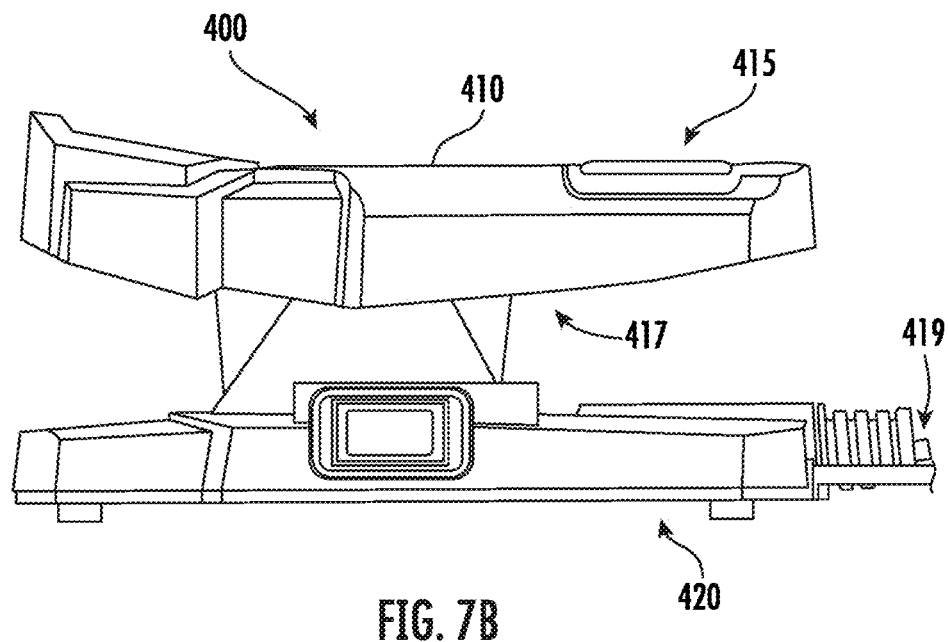
Figures 8A, 8B:
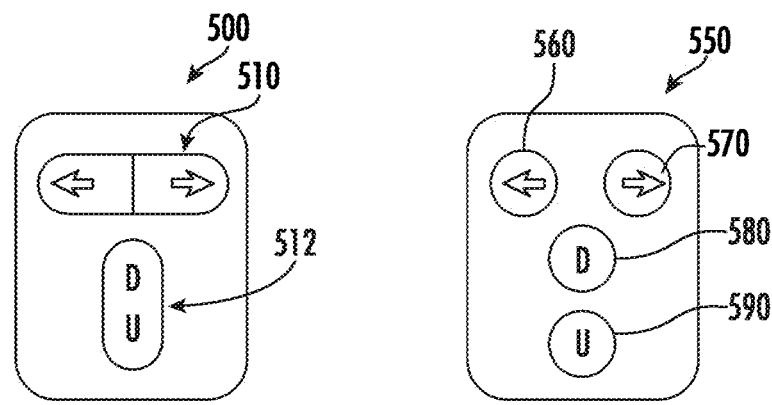
Figure 9A:
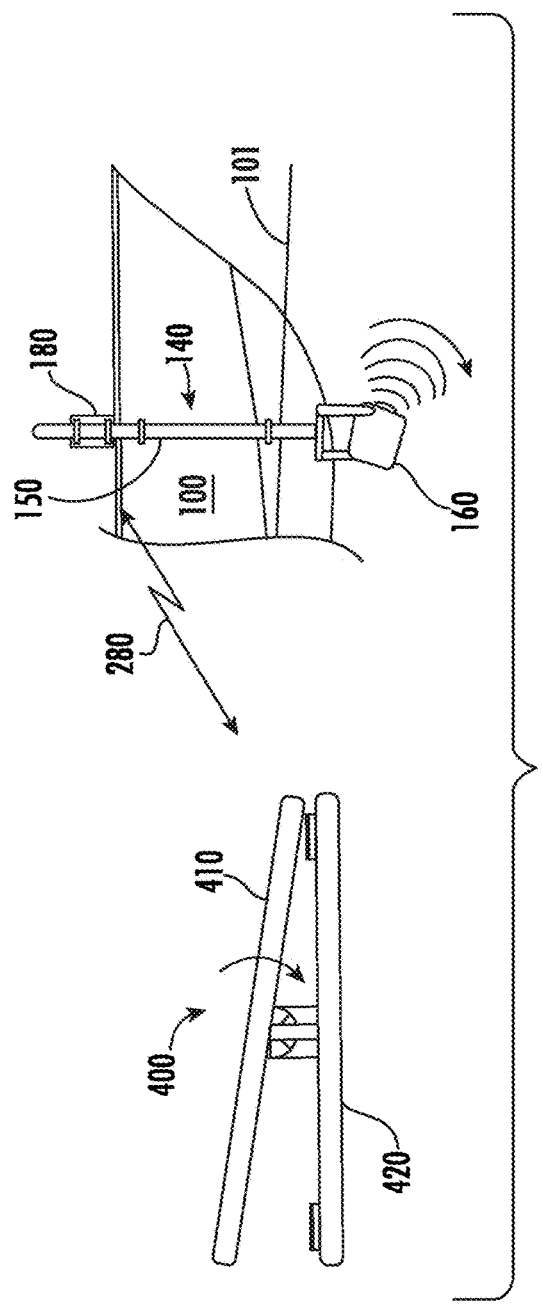
Figure 9B:
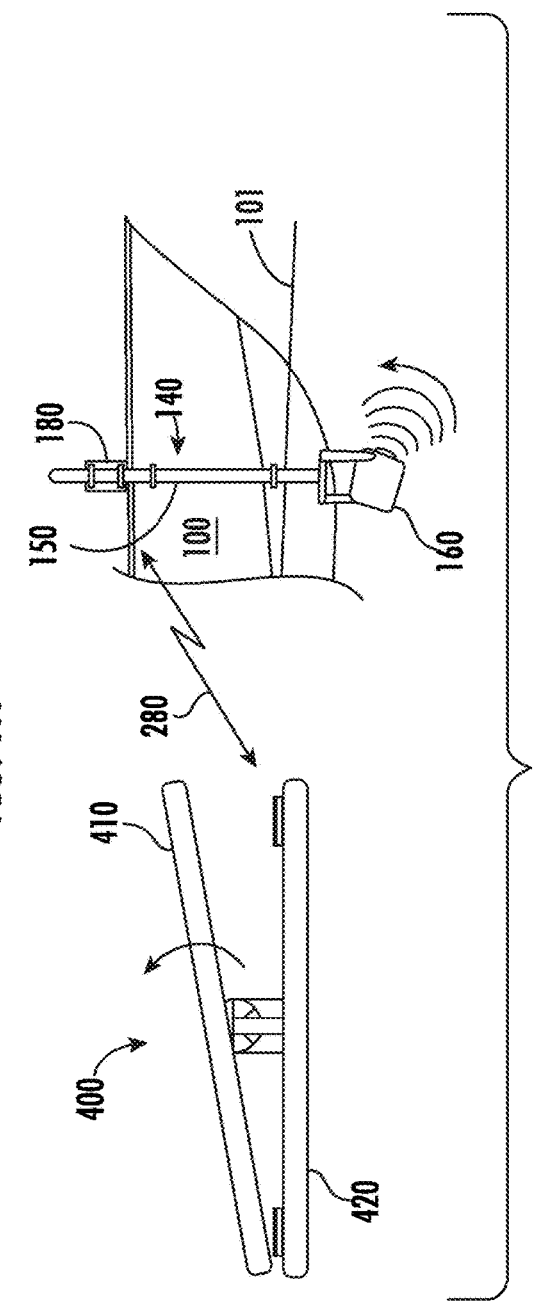
Figure 10A:
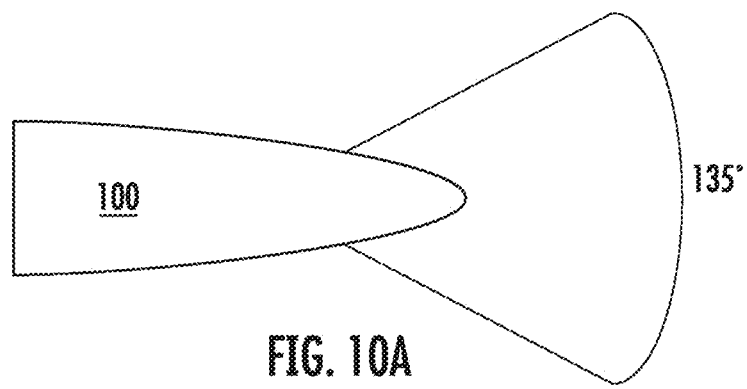
Figure 10B:
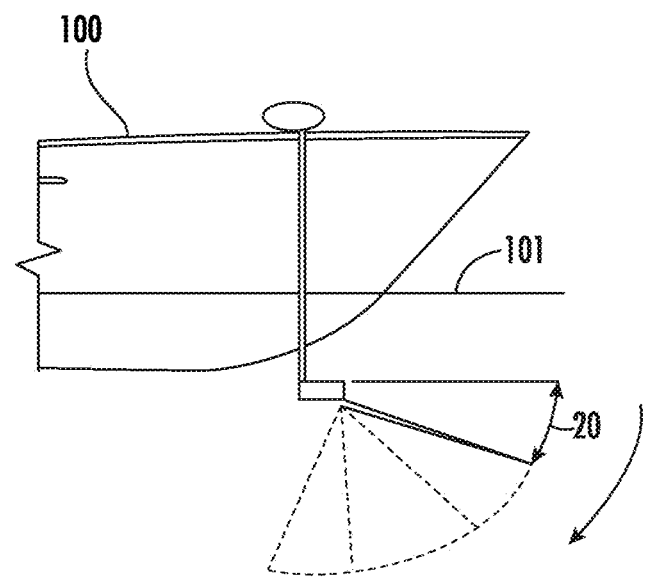
Figure 11A:
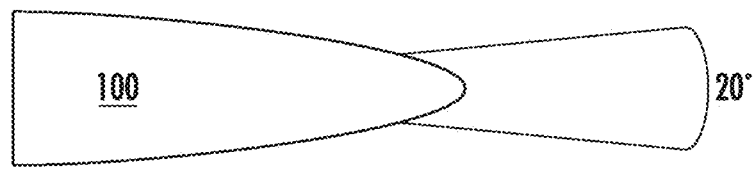
Figure 11B:
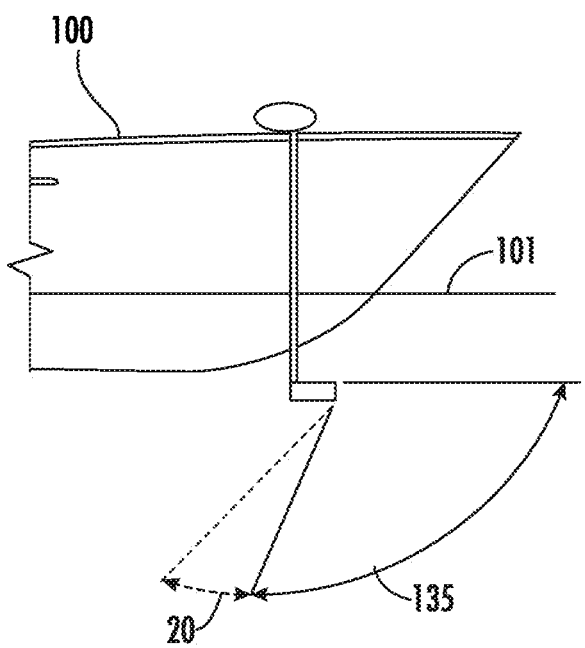
Figure 12:
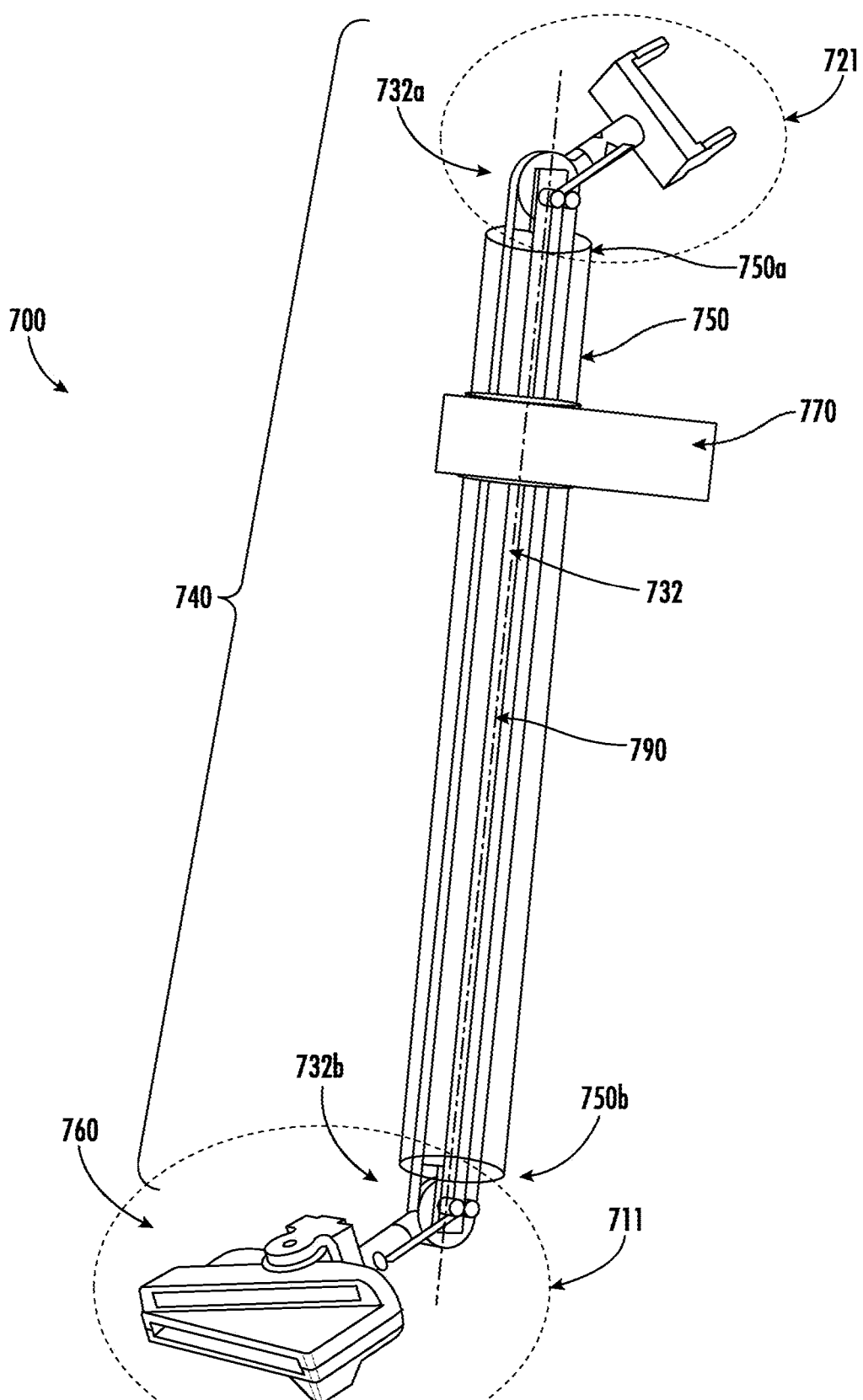
Figure 13A:
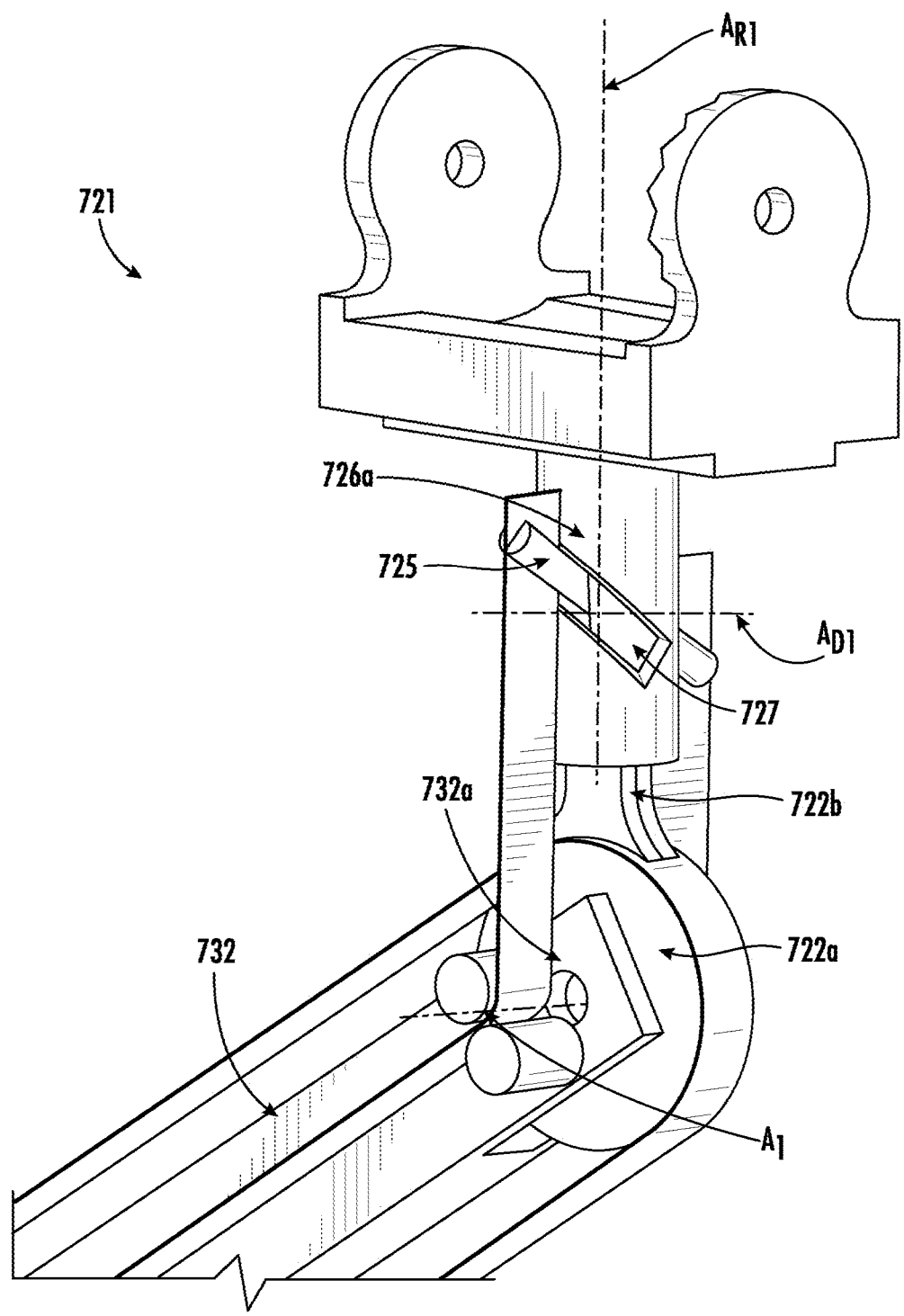
Figure 13B:
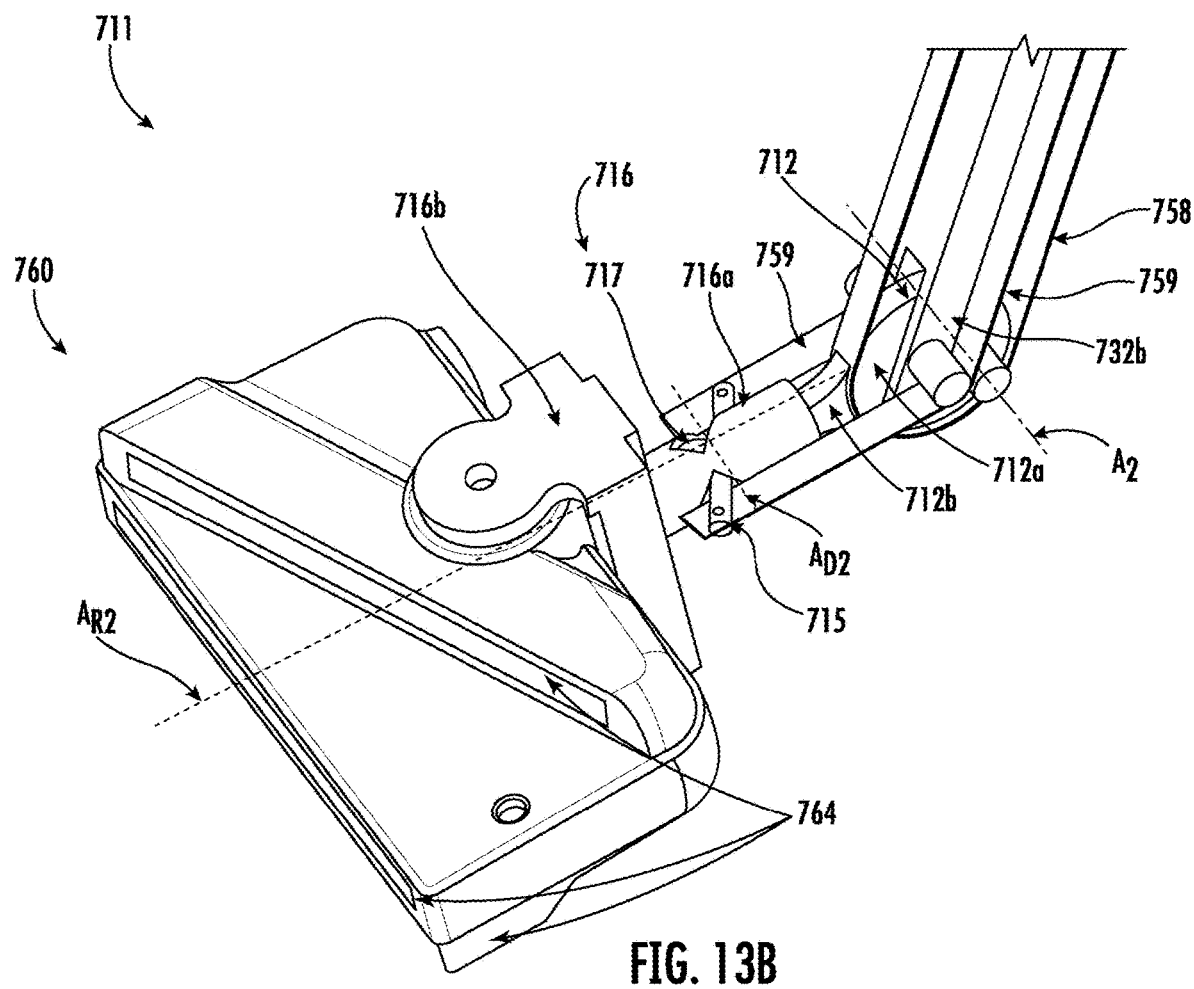
Figure 14A:
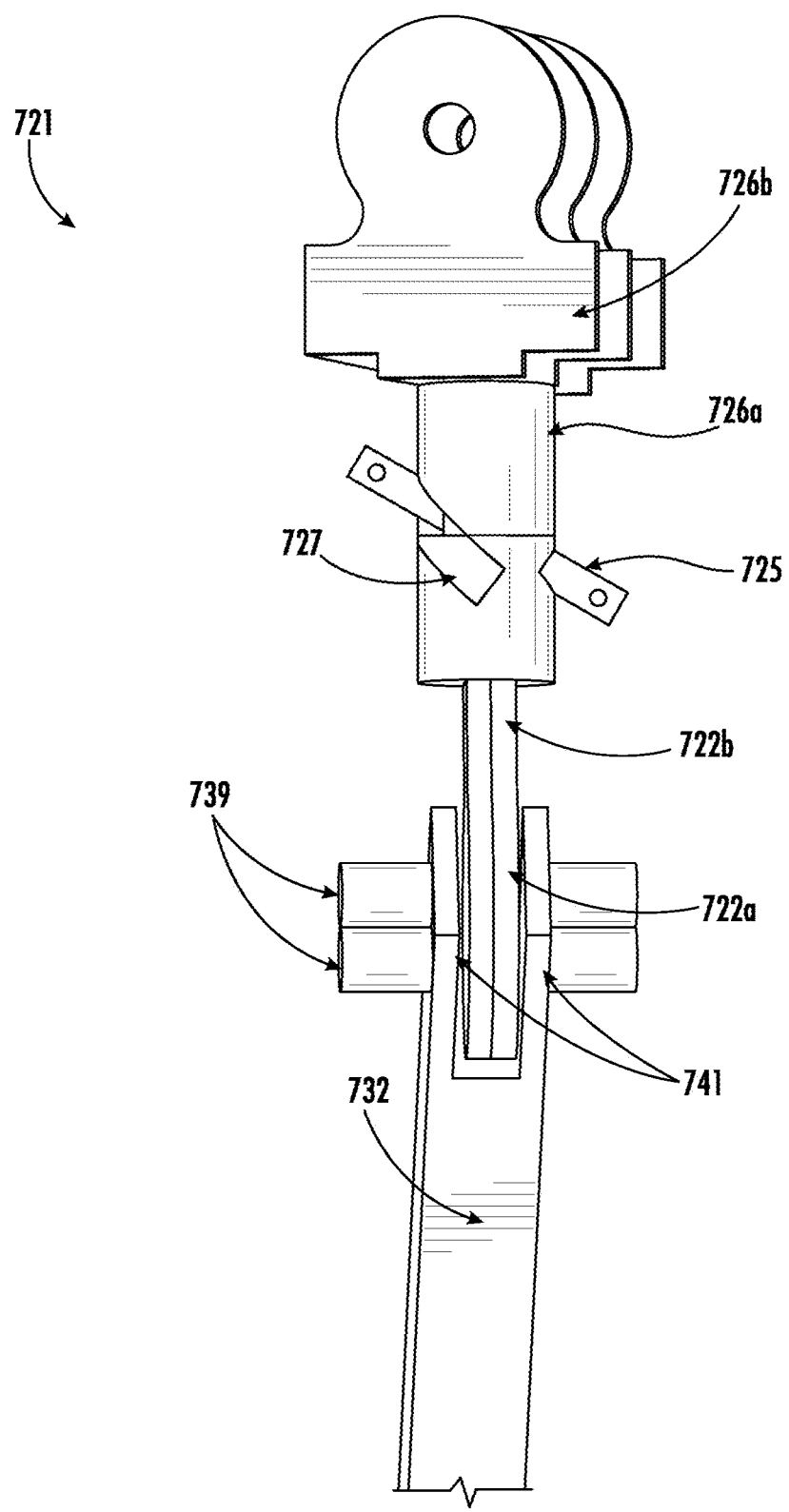
Figure 14B:
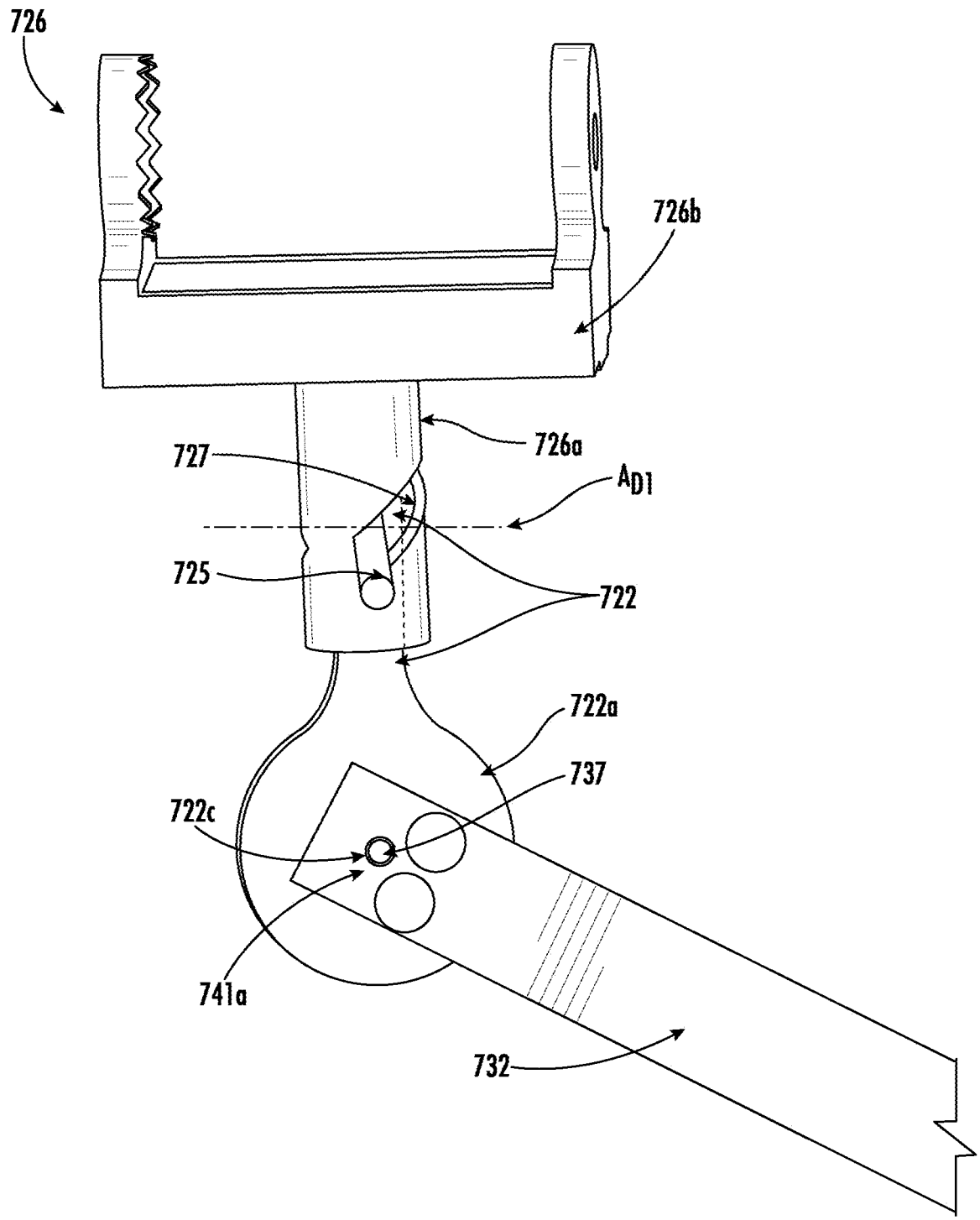
Figure 14C:
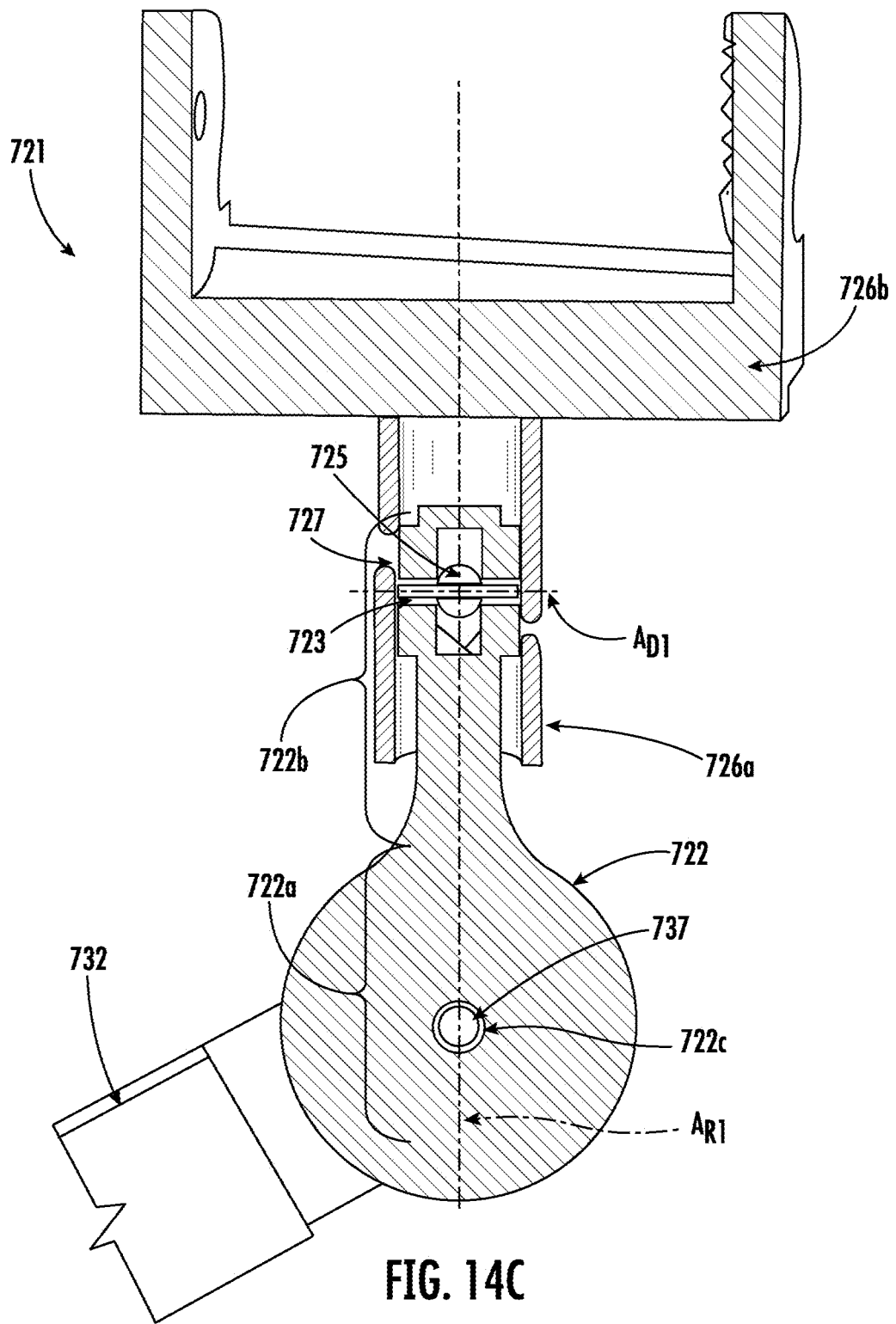
Figure 14D:
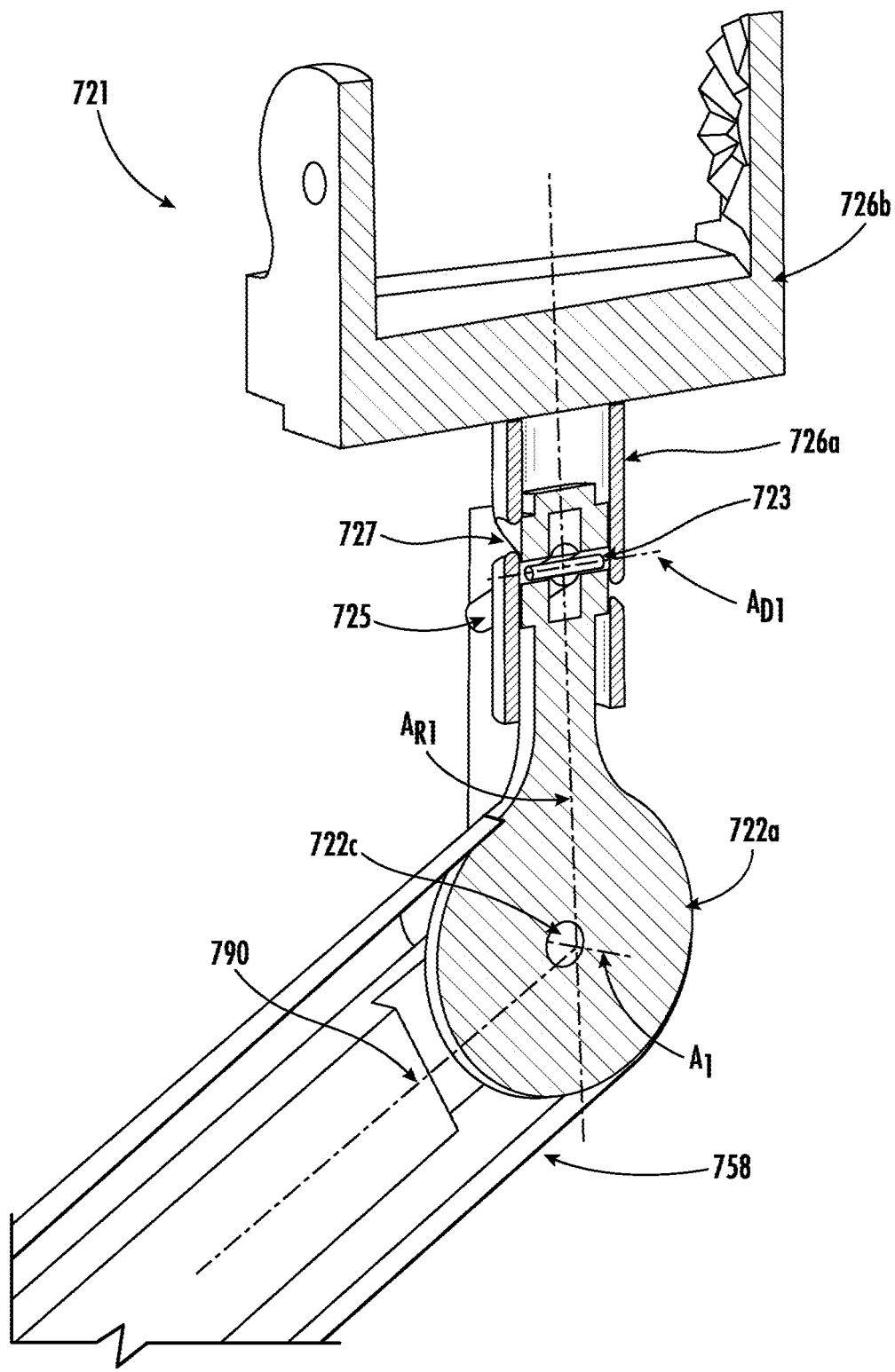
Figure 14E:
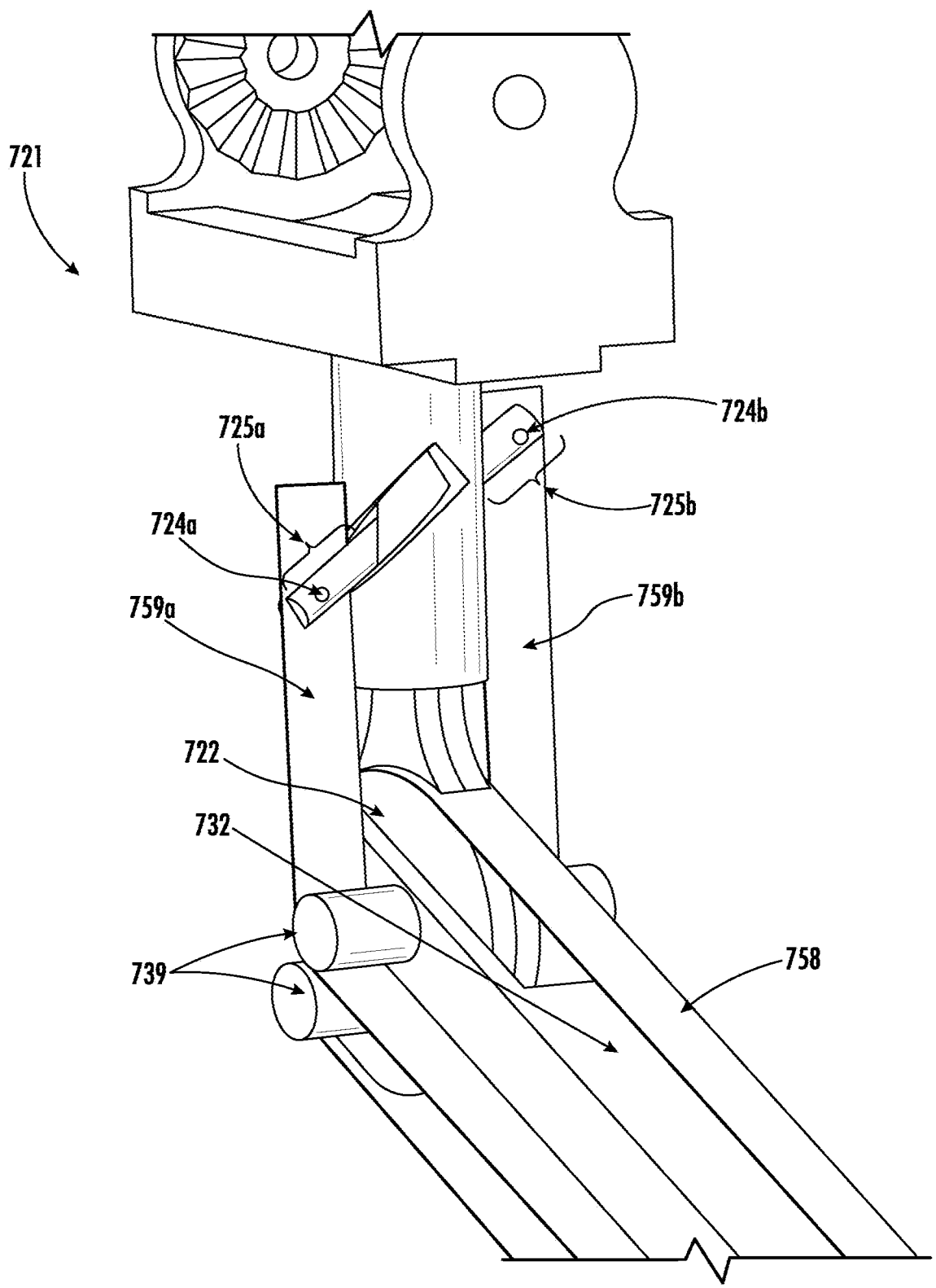
Figure 15A:
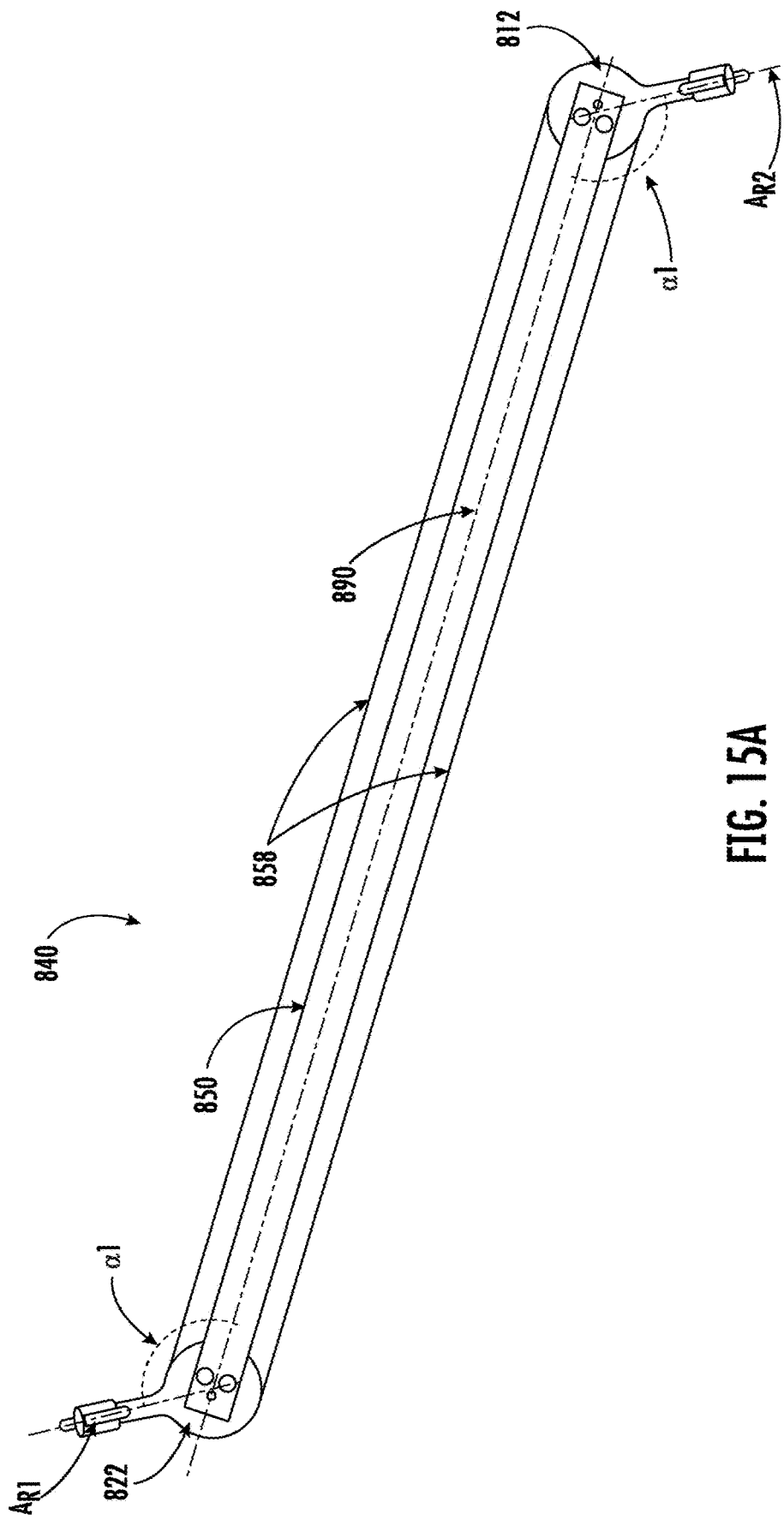
Figure 15B:
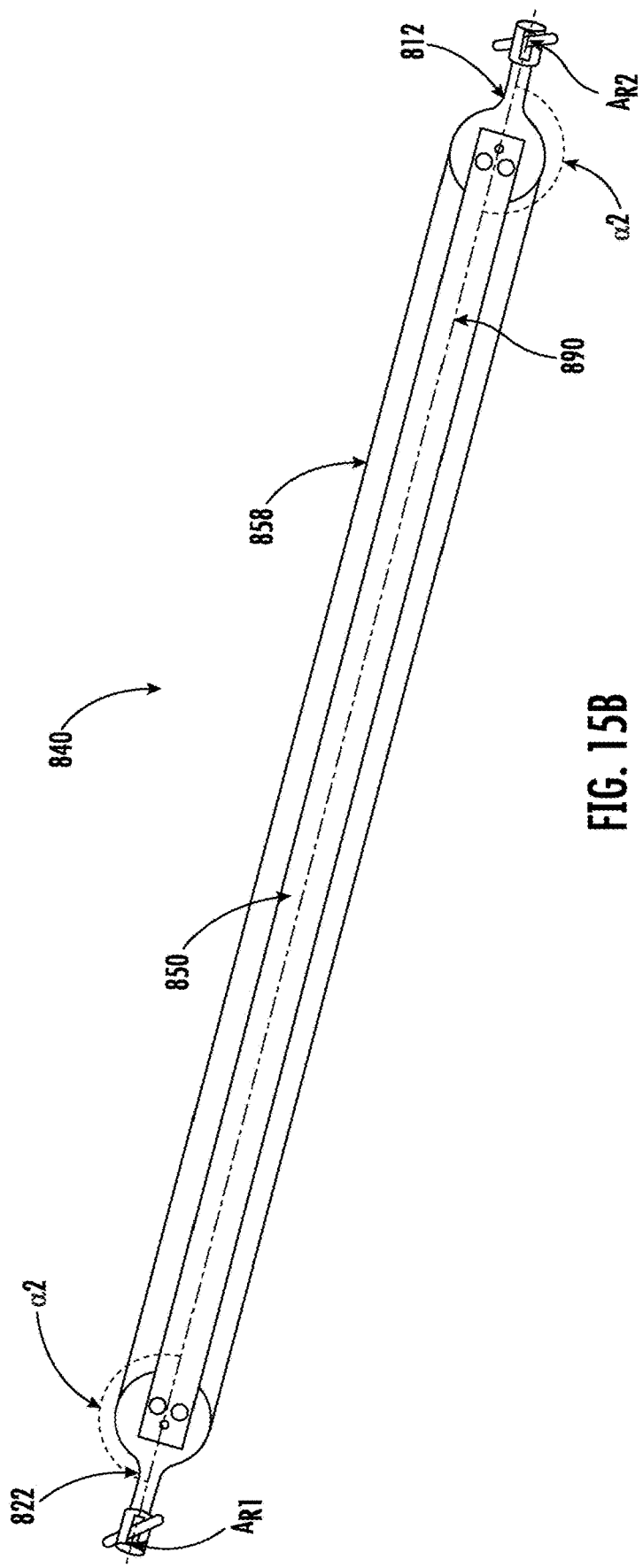
Figure 17B:
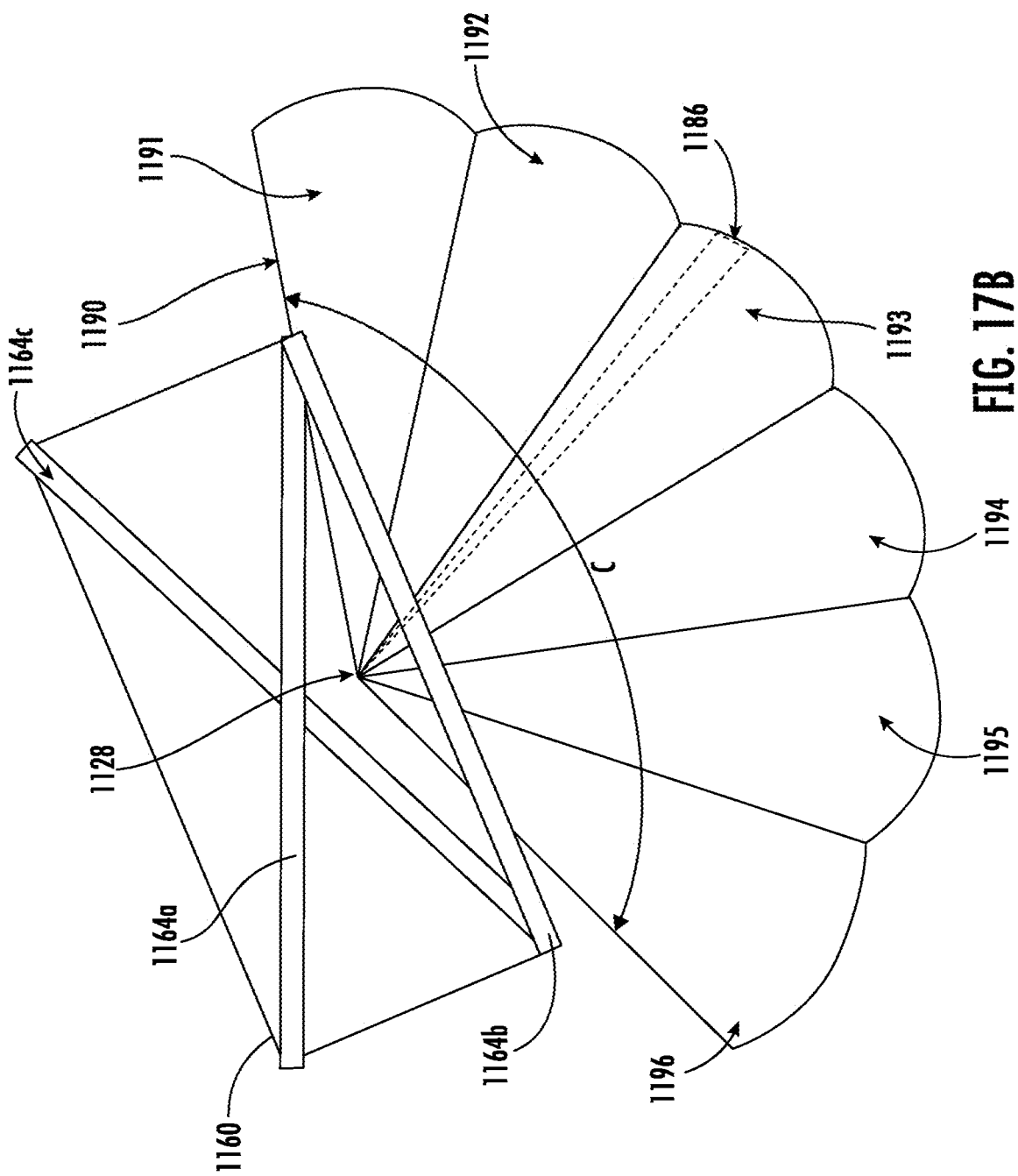
Figure 17C:
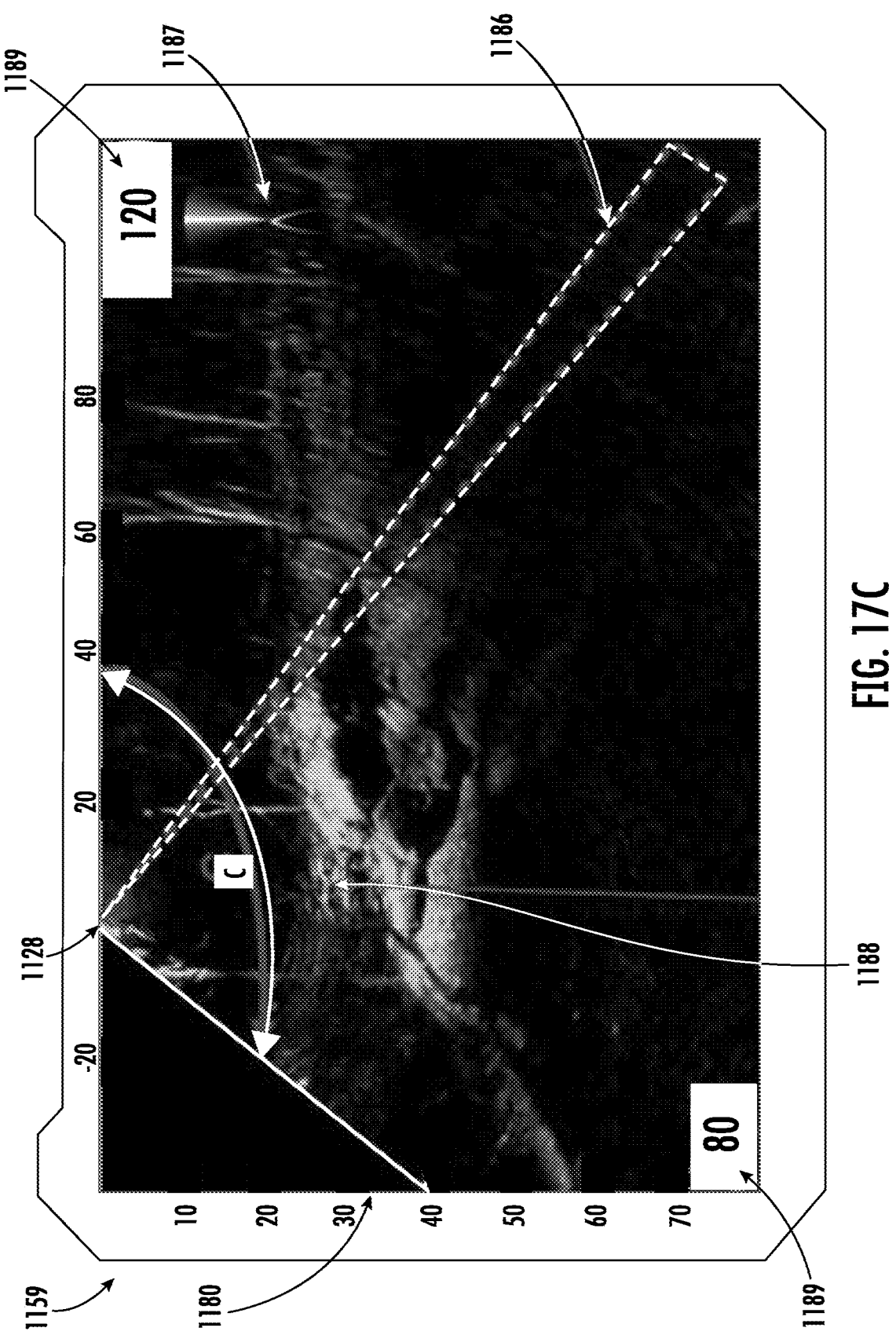
Figure 18A:
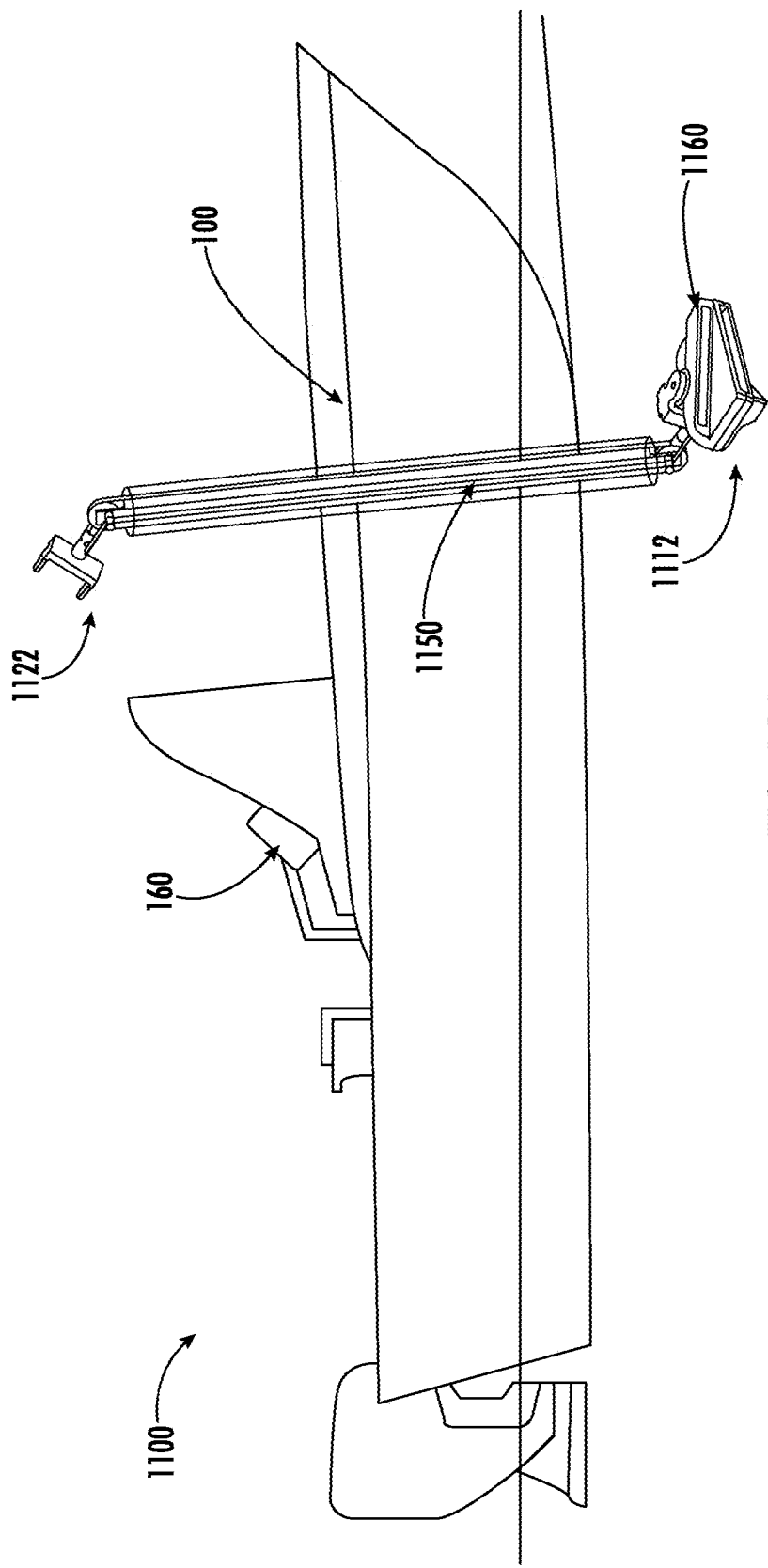
Figure 18B:
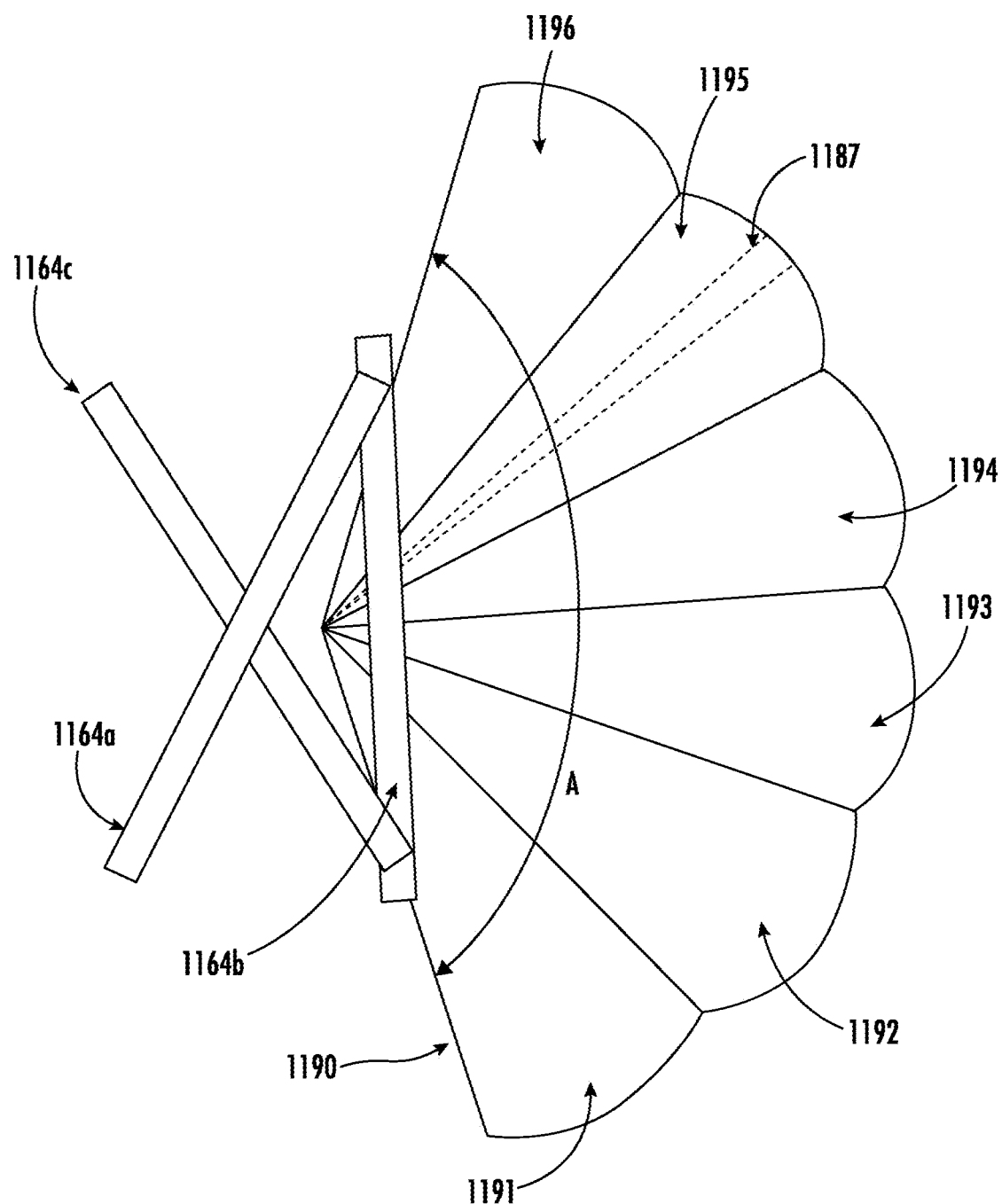
Figure 18C:
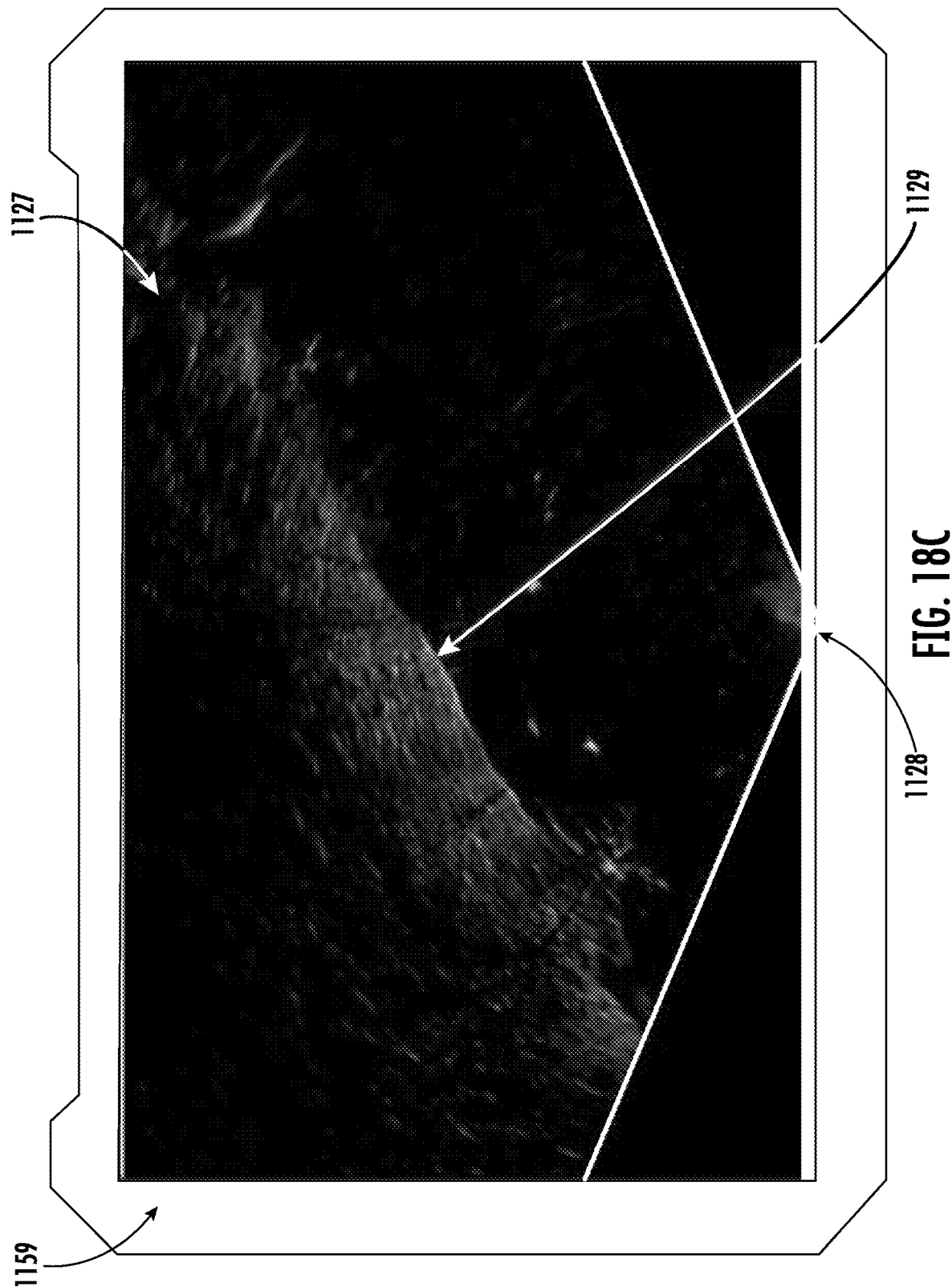
Figure 19:
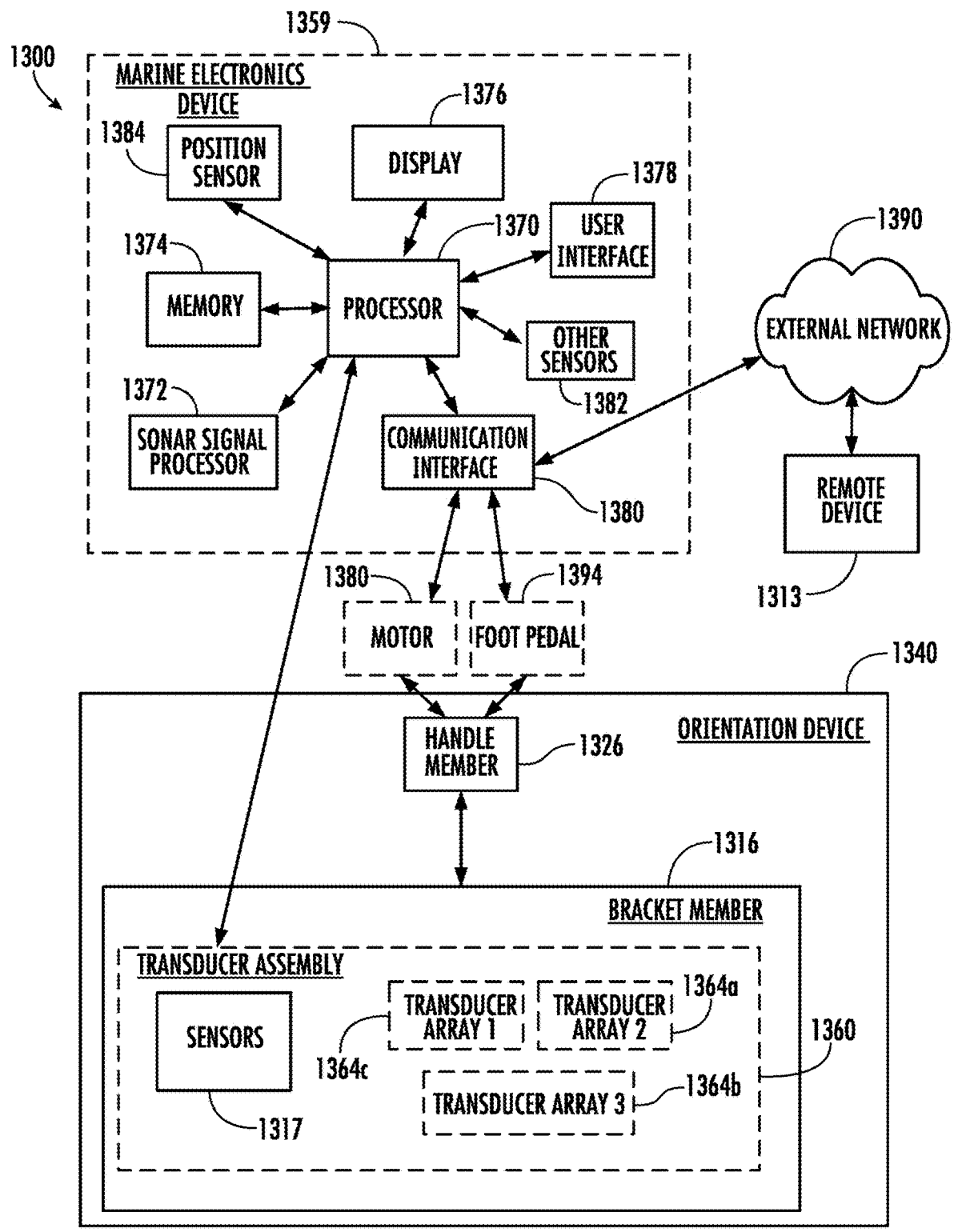

Having thus described some example embodiments in general terms, reference will now be made to the accompanying drawings, which are not necessarily drawn to scale, and wherein:

FIG. 1 shows an example watercraft with both a trolling motor assembly and a sonar assembly in accordance with some example embodiments;

FIGS. 2A through 2D show various views of an example sonar assembly in accordance with some example embodiments;

FIGS. 3A through 3D show various views of an example sonar assembly in accordance with some example embodiments;

FIGS. 4A through 4D show various views of an example sonar assembly in accordance with some example embodiments;

FIG. 5 shows an example sonar assembly in accordance with some embodiments;

FIG. 6 shows an example sonar control device in the form of a foot pedal assembly in accordance with some example embodiments;

FIGS. 7A and 7B show an example sonar control device in the form of a foot pedal assembly in accordance with some example embodiments;

FIGS. 8A and 8B show example sonar control devices in the form of fobs in accordance with some example embodiments;

FIGS. 9A and 9B show an example navigation control device in the form of a foot pedal providing control signals to an example sonar assembly attached to the bow of a watercraft;

FIGS. 10A and 10B illustrate a schematic top plan view and a schematic side plan view, respectively, of a watercraft with an example sonar assembly including a transducer assembly, wherein the transducer assembly is mounted horizontally to provide wide sonar coverage in the port-to-starboard direction in front of the watercraft, in accordance with some embodiments discussed herein;

FIGS. 11A and 11B illustrate a schematic top plan view and a schematic side plan view, respectively, of a watercraft with an example sonar assembly including a transducer assembly wherein the transducer assembly is mounted vertically to provide wide sonar coverage in the fore-to-aft direction along the watercraft, in accordance with some embodiments discussed herein;

FIG. 12 illustrates an example sonar system in accordance with some embodiments discussed herein;

FIG. 13A illustrates an example first attachment, shown in FIG. 13, in accordance with some embodiments discussed herein;

FIG. 13B illustrates an example second attachment, shown in FIG. 13, in accordance with some embodiments discussed herein;

FIGS. 14A-B illustrate perspective views of the example first attachment shown in FIG. 13A, in accordance with some embodiments discussed herein;

FIGS. 14C-D illustrate cross-sectional views of the example first attachment shown in FIG. 13A, in accordance with some embodiments discussed herein;

FIG. 14E illustrates a perspective view of the example first attachment shown in FIG. 13A, in accordance with some embodiments discussed herein;

FIG. 15A illustrates a perspective view of an example aiming and orienting device in a first position, in accordance with some embodiments discussed herein;

FIG. 15B illustrates a perspective view of the example orientation device shown in FIG. 15A in a second position, in accordance with some embodiments discussed herein;

FIG. 15C illustrates a perspective view of the example orientation device shown in FIGS. 15A-B in a third position, in accordance with some embodiments discussed herein;

FIGS. 16A-F illustrate perspective views of the rotation of the first attachment, shown in FIG. 15A and the second attachment, shown in FIG. 15B, in accordance with some embodiments discussed herein;

FIG. 17A illustrates a perspective view of the sonar system, shown in FIG. 12, attached to a watercraft, in accordance with some embodiments discussed herein;

FIG. 17B illustrates a schematic top plan view of a transducer assembly wherein the transducer assembly is oriented vertically to provide wide sonar coverage in the fore-to-aft direction along the watercraft, in accordance with some embodiments discussed herein;

FIG. 17C illustrates an example marine electronic device presenting a two-dimensional (2D) live sonar image corresponding to the sonar coverage shown in FIG. 17B, in accordance with some embodiments discussed herein;

FIG. 18A illustrates a perspective view of the sonar system, shown in FIG. 12, attached to a watercraft, in accordance with some embodiments discussed herein;

FIG. 18B illustrates a schematic top plan view an example transducer assembly, wherein the transducer assembly is mounted horizontally to provide wide sonar coverage in the port-to-starboard direction in front of the watercraft, in accordance with some embodiments discussed herein;

FIG. 18C illustrates an example marine electronic device presenting a two-dimensional (2D) live sonar image corresponding to the sonar coverage shown in FIG. 18A, in accordance with some embodiments discussed herein; and FIG. 19 shows a block diagram of an example marine network architecture for various systems, apparatuses, and methods in accordance with some example embodiments.

DETAILED DESCRIPTION

Exemplary embodiments will be described more fully hereinafter with reference to the accompanying drawings, in which some, but not all embodiments of the invention are shown. Indeed, the embodiments take many different forms and should not be construed as being limiting. Rather, these example embodiments are provided so that this disclosure will satisfy applicable legal requirements. Like reference numerals refer to like elements throughout.

FIG. 1 illustrates an example watercraft 100 on a body of water. The watercraft 100 includes a main engine 110, a trolling motor system 120, and a sonar system 130. According to some example embodiments, the trolling motor system 120 may be comprised of a trolling motor assembly including a propulsion motor and a propeller, and a navigation control device used to control the speed and the course or direction of propulsion. The trolling motor assembly may be attached to the stern of the watercraft 100 and the motor and propeller may be submerged in the body of water below its surface 101. However, positioning of trolling motor system 120 need not be limited to the stern, and may be placed elsewhere on a watercraft. The trolling motor system 120 can be used to propel the watercraft 100 under certain circumstances, such as, when fishing and/or when wanting to remain in a particular location.

According to some example embodiments, the sonar system 130 may be comprised of a sonar assembly including a transducer assembly and manually-operated controls that may be used to control the direction of transmission of the sonar system 130. In alternate embodiments, a directional actuator and an electrical sonar control device may be used to control the sonar system 130, as discussed in greater detail below. In yet another alternate embodiment, a marine electronics device may be used to control the sonar system, as discussed in greater detail below. The sonar system 130 may be placed on the watercraft, such as directly to the bow, stern, or side, such that the transducer assembly 160 is submerged in the body of water below its surface 101. Additionally, the sonar system 130 may also be attached to the trolling motor system 130. The sonar system 130 can be used to detect waterborne or underwater objects. For example, the sonar system 130 may be used to determine and/or illustrate depth and bottom topography, detect fish, etc.

Figure 2A:
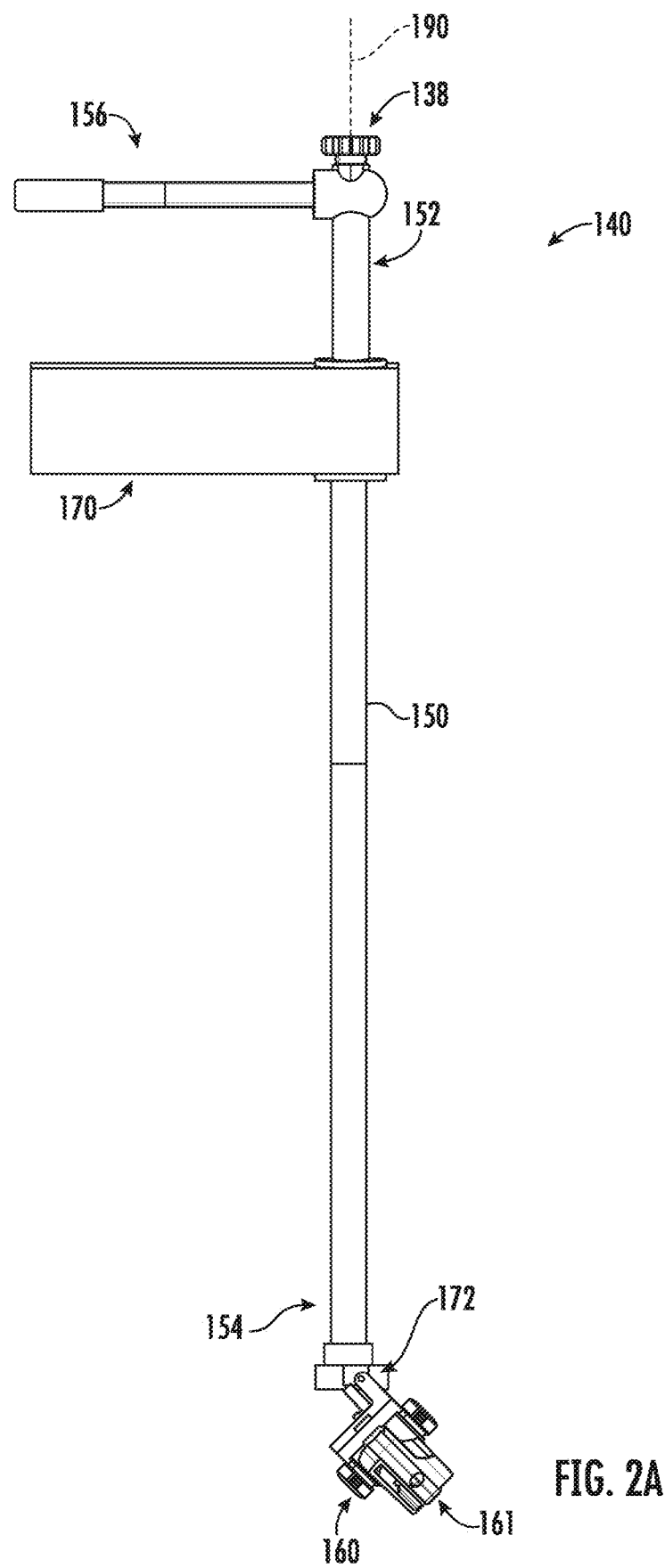
Figure 2B:
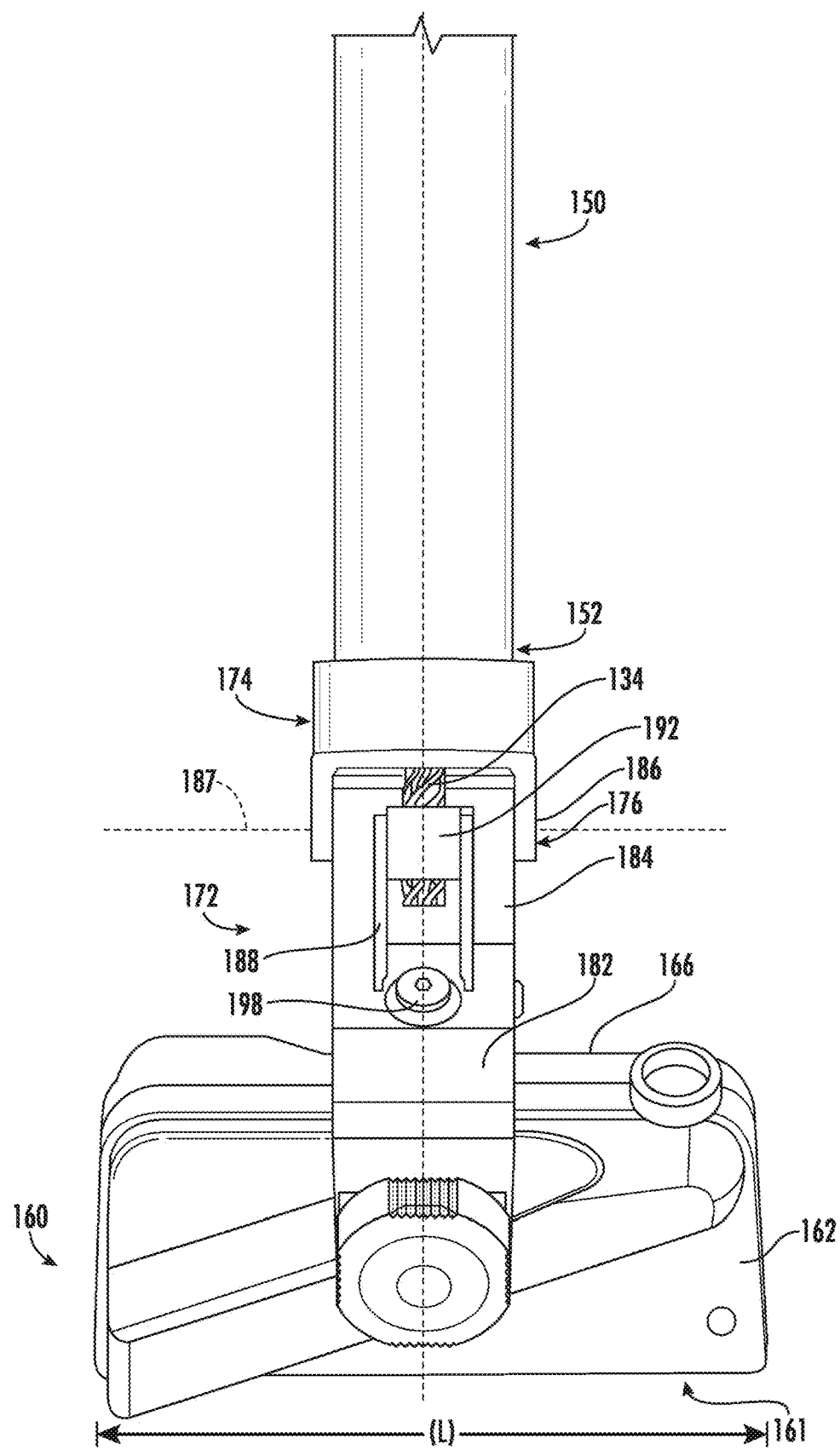
Figure 2C:
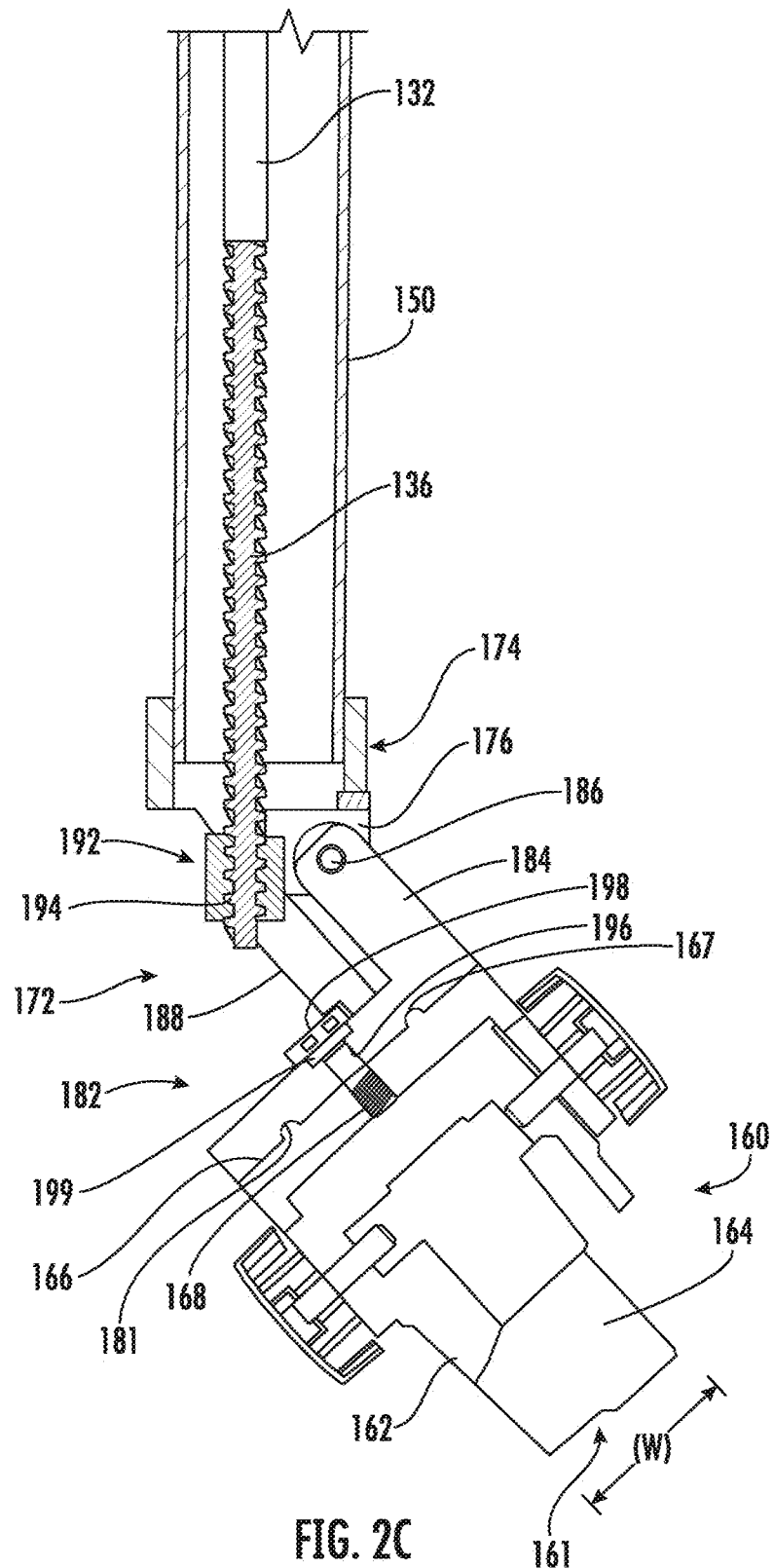
Figure 2D:
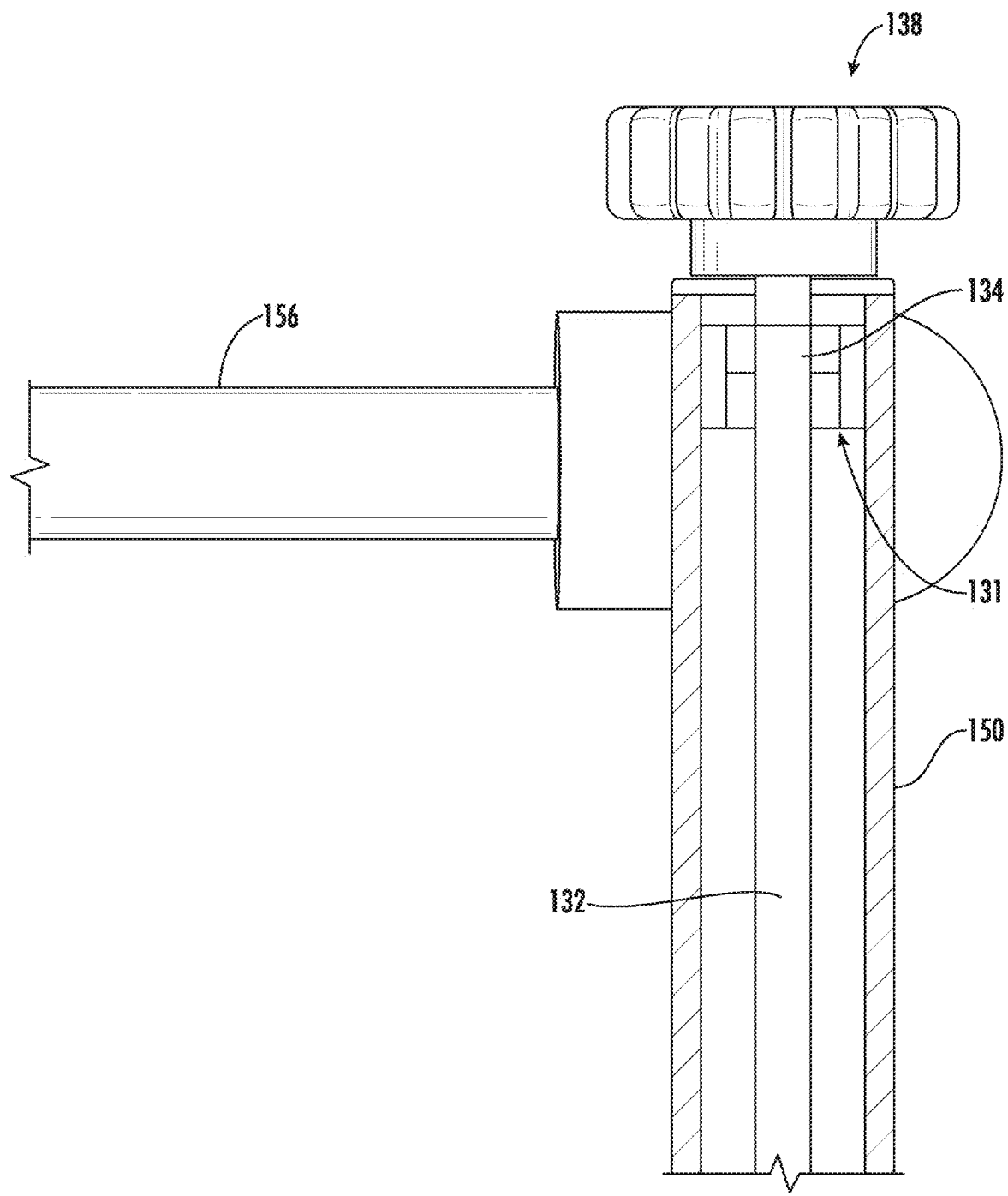

FIGS. 2A through 2D illustrate an example sonar assembly 140, according to some example embodiments. The sonar assembly 140 may include a shaft 150, a transducer assembly 160, and an attachment device 170. The sonar assembly 140 may be fixed either directly to a side, bow, or stern of a watercraft via an attachment device 170, which may be, for example, an adjustable clamp, or to the shaft of the trolling motor assembly 120. As shown, the shaft 150 may be hollow and include a steering handle 156 non-rotatably fixed to a top end 134 of the shaft 150. An adjustable bracket 172 may be non-rotatably fixed to a bottom end 154 of the shaft 150, the adjustable bracket 172 being utilized to secure the transducer assembly 160 to the shaft 150. Referring specifically to FIGS. 2C and 2D, a sonar tilt assembly may include an elongated rod 132 that is rotatably secured within the shaft 150 by a bushing 131 that is disposed within a top end 152 of the shaft 150. A control knob 138 may be non-rotatably fixed to the top end 134 of the rod 132, and may be used to rotate the rod 132 in either a clockwise direction or a counter-clockwise direction with respect to the shaft 150 (e.g., about a shaft axis), when viewed from above. A bottom end portion 136 of the rod 132 is threaded and may extend axially-outwardly beyond the bottom end 154 of the shaft 150.

Still referring to FIGS. 2B and 2C, the adjustable bracket 172 may include an end cap 174 that is non-rotatably fixed to the bottom end 154 of the shaft 150 and include two downwardly-depending projections that define a yoke 176. The bracket 172 may also include a base plate 182 that includes a mounting flange 184 extending outwardly from a back side of the base plate 182 such that the distal edge of the mounting flange 184 is received between the projections of the yoke 176. An axle 186 extends through both the projections defining the yoke 176 and the distal end of the mounting flange 184, thereby securing the base plate 182 to the end cap 174. The base plate 182 of the bracket 172 is pivotable with respect to the end cap 174 about the longitudinal center axis 187 of the axle 186.

As shown in FIGS. 2B and 2C, in the illustrated embodiment, a pair of projections extend outwardly from the rear face of the base plate 182, thereby forming a yoke 188. A collar 192 is secured between the distal ends of the projections of the yoke 188 so that the collar 192 is pivotable with respect to the yoke 188. The collar 192 defines a bore 194 that is correspondingly-threaded to the threaded bottom end portion 136 of the rod 132. The threaded bottom end portion 136 of the rod 132 is rotatably received within the threaded bore 194 of the collar 192 so that rotation of the bottom end portion 136 of the rod 132 within the collar 192 causes the collar 192 to move axially along the rod 132. In the illustrated embodiment, the threaded bottom end portion 136 of the rod 132 includes a standard right-hand thread, meaning that when viewed from above, rotation of the knob 138 in a clockwise direction causes the collar 192 to move upwardly along the rod 132. As best seen in FIG. 2C, upward movement of the collar 192 along the rod 132 causes the base plate 182 of the adjustable bracket 172 to rotate about the longitudinal center axis 187 of the axle 186 in a clockwise direction, meaning the transmission direction of the transducer assembly 160 moves downwardly away from the surface 101 of the water, as shown in FIGS. 9A and 10B. Conversely, rotation of the knob 138, when viewed from above, in the counter-clockwise direction causes collar 192 to move downwardly along the rod 132, meaning the base plate 182 of the adjustable bracket 172 rotates about the longitudinal center axis 187 of the axle 186 in the counter-clockwise direction. As such, as shown in FIG. 9B, the direction of transmission of the transducer assembly 160 will move closer to the surface 101 of the water. Note, in the illustrated embodiment, the direction of transmission of the transducer assembly 160 is movable from being parallel with respect to the surface of the water to being vertical with respect to the surface of the water, i.e., movable 90° vertically with respect to the watercraft (as shown in FIG. 10B).

As shown in FIGS. 2A and 2C, in the illustrated embodiment, the example transducer assembly 160 includes a housing 162 that houses one or more transducer arrays 164 and defines an emitting face 161 with a length (L) and a width (W), where the length is greater than the width. The housing 162 also includes a base wall 166 opposite to the emitting face 161 and is secured to a front face of the base plate 182 of the adjustable bracket 172. The base wall 166 of the housing 162 may be secured to the base plate 182 by a threaded fastener 198 that passes through a smooth bore 196 that extends through the base plate 182 and engages a threaded bore 168 that is defined in the base wall of the housing 162. The smooth bore 196 is configured so that the head of the threaded fastener is movable axially within a portion thereof. However, a spring 199 is disposed within the smooth bore 196 below the head of the threaded fastener 198 so that the spring 199 provides a biasing force on the threaded fastener 198, thereby urging the threaded fastener 198 axially-outwardly from the smooth bore 196. As such, the biasing force of the spring 199 helps to maintain the base wall 166 of the housing 162 of the transducer assembly 160 adjacent the base plate 182 of the adjustable bracket 172.

In some embodiments, the transducer assembly 160 can be configured to be oriented differently to provide different sonar image options. For example, as shown in FIGS. 2B, 2C, 10A, 10B, 18A-B the transducer assembly 160, 1160 may be configured to be oriented horizontally (such as pointing forward from the watercraft) and provide a desirable sonar image that is wide (e.g., widest) in the horizontal plane. This orientation is often referred to as being in "scout" mode. In this regard, the extended sonar beam coverage (e.g., ~135°) may be used to see a wider view in the port-to-starboard direction with respect to the watercraft 100 (or off to one side of the watercraft or both sides if two transducer assemblies are used). Note, in the illustrated embodiment, broader coverage in the port-to-starboard direction results in more narrow coverage (e.g., ~20°) in the fore-and-aft direction (FIG. 10B). Notably, while the beam coverage is 135° by 20°, other beam coverage ranges are contemplated, e.g., 90°-150° by 5°-50°.

In the illustrated embodiment, a user may selectively configure the transducer assembly 160 to be oriented vertically (such as downwardly from the watercraft with the emitting face 161 disposed in a vertical plane) and provide a desirable sonar image that is wide (e.g., widest) in the vertical plane. This orientation is often referred to as being in the "down" or "normal" mode. In this regard, the more narrow sonar beam coverage (e.g., ~20°) may be used to see a more focused view in the port-to-starboard direction with respect to the watercraft, as shown in FIG. 11A. Conversely, in this orientation, the extended beam coverage (e.g., ~135°) is now provided in the fore-and-aft direction with respect to the watercraft 100, as shown in FIGS. 11B, 17A-B.

Referring again to FIGS. 2B and 2C, to change the orientation of the transducer assembly 160 from the scout mode (FIGS. 10A-B, 18A-B) to the normal/down mode (FIGS. 11A-B, 17A-B), a user pulls outwardly on the transducer assembly 160 with enough force to overcome the biasing force of the spring 199 that maintains the transducer assembly 160 adjacent the base plate 182 of the adjustable bracket 172. Once the base wall 166 of the transducer assembly 160 is separated from the base plate 182 enough for detents 167 formed on the base wall 166 to clear corresponding recesses 181 formed on the base plate 182, the user is free to rotate the transducer assembly 160 to the desired orientation. The detents 167 and recesses 181 may be provided to ensure that the transducer assembly 160 is properly oriented with respect to the adjustable bracket 172 and maintained in that position until changed by the user. For example, for the scout mode in which the transducer assembly 160 is oriented horizontally, the length of the emitting face 161 of the transducer assembly 160 should be perpendicular to the steering handle 156 of the sonar assembly 140, whereas for the normal/down mode in which the transducer assembly 160 is oriented vertically, the length of the emitting face 161 of the transducer assembly 160 should be co-planar with the steering handle.

Figure 3A:
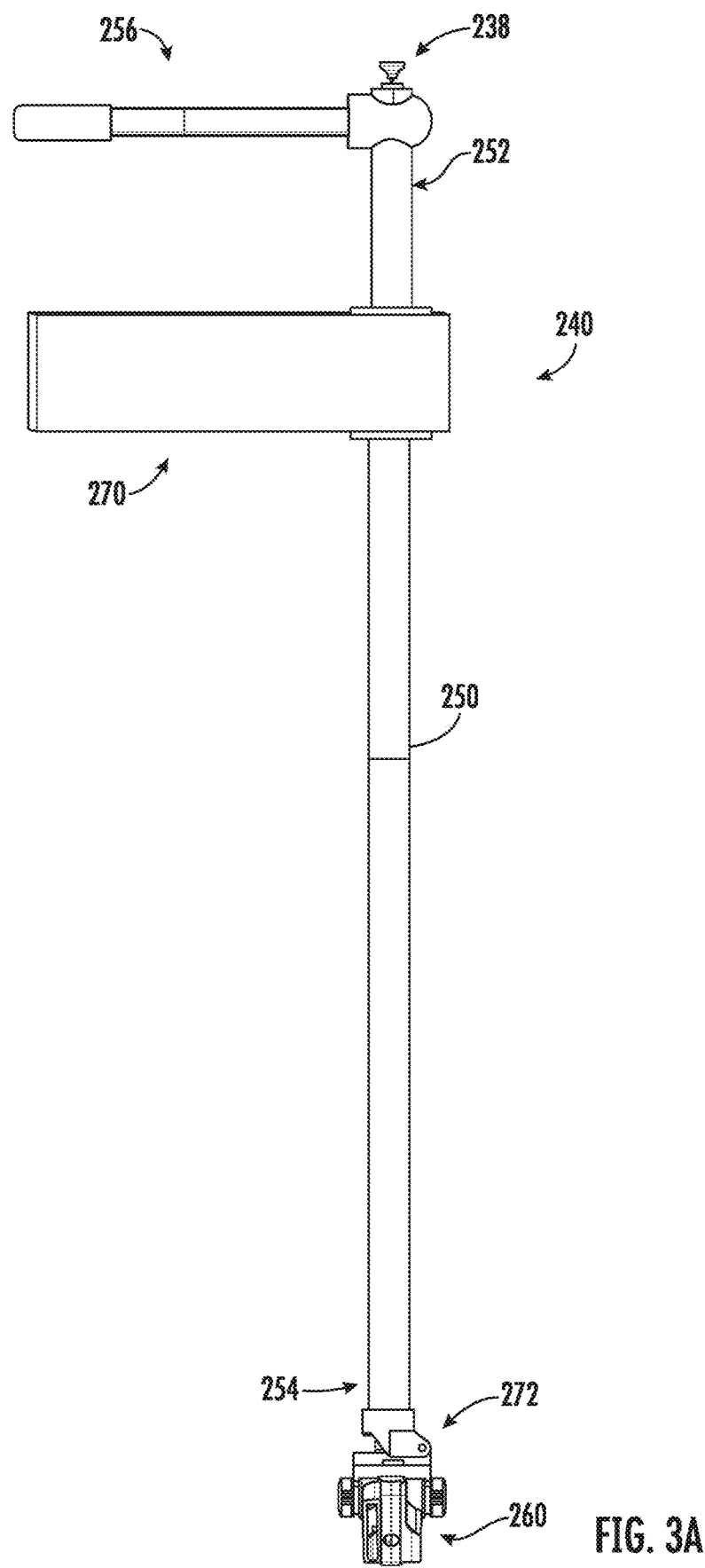
Figure 3B:
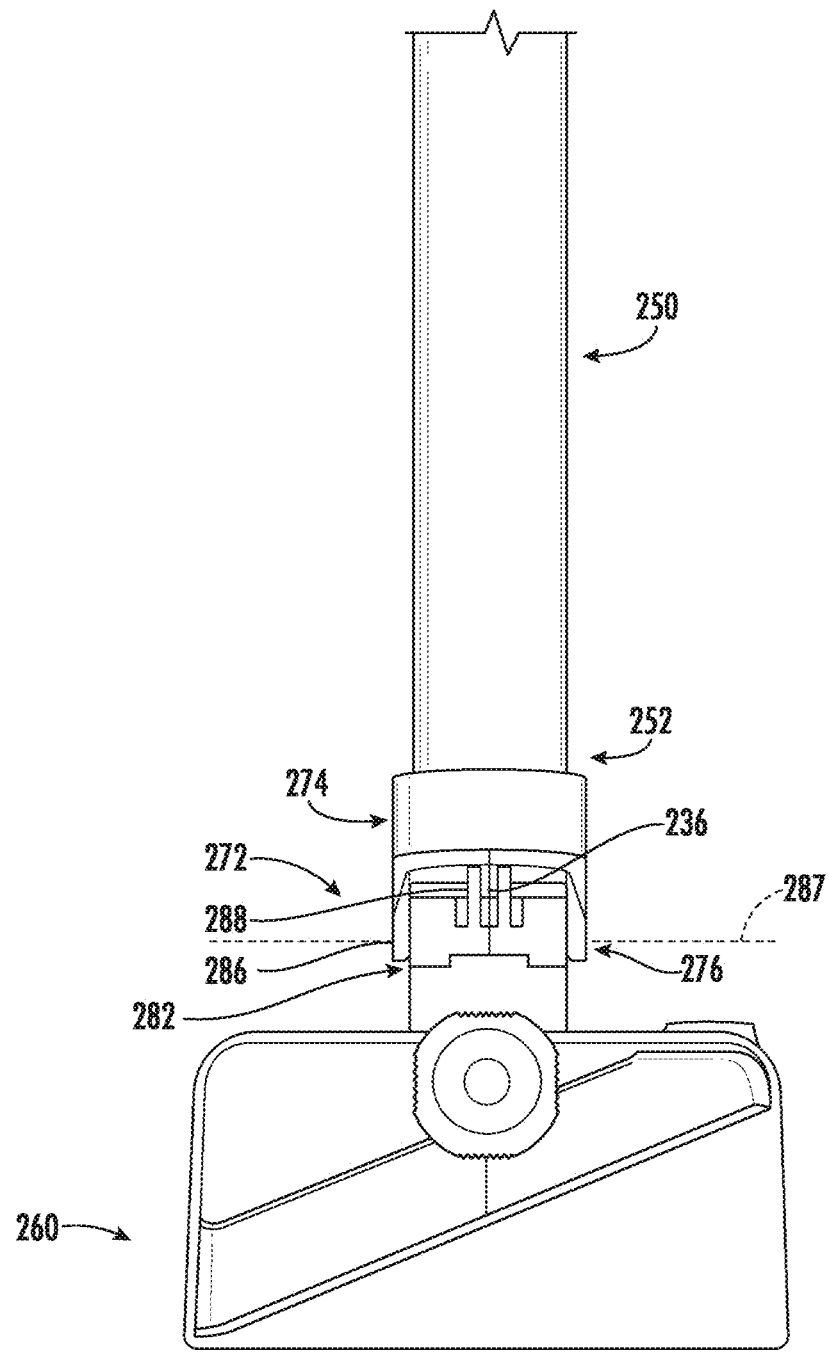
Figure 3C:
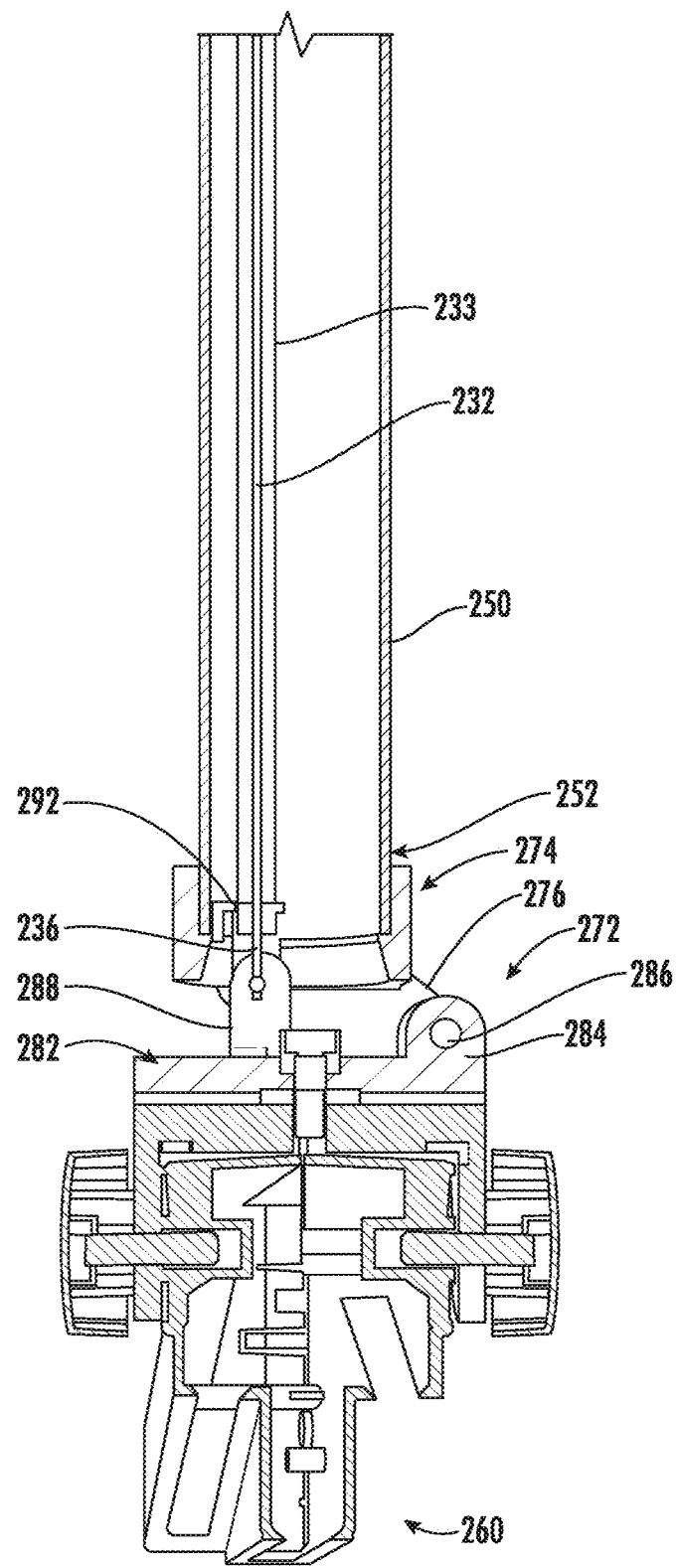
Figure 3D:
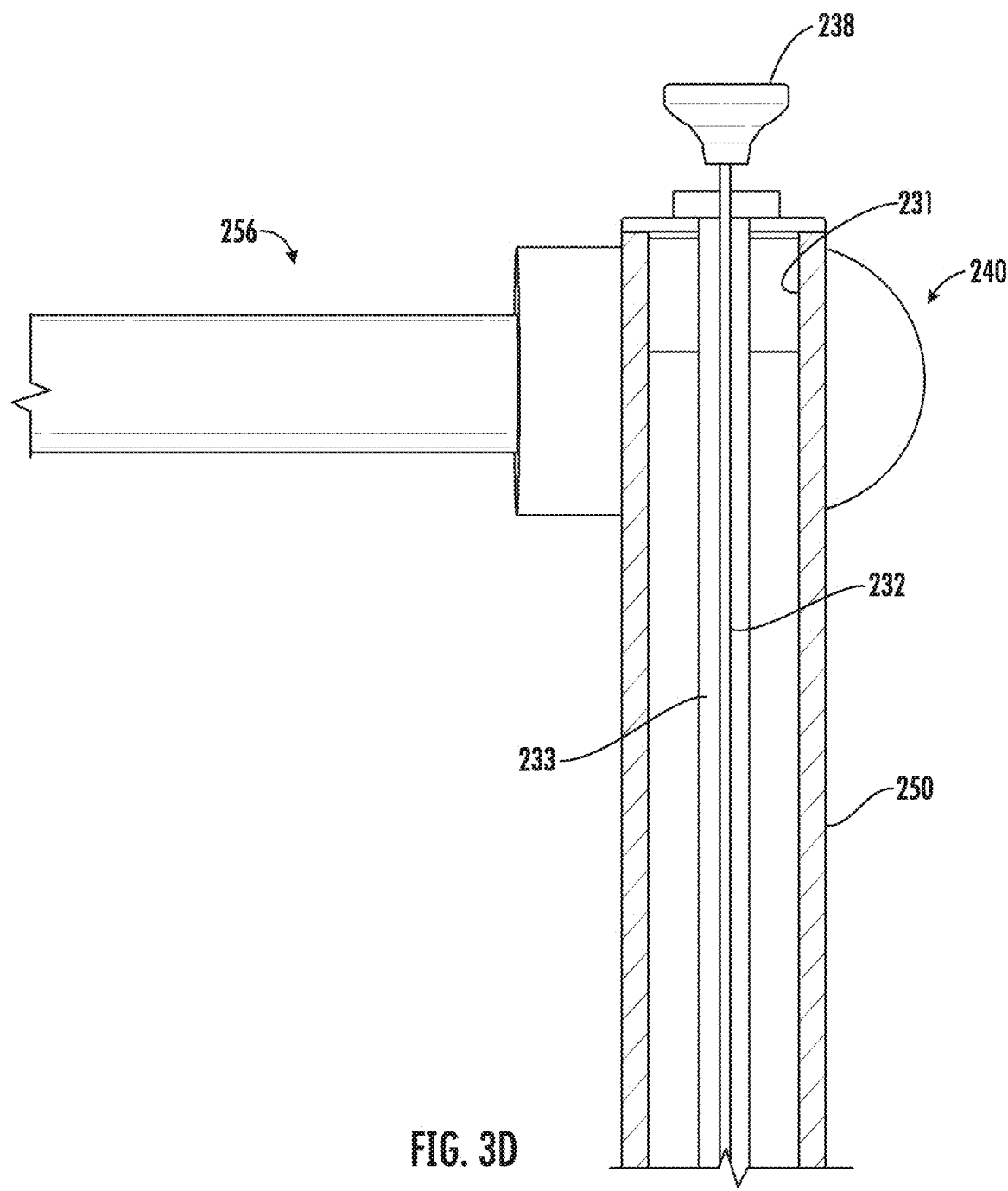

FIGS. 3A through 3D illustrate an alternate embodiment sonar assembly 240, according to some example embodiments. The sonar assembly 240 may include a shaft 250, a transducer assembly 260, and an attachment device 270. The sonar assembly 240 may be fixed to either a side, bow, or stern of a watercraft via an attachment device 270, which may be, for example, an adjustable clamp, or to the shaft of the trolling motor assembly. As shown, the shaft 250 may be hollow and include a steering handle 256 non-rotatably fixed to a top end 234 of the shaft 250. An adjustable bracket 272 may be non-rotatably fixed to a bottom end 254 of the shaft 250, the adjustable bracket 272 being utilized to secure the transducer assembly 260 to the shaft 250. Referring specifically to FIGS. 3C and 3D, a sonar tilt assembly may include an elongated semi-rigid cable 232 that is axially movable within a hollow sheath 233. Note, in other embodiments, the cable 232 may be either rigid or flexible, and the sheath 233 may be as well. The sheath 233 is secured at its top end within the shaft 250 by a bushing 231 that is disposed within a top end 252 of the shaft 250, and at its bottom end by a bracket 292 so that the sheath 233 does not move axially with respect to the shaft 250. A control knob 238 may be fixed to the top end 234 of the rod 232, and may be used to move the cable 232 axially within the sheath 233 and, therefore, axially within the shaft 250. A bottom end portion 236 of the cable 232 may extend axially-outwardly from the bottom end 254 of the shaft 250.

Referring now to FIGS. 3B and 3C, the adjustable bracket 272 may include an end cap 272 that is non-rotatably fixed to the bottom end 254 of the shaft 250 and include two downwardly-depending projections that define a yoke 276. The bracket 272 may also include a base plate 282 that includes a mounting flange 284 extending outwardly from a back side of the base plate 282 such that the distal edge of the mounting flange 284 is received between the projections of the yoke 276. An axle 286 extends through both the projections defining the yoke 276 and the distal end of the mounting flange 284, thereby securing the base plate 282 to the end cap 274. The base plate 282 of the bracket 272 is pivotable with respect to the end cap 274 about the longitudinal center axis 287 of the axle 286.

As shown in FIGS. 3B and 3C, in the illustrated embodiment, a pair of projections extend outwardly from the rear face of the base plate 282, thereby forming a yoke 288. The bottom end portion 236 of the cable 232 is secured between the distal ends of the projections of the yoke 288 so that moving the cable 232 axially with respect to the shaft 250 causes the base plate 282 of the adjustable bracket 272 to pivot about the longitudinal center axis 287 of the axle 286. As best seen in FIGS. 3C and 3D, downward movement of the control knob 238 causes the bottom end portion 236 to extend downwardly from the bottom end 254 of the shaft 250, thereby causing the base plate 282 of the adjustable bracket 272 to rotate about the longitudinal center axis 287 of the axle 286 in a counter-clockwise direction and the transmission direction of the transducer assembly 160 to move upwardly toward the surface 101 of the water, as shown in FIG. 9B. Conversely, upward movement of the control knob 238 causes the bottom end portion 236 to move upwardly toward the bottom end 254 of the shaft 250, thereby causing the base plate 282 of the adjustable bracket 272 to rotate about the longitudinal center axis 287 of the axle 286 in the clockwise direction and, therefore, the direction of transmission of the transducer assembly to move farther away to the surface 101 of the water, as shown in FIG. 9A.

Figure 4A:
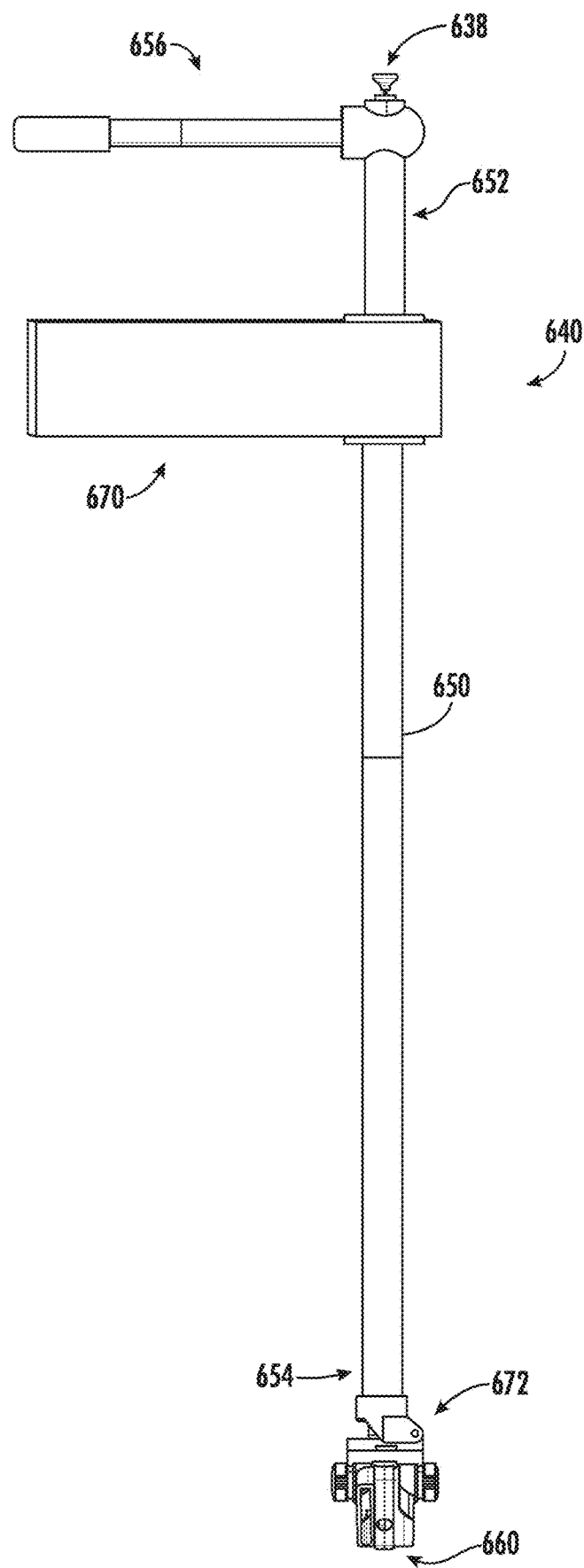
Figure 4B:
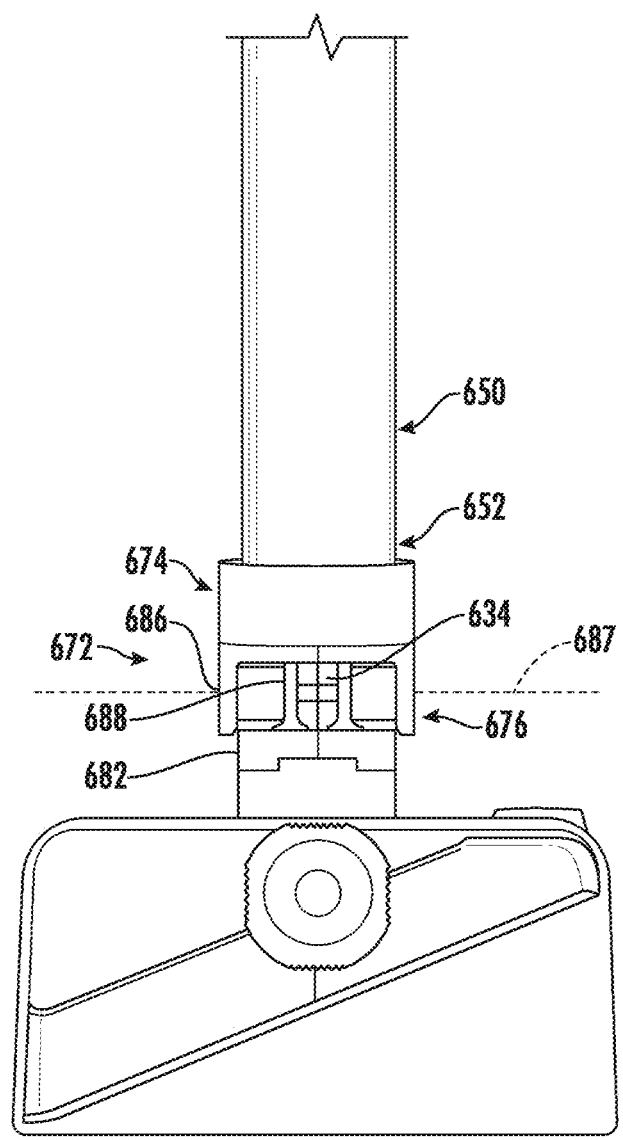
Figure 4C:
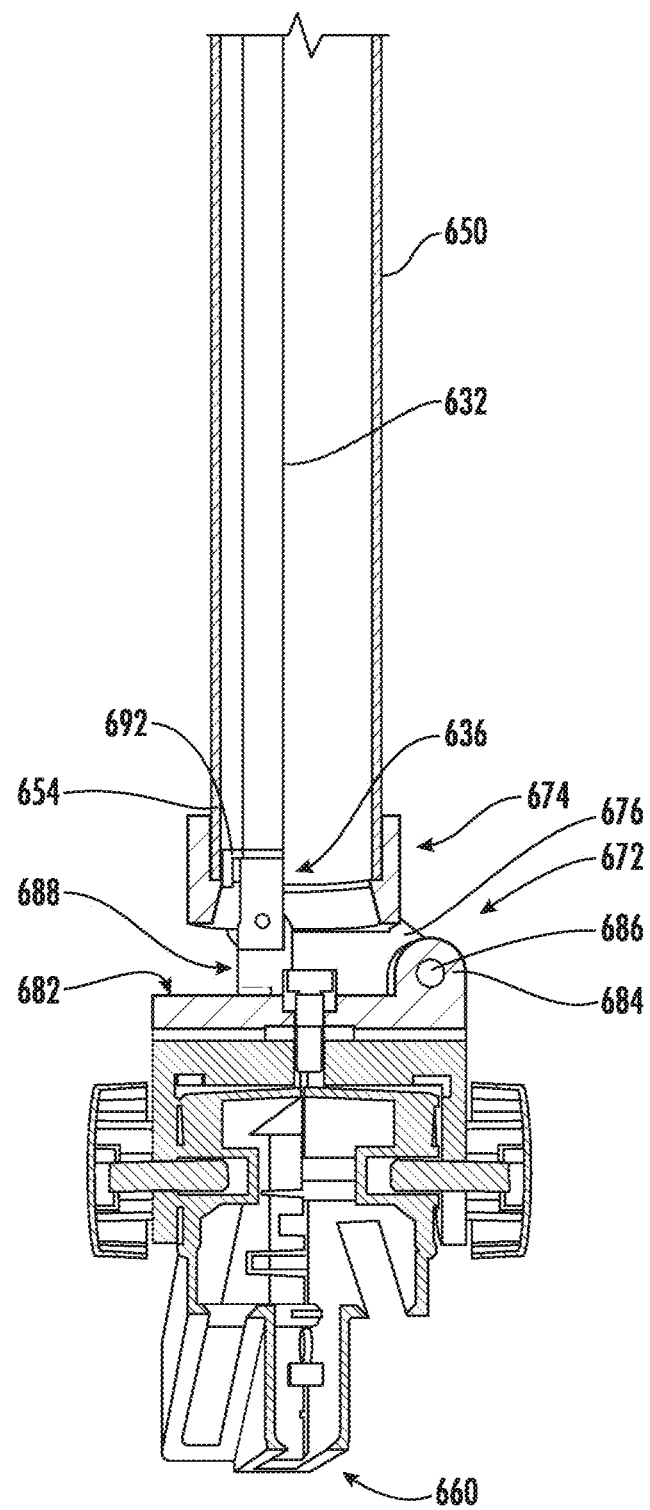
Figure 4D:
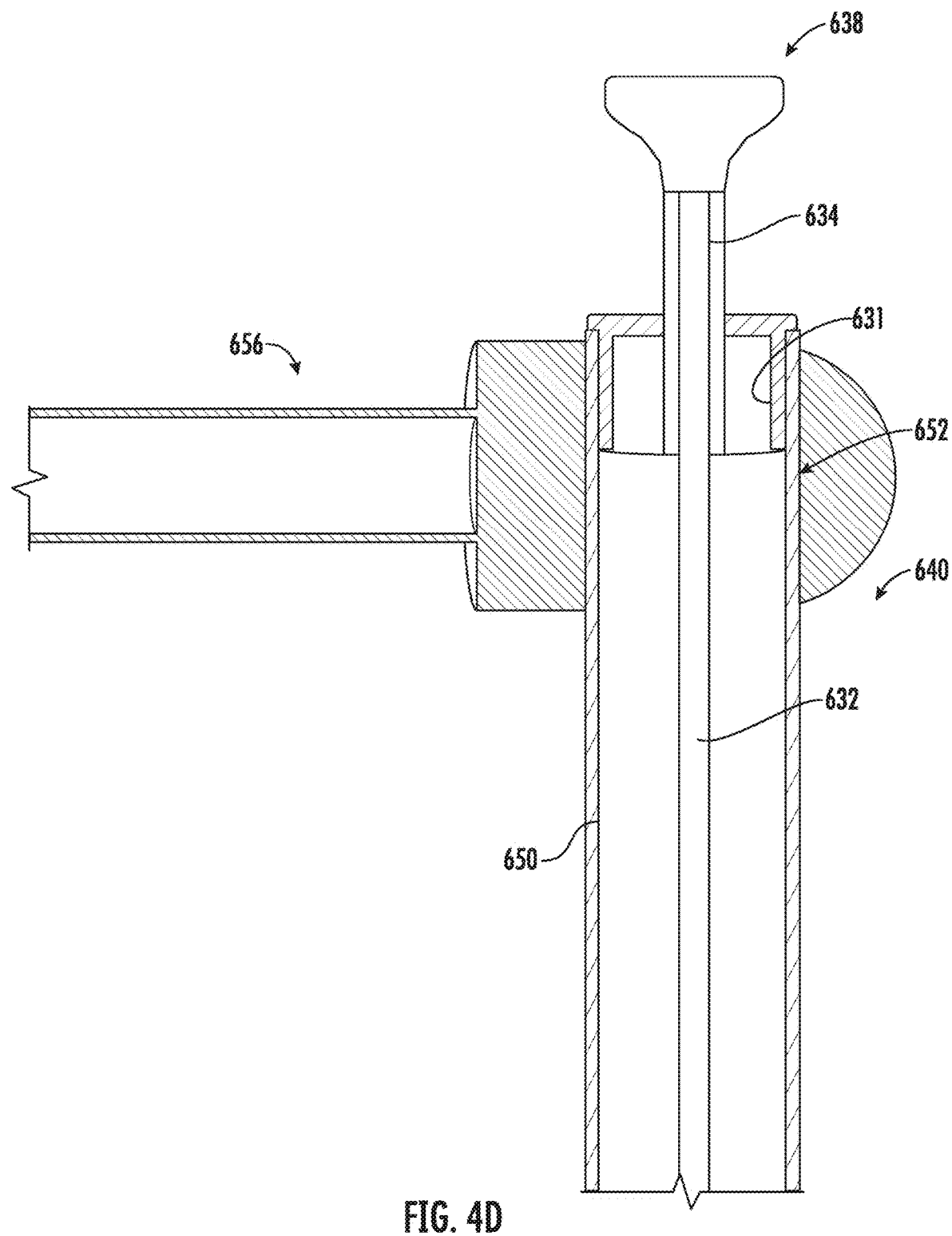

FIGS. 4A through 4D illustrate an alternate embodiment sonar assembly 640, according to some example embodiments. The sonar assembly 640 may include a shaft 650, a transducer assembly 660, and an attachment device 670. The sonar assembly 640 may be fixed to either a side, bow, or stern of a watercraft via an attachment device 670, which may be, for example, an adjustable clamp, or to the shaft of the trolling motor assembly. As shown, the shaft 650 may be hollow and include a steering handle 656 non-rotatably fixed to a top end 634 of the shaft 650. An adjustable bracket 672 may be non-rotatably fixed to a bottom end 654 of the shaft 650, the adjustable bracket 672 being utilized to secure the transducer assembly 660 to the shaft 650. Referring specifically to FIGS. 4C and 4D, a sonar tilt assembly may include an elongated rigid rod 632 that is axially movable within the hollow shaft 650. The rod 632 is secured at its top end within the shaft 650 by a bushing 631 that is disposed within a top end 652 of the shaft 650, and at its bottom end by a bracket 692. As shown, rod 632 is axially movable with respect to the shaft 650. A control knob 638 may be fixed to the top end 634 of the rod 632, and may be used to move the rod 632 axially within the shaft 650. A bottom end portion 636 of the rod 632 may extend axially-outwardly from the bottom end 654 of the shaft 650.

Referring now to FIGS. 4B and 4C, the adjustable bracket 672 may include an end cap 672 that is non-rotatably fixed to the bottom end 654 of the shaft 650 and include two downwardly-depending projections that define a yoke 676. The bracket 672 may also include a base plate 682 that includes a mounting flange 684 extending outwardly from a back side of the base plate 682 such that the distal edge of the mounting flange 684 is received between the projections of the yoke 676. An axle 686 extends through both the projections defining the yoke 676 and the distal end of the mounting flange 684, thereby securing the base plate 682 to the end cap 674. The base plate 682 of the bracket 672 is pivotable with respect to the end cap 674 about the longitudinal center axis of the axle 686.

As shown in FIGS. 4B and 4C in the illustrated embodiment, a pair of projections extend outwardly from the rear face of the base plate 682, thereby forming a yoke 688. The bottom end portion 636 of the rod 632 is secured between the distal ends of the projections of the yoke 688 so that moving the rod 632 axially with respect to the shaft 650 causes the base plate 682 of the adjustable bracket 672 to pivot about the longitudinal center axis of the axle 686. As best seen in FIGS. 4C and 4D, downward movement of the control knob 638 causes the bottom end portion 636 to extend downwardly from the bottom end 654 of the shaft 650, thereby causing the base plate 682 of the adjustable bracket 672 to rotate about the longitudinal center axis of the axle 686 in a counter-clockwise direction and the transmission direction of the transducer assembly 160 to move upwardly toward the surface 101 of the water, as shown in FIG. 9B. Conversely, upward movement of the control knob 638 causes the bottom end portion 636 to move upwardly toward the bottom end 654 of the shaft 650, thereby causing the base plate 682 of the adjustable bracket 672 to rotate about the longitudinal center axis of the axle 686 in the clockwise direction and, therefore, the direction of transmission of the transducer assembly to move farther away to the surface 101 of the water, as shown in FIG. 9A.

As shown in FIG. 5, according to some example embodiments, to improve the ease of maneuvering, and the available orientation of the transducer assembly 160, rather than the steering handle 156 shown in the embodiments of FIGS. 2A through 2D, 3A through 3D, and 4A through 4D, the sonar assembly may include a directional actuator 180 that is configured to actuate to cause rotation of the shaft 150 (FIGS. 2A through 2D), and accordingly the rotation of the transducer assembly 160, about axis 190 (e.g., a shaft axis) to change the direction in a horizontal plane in which the transducer assembly 160 is directed with respect to the watercraft. To cause rotation and control of the orientation of the transducer assembly 160, the directional actuator 180 may directly rotate the shaft 150 on a series of cam shafts, or gears may be employed to cause the rotation. The directional actuator 180 may be controlled via signals transmitted to the directional actuator 180 from a sonar control device via a wireless connection 280. In other example embodiments, a wired connection 419 (FIG. 7A) may be utilized to convey signals to the directional actuator 180.

Additionally, according to some sample embodiments similar to the embodiment shown in FIGS. 2A through 2D, rather than the discussed control knob 138, the directional actuator 180 may also be configured to actuate to cause rotation of the rod 132 and, therefore, rotation of the transducer assembly 160 about the longitudinal center axis 187 of the axle 186 to change the direction in a vertical plane in which the transducer assembly 160 is directed with respect to the watercraft. To cause rotation and control of the orientation of the transducer assembly 160, the directional actuator 180 may directly rotate the rod 132 on a series of cam shafts, or gears may be employed to cause the rotation. The directional actuator 180 may be controlled via signals transmitted to the directional actuator 180 from a sonar-controlled device via a wireless connection 280. In other example embodiments, a wired connection 419 (FIGS. 7A-7B) may be utilized to convey signals to the directional actuator 180.

As well, according to some sample embodiments, rather than the control knobs 238 and 638 of the embodiments shown in FIGS. 3A through 3D, and 4A through 4D, the directional actuator 180 that is configured to actuate to cause rotation of the shafts 250 and 650 may also be configured to actuate to cause axial motion of the cable 232 and the rod 632, respectively, and accordingly rotation of the transducer assemblies about the axles 286 and 686 to change the direction in a vertical plane in which the transducer assemblies are directed with respect to the watercraft. To cause rotation and control of the orientation of the transducer assemblies, the directional actuator 180 may directly move the cable 232 and the rod 632 on a series of cam shafts, or gears may be employed to cause the linear motion. The directional actuator 180 may be controlled via signals transmitted to the directional actuator 180 from a sonar-control device via either a wireless or a wired connection.

FIG. 6 shows an example implementation of a user input assembly of a sonar control device according to various example embodiments in the form of a foot pedal assembly 400. The foot pedal assembly 400 may be one example of a user input assembly that includes a deflection sensor and a lever. The foot pedal assembly 400 may be in operable communication with the sonar assembly 140, via, for example, the processor as described with respect to FIG. 19. The foot pedal assembly 400 may be allow a user to maneuver the transducer assembly 160 while positioned away from the sonar assembly 140. In this regard, a user may maneuver the sonar assembly 140 while looking at a marine electronics device presenting the sonar image of the underwater environment, rather than manually positioning the sonar assembly 140 and returning to the display device.

The foot pedal assembly 400 includes a lever 410 in the form of a foot pedal 431 that can pivot about an axis, both fore-and-aft (as indicated by the arrows), and side-to-side, in response to movement of, for example, a user's foot. The foot pedal assembly 400 further includes a support base 420 and a deflection sensor 440. The deflection sensor 440 may measure the deflection of the foot pedal 410 and provide an indication of the deflection to, for example, a processor. A corresponding directional input signal having an indication of either a horizontal direction of turn, based on side-to-side deflection, or a vertical direction of turn, based on fore-and-aft deflection, may be ultimately provided to an actuator via a wireless connection. In some embodiments, the user input assembly may determine whether to provide instructions for horizontal direction of turn or vertical direction of turn based on fore-and-aft deflection—e.g., depending on if a horizontal mode or a vertical mode is selected, such as via a button on the user input assembly.

According to some example embodiments, the measured deflection of the foot pedal 410 may be an indication of the desired vertical change in the transmission direction of the sonar assembly 140. In this regard, a user may cause the foot pedal 410 to rotate or deflect by an angle in the fore-and-aft direction (according to example coordinate system 432) and the angle may be measured (e.g., in degrees) by the deflection sensor 440. According to some example embodiments, rotation of the foot pedal 410 in the counterclockwise direction (such that the left side, or heel side, of the foot pedal is tilted down), as shown in FIG. 9B, may cause the orientation of the transducer assembly 160 of the sonar assembly 140 rotate vertically upwardly toward the surface 101 of the water, while rotation of the foot pedal 410 in the clockwise direction (such that the right side, or toe side, of the foot pedal is tilted down), as shown in FIG. 9A, may cause the orientation of the transducer assembly 160 to rotate vertically downwardly away from the surface 101 of the water.

As well, according to some example embodiments, the measured deflection of the foot pedal 410 may be an indication of the desired horizontal change in the transmission direction of the sonar assembly 140. In this regard, a user may cause the foot pedal 410 to rotate or deflect by an angle (according to example coordinate system 432) and the angle may be measured (e.g., in degrees) by the deflection sensor 440. According to some example embodiments, rotation of the left edge of the foot pedal 410 toward the base 420 (such that the left edge of the foot pedal is tilted down), may cause the orientation of the transducer assembly 160 of the sonar assembly 140 rotate toward the port side of the watercraft 100, while rotation of the right edge of the foot pedal 410 toward the base 420 (such that the right edge of the foot pedal is tilted down), may cause the orientation of the transducer assembly 160 to rotate toward the starboard side of the watercraft 100.

FIG. 8A provides another example user input assembly that includes a deflection sensor and a lever. A fob 500 may be an embodiment of a user input assembly that includes, for example, the processor 1370 described with respect to FIG. 19. The fob 500 may include a horizontal rocker button 510 that pivots about an axis. The horizontal rocker button 510 may form the lever of some example embodiments and a deflection of the horizontal rocker button 510 may be measured by a deflection sensor (not shown). With respect to operation, a user may depress one side of the horizontal rocker button 510 to cause the horizontal rocker button 510 to deflect from its origin position. The angle of deflection may be measured by the deflection sensor and communicated to the processor as a direction of turn of the transducer assembly 160, such as to either port or starboard, within a horizontal plane with respect to the watercraft.

Additionally, the fob 500 may also include other controls, such as, a vertical rocker button 512 that may be operated to control the vertical orientation of the transducer assembly 160. Similarly to the horizontal rocker button 510, a user may depress either the front end or the rear end of the rocker button 512 to cause the vertical rocker button 512 to deflect from its original position. The angle of deflection may be measured by the deflection sensor and communicated to the processor as a direction of turn of the transducer assembly 160, such as either toward the surface or away from the surface of the water, within a vertical plane with respect to the watercraft.

Referring again to FIG. 6, in some embodiments, the foot pedal 410 may include pressure sensors 450 and 451 (e.g., in combination with or as an alternative to the deflection sensor 440) to determine a vertical orientation of the transducer assembly 160. Accordingly, as a user depresses the foot pedal 410 onto one of the pressure sensors 450 and 451, a pressure (or force) may be applied to the sensor and the sensor may measure the pressure. If pressure is applied to sensor 450, then a direction of turn in a first direction, such as toward the surface of the water, may be determined, and if pressure is applied to sensor 451, then a direction of turn in the opposite direction, such as away from the surface of the water, may be determined.

Additionally, another pair of pressure sensors (not shown) may be positioned one each on the left side edge and the right side edge of the base 420 of the foot pedal 410 (e.g., either in combination with or as an alternative to the deflection sensor 440) to determine a horizontal direction of turn of the transducer assembly 160. Accordingly, as a user depresses the foot pedal 410 onto either the left side edge pressure sensor or the right side edge pressure sensor, a pressure (or force) may be applied to the sensor and the sensor may measure the pressure. If pressure is applied to the left side edge sensor, then a direction of turn to port may be determined, and if pressure is applied to the right side edge sensor, then a direction of turn to starboard may be determined.

In a similar manner, rather than utilizing a horizontal rocker button 510 and vertical rocker button 512, as shown in FIG. 8A, pressure sensors may be used in conjunction with a fob 550 to detect pressure in order to determine a direction of turn. Along these lines, the fob 550 shown in FIG. 8B may use pressure sensors to determine a direction of turn in both the horizontal and vertical directions with respect to the watercraft. In this regard, fob 550 may be similar to fob 500, with the exception that rather than rocker buttons, two separate push buttons may be included for each omitted rocker button. For example, push buttons 560 and 570 may replace the horizontal rocker button 510, and push buttons 580 and 590 may replace vertical rocker button 512. One or more pressure sensors may be operably coupled to each push buttons to detect pressure being applied to the buttons. Again, pressure may be detected and used to determine a direction of turn, in both the horizontal and the vertical directions with respect to the watercraft, by the processor 1370 (FIG. 19).

Referring again to FIG. 6, in some embodiments, switches may be used rather than pressure sensors. In such an example embodiment, as a user depresses the foot pedal 410 onto a switch, the switch may transition to an active state, thereby causing the transducer assembly 160 to rotate in the corresponding direction. In a similar manner, switches may be used in conjunction with the fob 500 and detection of an active state on either end of the horizontal rocker switch 510 may be used to determine a direction of turn. Switches may also be used with fob 550, such as through buttons 560, 570, 580, and 590 in a similar manner.

While the above example embodiments utilize sensors that measure angle of deflection and pressure, some embodiments of the present invention contemplate other types of sensors for correlating to a desired direction of turn (e.g., capacitive, among others). Further, while the above example embodiments utilize a foot pedal or fob, some embodiments of the present invention contemplate use with other systems/structures, such as a touch screen, a remote marine electronics device, a graphic user interface on a remote device (e.g., a cell phone, table, laptop, etc.). An example graphic user interface for a remote device such as a cell phone or a laptop could be similar in appearance to the fobs 500 and 550 described above.

In contrast to the foot pedal control, where an understanding of the possible movements and buttons on the foot pedal may be needed to understand the current orientation of the transducer assembly, and how to maneuver the foot pedal to transition the motion to the desired orientation of the transducer assembly, and the fob control, where the orientation of the transducer assembly may be unknown at the time of use, an alternative embodiment of the present invention is directed to an orientation device capable of automation, where the orientation of the handle member, gives a visual indication of the orientation of the transducer assembly. Further movement of the handle member causes corresponding movement, with respect to the surface of the water, and about the shaft, of the transducer assembly.

FIGS. 12 through 14E illustrate a sonar system 700 having an orientation device 740 for use with a transducer assembly 760, according to some example embodiments. Similar to the sonar systems 140, 640, the orientation device 740 may include a shaft 750 (shown as transparent) defining a top end 750a and a bottom end 750b, wherein the shaft 750 defines a shaft axis 790 extending between the top end 750a and the bottom end 750b. In some embodiments, the shaft 750 may surround a rod 732 having a top rod end 732a and a bottom rod end 732b extending within the shaft 750. In some embodiments, the orientation device 740 may include an attachment device 770 affixed to the shaft 750. The orientation device 740 may be fixed, for example, to either a side, bow, or stern of a watercraft via the attachment device 770, which may be, for example, an adjustable clamp. As shown, in some embodiments, the shaft 750 may be hollow to retain the rod 732 and other features of the orientation device 740 and allow the rod 732 to rotate therein, such as about the axis 790.

In some embodiments, the orientation device 740 may include a first attachment 721 and a second attachment 711 pivotably connected at the top end 750a of the shaft 750 and the bottom end 750b of the shaft 750, respectively. Each of the first attachment 721 and the second attachment 711 may include similar components and may engage in reciprocal motion. In some embodiments, the second attachment 711 may secure the transducer assembly 760 to the shaft 750, while the first attachment 721 may secure steering means or means of moving the second attachment 711.

FIG. 13A illustrates a perspective view of the first attachment 721 of the orientation device. In some embodiments, the first attachment 721 defines a first member 722 (FIG. 14B) pivotably connected at the top end 750a of the shaft 750. The first member 722 may be pivotably attached about a first axis $A_1$. In some embodiments, the first axis $A_1$ is perpendicular to the shaft axis 790. In some embodiments, the first member 722 defines a head 722a and a neck 722b. In some embodiments, the first member 722 extends from the first axis $A_1$ along a first rotation axis $A_{R1}$. In some embodiments, the first member 722 may be operatively connected to a top end of the rod 732a.

In some embodiments, the first attachment 721 further comprises a handle member 726 (FIG. 14B) defining a handle member body 726a. The handle member body 726a may envelop the neck 722b of the first member 722 about the first rotation axis $A_{R1}$. In some embodiments, the handle member body 726a may define a first guide path 727 extending along the handle member body 726a. In some embodiments, a first arm 725 may secure the handle member body 726a to the first member 722 by extending through the first guide path 727 of the handle member body 726a. In some embodiments, the first arm 725 may be pivotable about a first dowel axis $A_{D1}$ (e.g., up and down in FIG. 14B), wherein the first dowel axis $A_{D1}$ is perpendicular to the first rotation axis $A_{R1}$. In some embodiments, rotation of the handle member body 726a about the first rotation axis $A_{R1}$ may cause the first arm 725 to pivot about the first dowel axis $A_{D1}$ due to interaction between the first guide path 727 and the first arm 725.

FIG. 13B illustrates a perspective view of the second attachment 711 of the orientation device 740. In some embodiments, the components of the second attachment 711 are substantially reciprocal to the components of the first attachment 721.

In some embodiments, the second attachment 711 comprises a second member 712 pivotably connected to the bottom end 750b of the shaft 750. The second member 712 may be pivotably attached about a second axis $A_2$. In some embodiments, the second axis $A_2$ is parallel to the first axis $A_1$, and perpendicular to the shaft axis 790. In some embodiments, the second member 712 defines a head 712a and a neck 712b. In some embodiments, the second member 712 extends from the second axis $A_2$ along a second rotation axis $A_{R2}$. In some embodiments, the second member 712 may be operatively connected to a bottom end of the rod 732b In some embodiments, the second attachment 711 further comprises a bracket member 716 defining a mounting portion 716b and a bracket member body 716a. The bracket member body 716a may envelop the neck 712b of the second member 712 about the second rotation axis $A_{R2}$. In some embodiments, the bracket member body 716a may define a second guide path 717 extending along the bracket member body 716a. In some embodiments, a second arm 715 may secure the bracket member body 716a to the second member 712 by extending through the second guide path 717 of the bracket member body 716a. In some embodiments, the second arm 715 may be pivotable about a second dowel axis $A_{D2}$, wherein the second dowel axis $A_{D2}$ is perpendicular to the second rotation axis $A_{R2}$. In some embodiments, the pivoting action of the second arm 715 about the second dowel axis $A_{D2}$ causes rotation of the bracket member 716 about the second rotation axis $A_{R2}$—as the second arm 715 causes the bracket member body 716a to rotate by interaction between the second guide path 717 and the second arm 715.

In some embodiments, the orientation device 740 comprises a first connector 758 extending between the first member 722 and the second member 712. In some embodiments, the first connector 758 rotationally connects the first member 722 and the second member 712. In illustrated embodiment, the first connector 758 is secured about the head 722a of the first member 722 and the head 712a of the second member 712. Accordingly, the first connector 758 is configured such that rotation of the handle member 726 and the first member 722 about the first axis $A_1$ causes corresponding rotation of the second member 712 and the bracket member 716 about the second axis $A_2$. In some embodiments, the first connector 758 may be a flexible connector including a strap, a band, a wire, or similar structure.

In some embodiments, at least one second connector 759 is secured between the first arm 725 and the second arm 715. In some embodiments, the second connector 759 is configured such that movement of the first arm 725 is connected to movement of the second arm 715 such that pivoting the first arm 725 about the first dowel axis $A_{D1}$ causes corresponding pivoting of the second arm 715 about the second dowel axis $A_{D2}$. In some embodiments, the corresponding movement of the first arm 725 and the second arm 715 causes rotation of the bracket member 716 about the second rotation axis $A_{R2}$. In some embodiments, the at least one second connector is two second connectors, wherein each of the two second connectors 759 are attached to corresponding sides of the first arm 725 and the second arm 715 such that the first arm 725 and the second arm 715 are parallel. In some embodiments, the second connector 759 may be a strap, a band, a wire, or similar structure.

In some embodiments, a transducer assembly 760 may be secured to the mounting portion 716b of the bracket member 716. In some embodiments, the transducer assembly 760 may comprise a plurality of sonar transducer arrays 764. In some embodiments, each of the plurality of sonar transducer arrays 764 may be aligned in differing directions.

In some embodiments, the transducer assembly 760 may be aimed and oriented through rotation of the handle member 726. In this regard, rotation of the handle member 726 about the first axis $A_1$ may cause corresponding rotation of the transducer assembly 760 about the second axis $A_2$. Likewise, rotation of the handle member 726 about the first rotation axis $A_{R1}$ may cause corresponding rotation of the transducer assembly 760 about the second rotation axis $A_{R2}$.

FIGS. 14A-E illustrate different perspective views orientations of the first attachment 721. As described above, the second attachment 711 comprises similar reciprocal components.

FIG. 14A illustrates a side view of the first attachment 721. In the illustrated embodiment, the first member 722 is secured to the rod 732 between a set of prongs 741. The set of prongs 741 may be formed as flat surfaces extending from the rod 732. In some embodiments, the prongs 741 may be wider than a width of the first member 722. In some embodiments, the head 722a of the first member 722 may be positioned between the prongs 741. The head 722a may be circular in shape and may be connected to the prongs 741 via a pin 737 disposed in a pin opening 722c in the radial center of the head 722a (see e.g., FIG. 14B). In some embodiments, the head 722a may define a radius, wherein the radius is smaller than the length of the prongs 741 to enable pivoting of the head 722a, as described herein. In this regard, the head 722a may be able to pivot about the first axis $A_1$ between the prongs 741.

In some embodiments, the rod 732 may define alignment protrusions 739 disposed on each prong 741. In some embodiments, the alignment protrusions 739 may be configured to retain and align the second connector (see e.g., 759a, 759b of FIG. 14E).

FIG. 14B illustrates a side view of the first attachment 721. The head 722a of the first member 722 includes a pin opening 722c, which aligns with a prong opening 741a to receive a pin to allow the head 722a to pivot about the first axis $A_1$.

In some embodiments, the first arm 725 is configured to pivot about the first dowel axis $A_{D1}$. The first dowel axis $A_{D1}$ may extend perpendicular to the first axis $A_1$. In some embodiments, the first arm 725 is configured to pivot about the first dowel axis $A_{D1}$, as the first arm 725 pivots, the first arm 725 engages with the handle member body 726a via the first guide path 727. The first arm 725 defining a single degree of freedom about the first dowel axis $A_{D1}$ causes the handle member body 726a to rotate about the first rotation axis $A_{R1}$, as shown in FIGS. 16A-F.

The handle member body 726a is configured to rotate about the first rotation axis $A_{R1}$, as illustrated in FIG. 14C. The first rotation axis $A_{R1}$ extends from the head 722a through the neck 722b of the first member 722. The first rotation axis $A_{R1}$ is perpendicular to the first dowel axis $A_{D1}$, and the first axis $A_1$.

In some embodiments, the first arm 725 may be positioned within an opening in the neck 722b of the first member 722 and secured with a first dowel 723. The first dowel 723 may be sized such that the first dowel 723 secures the first arm 725 within the neck 722b while being sized such that the first dowel 723 does not contact the handle member body 726a of the handle member 726. In some embodiments, the first dowel 723 may contact the handle member body 726a of the handle member 726, however, the first dowel 723 does not hinder the rotation of the handle member 726.

FIG. 14D illustrates the axes of motion of the first attachment 721. The shaft axis 790, the first axis $A_1$ and the first rotation axis $A_{R1}$ intersect, whereas the first dowel axis $A_{D1}$ only intersects with the first rotation axis $A_{R1}$. Thus, the movement of the first arm 725 about the first dowel axis $A_{D1}$ is independent of the movement of the first member 722 about the first axis $A_1$. However, the combination of the rotation about the first rotation axis $A_{R1}$ from the handle member 726, which causes the first arm 725 to pivot about the first dowel axis $A_{D1}$, and the first member 722 pivoting about the first axis $A_1$ allows the first attachment 721 to maneuver such as to aim the second attachment 712 into any direction, yielding universal orientation.

The first attachment 721 and the second attachment 711 are reciprocally moveable, that any movement of the first attachment 721 is translated to the second attachment 712. In some embodiments, the reciprocal movement is generated via the first connector 758 and the second connector 759.

As illustrated in FIG. 14E, the first arm 725 may define a first side 725a and a second side 725b. The first side 725a may include a first connection point 724a, and the second side 725b may include a second connection point 724b. Each of the first connection point 724a and the second connection point 724b may be formed as a through hole configured to receive a nut or other securing means to retain the corresponding second connector 759a, 759b. In some embodiments, the first connection point 724a and the second connection point 724b may be formed as snaps within the arm 725 wherein the snap is configured to retain the corresponding second connector 759a, 759b such that the second connector 759a, 759b is not moveable through the first arm 725.

In some embodiments, the second connector 759 may be configured as a first flexible link 759a and a second flexible link 759b. In some embodiments, the first side 725a of the first arm 725 may retain the first flexible link 759a, and the second side 725b of the first arm 725 may retain the second flexible link 759b. In some embodiments, the first flexible link 759a may extend from the first side 725a of the first arm 725 to a first side of a second arm 715 of the second attachment 711 (see e.g., FIG. 12). The first flexible link 759a may extend from the first side 725a through the alignment protrusions 739, wherein the alignment protrusion 739 retain the orientation of the first flexible link 759a to prevent twisting. In some embodiments, the alignment protrusions 739 may further provide tension to the first flexible link 759a.

Similarly, in some embodiments, the second flexible link 759b may extend from the second side 725b of the first arm 725 to a second side of the second arm 715 of the second attachment 711 (see e.g., FIG. 12). The second flexible link 759b may extend from the second side 725a through the alignment protrusions 739, wherein the alignment protrusion 739 retain the orientation of the second flexible link 759b to prevent twisting. In some embodiments, the alignment protrusions 739 may further provide tension to the second flexible link 759b.

In some embodiments, the rod 732 may include a pair of alignment protrusions 739 secured to each side of the prongs 741 on the top side 732 and on the bottom side 732b of the rod 732. In some embodiments, the pairs of alignment protrusions 739 may provide tension to the second connectors 759 and may prevent the first flexible link 759a and second flexible link 759b from twisting, thereby extending the life the orientation device 740.

In some embodiments, the first flexible link 759a and the second flexible link 759b may be positioned such that a width of the second connector 759 extends in the direction of the first axis $A_1$. Thus, the width of the second connector 759 is secured within the first arm 725. In some embodiments, the alignment protrusions 739 define a height, wherein the height is greater than the width of the second connector 759. In some embodiments, the width of the second connector 759 is greater than the height of the alignment protrusions 739.

The first connector 758 may extend between the first member 722 and the second member 712. The first connector 758 may be formed as a loop wherein a portion of the loop engages with the first member 722 and a portion engages with the second member 712. In some embodiments, the first connector 758 includes an opening for each of the first member 722 and the second member 712. In some embodiments, the first connector 758 is formed from a resilient material such that a first opening for receiving the first member 722 and a second opening for receiving the second member 712 will not lead to tears, or breakage adjacent the openings.

In some embodiments, the first connector 758 may have at least one tooth, and the first member 722 may have at least one groove configured to receive the at least one tooth. In some embodiments, the at least one tooth may be a plurality of teeth, and the second member 712 may have at least one groove, configured to receive one of the plurality of teeth to retain the first connector about the first member 722 and the second member 712. In other embodiments, the first connector 758 may have one or more holes and the first member 722 (and second member 712) may have one or more teeth that fit therein to enable the reciprocal rotation between the first member 722 and the second member 712 (e.g., through the first connector 758).

In some embodiments, the first connector 758 may be two distinct first connectors attached about the head 722a on either side of the neck 722b of the first member 722. In such embodiments, the rod 732 may include a slack retention gear formed as a latch to sinch excess slack within the first connector 758 as the first member 722 and second member 712 pivot about the first axis $A_1$ and second axis $A_2$ respectively.

In some embodiments, the first connector 758 extends along one face of the rod 732 while the first flexible link 759a and the second flexible link 759b extend along opposite sides of the rod 732.

As described above, the first attachment 721 and the second attachment 711 engage in reciprocal movement. FIGS. 15A-C illustrate the components of aiming an orientation device 840 used to pivot a first member 822 and a second member 812 about the first axis $A_1$ and a second axis $A_2$ respectively. FIG. 15A illustrates the first member 822 and the second member 812 of the orientation device 840 in a first position. The first member 822 defines a first rotation axis $A_{R1}$ and the second member 812 defines a second rotation axis $A_{R2}$. In the first position, each of the first rotation axis $A_{R1}$ and the second rotation axis $A_{R2}$ intersect the shaft axis 890 at a first intersection angle $\alpha_1$, wherein the first intersection angle $\alpha_1$ is equivalent as formed between the first rotation axis $A_{R1}$ and the shaft axis 890 and the second rotation axis $A_{R2}$ and the shaft axis 890.

A first connector 858 may extend between the first member 822 and the second member 812. In some embodiments, the first connector 858 is secured between the first member 822 and the second member 812 such that the rotation of the first member 822 causes corresponding rotation of the second member 812. For example, as an intersection angle $\alpha$ increases due to counterclockwise rotation of the first member 812, the first connector 858 and the second member 812 correspondingly rotate counterclockwise to maintain the same intersection angle $\alpha$ between the second member 812 and the shaft 850.

In some embodiments, the first connector 858 has a constant length. In some embodiments, a portion of the first connector 858 is in contact with the first member 822 and the second member 812. As the first member 822 and second member 812 rotate, the portion of the first connector 858 in contact with the first member 822 and second member 812 changes. In some embodiments, the portion of the first connector 858 in contact with the first member 822 and the second member 812 is constant but shifts between sides of the first rotation axis $A_{R1}$ and the second rotation axis $A_{R2}$ of the first member 822 and the second member 812. For example, as illustrated in FIG. 15A, as relative to a head portion of the first member 822 and a head portion of the second member 812, there may be a greater portion of the first connector 858 on the side of the first rotation axis $A_{R1}$ and second rotation axis $A_{R2}$ opposite the intersection angle $\alpha_1$, while there may be a smaller portion of the first connector 858 on the side of the first rotation axis $A_{R1}$ and second rotation axis $A_{R2}$ defining the intersection angle $\alpha_1$.

FIG. 15B illustrates the components of the orientation device 840 in a second position. The first member 822 is rotated counterclockwise such that the first rotation axis $A_{R1}$ is in line with the shaft axis 890. Since the first member 822 and the second member 812 exhibit reciprocal movements, the second member 812 is similarly shifted such that the second rotation axis $A_{R2}$ is in line with the shaft axis 890. Each of the first member 822 and the second member 812 define an equal second intersection angle $\alpha_2$.

In the second position, the first member 822 and the second member 812 may be aligned with the shaft 850. Thus, the first connector 858 may be evenly distributed related to the head portion on either side of the first rotation axis $A_{R1}$ and the second rotation axis $A_{R2}$.

FIG. 15C illustrates the components of the orientation device 840 in a third position. The first member 822 and second member 812 are rotated counterclockwise from the second position shown in FIG. 15B. In the third position, the first rotation axis $A_{R1}$ and the second rotation axis $A_{R2}$ form a third intersection angle $\alpha_3$ with the shaft axis 890. In the third position, a greater portion of the first connector 858 is on the side of the first rotation axis $A_{R1}$ and second rotation axis $A_{R2}$ defining the third intersection angle $\alpha_3$, while a smaller portion of the first connector 858 is on the side of the first rotation axis $A_{R1}$ and second rotation axis $A_{R2}$ opposite the third intersection angle $\alpha_3$. Thus, as illustrated in FIGS. 15A-C, the first connector 858 is configured to drive the reciprocal movement of the first member 822 and the second member 812 pivoting about the shaft axis 890.

Similar to the reciprocal movement between the first member and the second member driven by the first connector, the handle member and the bracket member exhibit reciprocal rotation about the first rotation axis $A_{R1}$ and the second rotation axis $A_{R2}$ respectively, driven in part by the second connector.

FIGS. 16A-F illustrate the reciprocal rotation of the handle member driving the pivoting action of the first arm, which drives the corresponding pivoting of the second arm (through the second connector) and corresponding rotation of the bracket member.

FIG. 16A illustrates a first attachment 921 in a first position, and FIG. 16B illustrates a second attachment 911 in the first position. The first attachment 921 defines a first member 922 and a handle member 926. The handle member 926 may define a handle member body 926a and a handle 926b extending therefrom. The handle member body 926a of the handle member 926 may be secured to the first member 922 by a first arm 925. In some embodiments, the second connector may define a first flexible link 959a and a second flexible link 959b. The first arm 925 may secure the first flexible link 959a on one side of the first arm and the second flexible link 959b on the opposing side of the first arm. In some embodiments, the first arm 925 may be configured to pivot about a first dowel axis $A_{D1}$.

Similarly, FIG. 16B illustrates a second attachment 911 in a first position. The second attachment 911 defines a second member 912, and a bracket member 916. The bracket member 916 may define a bracket member body 916a and a mounting portion 916b extending therefrom. The bracket member body 916a of the bracket member 916 may be secured to the second member 912 by a second arm 915. The second arm 915 may secure the first flexible link 959a on one side and may secure the second flexible link 959b on the opposing side. The second arm 915 may be configured to pivot about a second axis $A_{D2}$.

FIGS. 16A-B illustrate corresponding attachments 921, 911 of an orientation device for use, for example, with a sonar system. Each of the first attachment 921 and the second attachment 911 are attached to a first side 950a of a shaft and a second side 950b of a shaft, respectively. Rotation of the handle member 926 about a first rotation axis $A_{R1}$ causes the handle member body 926a including a first guide path 927 to rotate. The rotation of the handle member body 926a causes the first arm 925 to pivot about the first dowel axis $A_{D1}$ due to interaction between the first guide path 927 and the first arm 925. Similarly, pivoting of the second arm 915 induces rotation of the bracket member 916 about a second rotation axis $A_{R2}$ due to the interaction between a second guide path 917 formed in the bracket member body 916a and the second arm 915. Thus, the first arm 925 and the second arm 915 remain in a parallel orientation as the handle member 926 and the bracket member 916 rotate.

In some embodiments, the second connector 959 secured between the first arm 925 and the second arm 915 drives the reciprocal pivoting movement of the second arm 915 as the first arm 925 is pivoted. The first flexible link 959a and the second flexible link 959b of the second connector 959 may be the same length. In some embodiments, the first flexible link 959a may be attached between a first side of the first arm 925a and a first side of the second arm 915a, while the second flexible link 959b may be attached between a second side of the first arm 925b and a second side of the second arm 915b. Thus, as the first arm 925 pivots one of the first flexible link 959a or the second flexible link 959b will pull the second arm 915 so as to maintain a parallel configuration with the first arm 925.

As illustrated in FIG. 16A-B, the first attachment 921 and the second attachment 911 are in a first position. In the first position the first side of the first arm 925a and the first side of the second arm 915a are tilted towards the handle member 926, while the second side of the first arm 925b and the second side of the second arm 915b are tilted towards the bracket member 916.

Figure 16C:
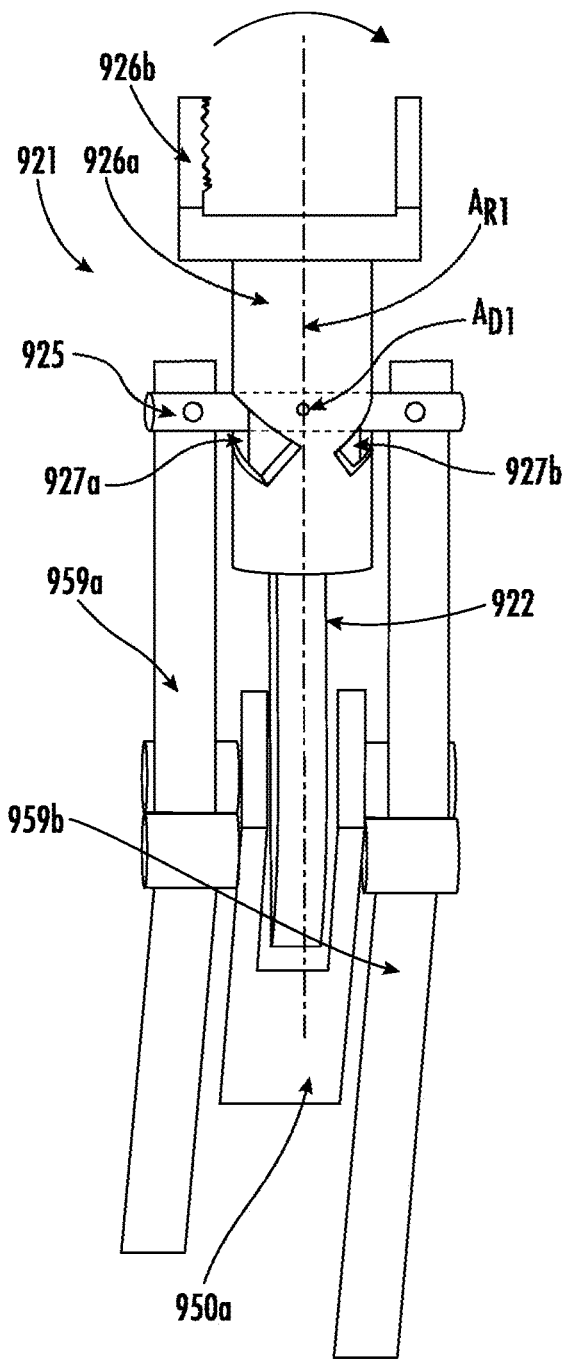
Figure 16D:
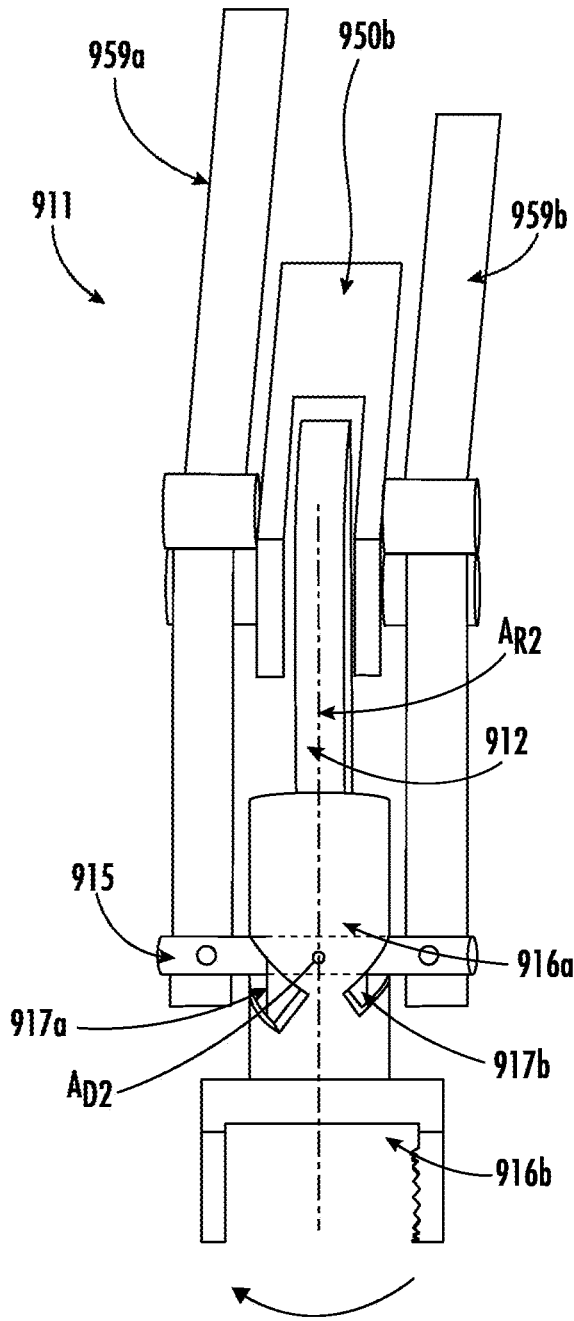

FIGS. 16C-D illustrate various components of the orientation device in a second position. The handle member 926 and the bracket member 916 have rotated clockwise from the first position shown in FIGS. 16A-B respectively.

The transition from the first position shown in FIGS. 16A-B, to the second position shown in FIGS. 16C-D comprises a series of cascading movements within the orientation device. First, the handle 926b of the handle member 926 is rotated clockwise about the first rotation axis $A_{R1}$ (e.g., via a user's hand, a motor, etc.), causing the handle member body 926a to rotate. Thus, the first guide path 927 rotates with the handle member body 926a—inducing the first arm 925 to pivot about the first dowel axis $A_{D1}$ within the first guide path 927. Due to the counterclockwise pivot of the first arm 925, the second flexible link 959b induces movement of the second arm 915. Thus, the second arm 915 pivots counterclockwise about the second dowel axis $A_{D2}$, within the second guide path 917—inducing the bracket member body 916a to rotate about the second rotation axis $A_{R2}$. As the bracket member body 916a rotates, the mounting portion 916b correspondingly rotates to the second position as illustrated in FIGS. 16C-D.

In some embodiments, the first guide path 927 may comprise a first path 927a and a second path 927b within the handle member body 926a. In some embodiments, the first path 927a and the second path 927b may be symmetrical about the first rotation axis $A_{R1}$ thus, allowing the first arm 925 to pivot about the first dowel axis $A_{D1}$. In some embodiments, the first path 927a and the second path 927b may extend partially diagonally about the handle member body 926a.

Similarly, in some embodiments, the second guide path 917 may comprise a third path 917a and a fourth path 917b within the bracket member body 916a. In some embodiments, the third path 917a and the fourth path 917b may be symmetrical about the second rotation axis $A_{R2}$, thus allowing the second arm 915 to pivot about the second dowel axis $A_{D2}$. In some embodiments, the third path 917a and the fourth path 917b may extend partially diagonally about the bracket member body 916a.

Figure 16E:
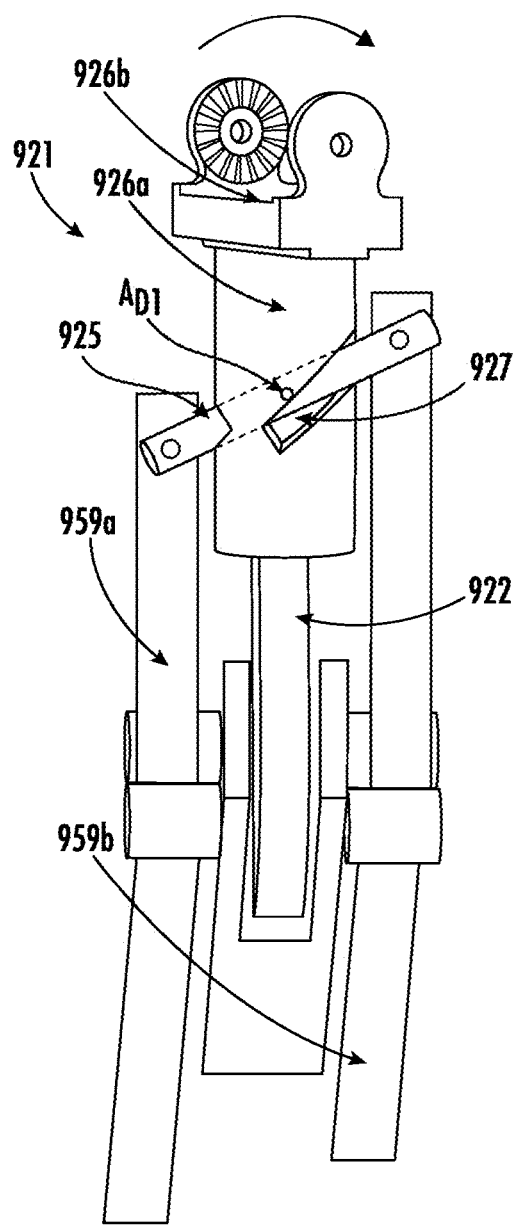
Figure 16F:
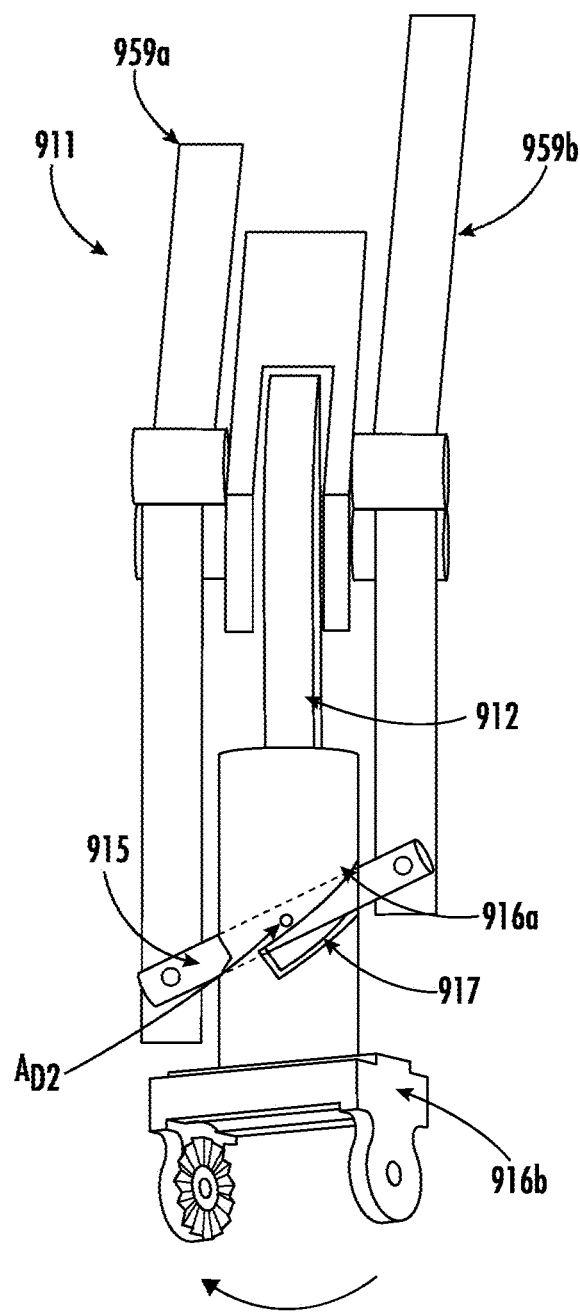

FIGS. 16E-F illustrate the first attachment 921 and the second attachment 911 in a third position, wherein the handle member 926 and the bracket member 916 have rotated further clockwise from the first position and the second positions illustrated in FIGS. 16A-D. As discussed above with reference to the movement between the first position and the second position, the handle member 926 and the bracket member 916 follow the same motion between the second position and the third position, and back between the third position, second position and the first position. Thus, the rotational movement created by the handle member 926 about the first rotation axis $A_{R1}$, and the rotational movement created by the first member 922 about the first axis $A_1$ allow for the bracket member to be aimed and oriented in any direction.

The orientation device may be used in conjunction with a transducer assembly, such as to direct (aim and orient) generation of sonar images of an underwater environment. With reference to FIG. 17A, in some embodiments, the sonar system 1100 may be attached to the side of a watercraft 100 and in electrical communication with a marine electronics device 160 on the watercraft 100.

In some embodiments, the transducer assembly 1160 can be configured to be oriented differently to provide different sonar image options. In an example embodiment, as shown in FIGS. 11A-B and 17A-C, a user may selectively configure the sonar system 1110 to be oriented vertically (such as downwardly from the watercraft with longest dimension of the emitting face 1161 disposed in a vertical plane) and provide a desirable sonar image that is wide (e.g., widest) in the vertical plane. This orientation is often referred to as being in the "forward", "down", or "normal" mode (e.g., depending on the facing direction and/or nomenclature). In this regard, the more narrow sonar beam coverage (e.g., ~20°) may be used to see a more focused view in the port-to-starboard direction with respect to the watercraft, as shown in FIG. 11A. Conversely, in this orientation, the extended beam coverage (e.g., ~135°) is now provided in the fore-and-aft direction with respect to the watercraft 100, as shown in FIG. 11B.

In another embodiment, as shown in FIGS. 10A-B and 18A-C, the transducer assembly 1160 may be configured to be oriented horizontally, e.g., the longest dimension of the emitting face extends horizontally (such as pointing forward, to the side, or the back from the watercraft), and provide a desirable sonar image that is wide (e.g., widest) in the horizontal plane. This orientation may be referred to as being in "scout" mode. In this regard, the extended sonar beam coverage (e.g., ~135°) may be used to see a wider view in the port-to-starboard direction with respect to the watercraft 100 (or off to one side of the watercraft or both sides if two transducer assemblies are used). Note, in the illustrated embodiment, broader coverage in the port-to-starboard direction results in more narrow coverage (e.g., ~20°) in the fore-and-aft direction (FIG. 10B).

FIGS. 17A-C illustrate the sonar system 1100 in a first orientation, wherein a transducer assembly 1160 is secured within a mounting portion 1116b of a bracket member. The bracket member and a handle member exhibit the same orientation, and a first member and a second member exhibit the same orientation. In some embodiments, the transducer assembly 1160 may include multiple sonar transducers 1164, such as illustrated in FIG. 17B.

In some embodiments, as illustrated in FIG. 17B, the transducer assembly 1160 may have one or more sonar transducer arrays 1164a, 1164b, 1164c to provide continuous sonar coverage 1190 in the forward and downward directions relative to the watercraft 100. In this regard, the three arrays work together to provide corresponding ranges of angles 1191, 1192, 1193, 1194, 1195, 1196. In the illustrated embodiments, the lengths of each of the emitting faces of the three arrays extends in the fore-to-aft direction of the watercraft.

As indicated herein, the frequency of the sonar return beams can be varied to provide a sonar return beam 1186 that can sweep (e.g., along arrow C) within the sonar beam coverage 1190 (e.g., across the three arrays)—to capture sonar return signals along the sonar beam coverage.

FIG. 17B illustrates the arrangement of the three example arrays used for the transducer assembly 1160. In the illustrated example, the steered sonar return beam 1186 is shown, which is the sonar return beam that corresponds to an angle within a range of angles 1193 of one of the arrays 1164a—where the angle is substantially straight downward from the watercraft. In this regard, the determined sonar return beam 1186 comes from the third array 1164*a*. In some embodiments, the selected sonar return beam 1186 may be predetermined and utilized whenever a user wants to see the high-definition 1D sonar image, or it may be determined based on the orientation of the transducer assembly 1160 (e.g., using an orientation sensor and determining the orientation of the transducer assembly with respect to a reference, such as the top surface of the body of water—e.g., waterline). Though one sonar return beam 1186 is shown, more than one could be selected (e.g., three sonar return beams, such as one on each side of the shown sonar return beam 1186).

In some embodiments, the sonar system 1110 may be used to form a live (or substantially real-time) two-dimensional (2D) sonar image (e.g., time/distance from the transducer assembly and angle). For example, FIG. 17C illustrates a live 2D sonar image 1180 presented on a display of a marine electronics device 1159. The live 2D sonar image 1180 is formed as slices of sonar return data corresponding to each sonar return beam 1186 extending within that sonar beam coverage (e.g., along arrow C). In this regard, the live 2D sonar image 1180 can be updated in substantially real-time all at once as they were all received at substantially the same time (e.g., by selecting different frequencies to form all the different sonar return beams that are used to present sonar return data into the image at the proper angle). The reference distance from the transducer assembly 1160 (e.g., which correlates to depth in the substantially straight down direction) is shown at 1189. An icon detailing the direction in which the transducer assembly is facing relative to the watercraft is shown at 1187.

FIGS. 18A-C illustrate the sonar system 1100 wherein the transducer assembly 1160 is in scout mode. Similar to the embodiment described in relation to FIG. 17B the transducer assembly 1160 may have one or more sonar transducer arrays 1164*a*, 1164*b*, 1164*c* to provide continuous sonar coverage 1190 in the forward and downward directions relative to the watercraft 100. In this regard, the three arrays work together to provide corresponding ranges of angles 1191, 1192, 1193, 1194, 1195, 1196. In the illustrated embodiments, the lengths of each of the emitting faces of the three arrays extends in the fore-to-aft direction of the watercraft.

As indicated herein, the frequency of the sonar return beams can be varied to provide a sonar return beam 1187 that can sweep (e.g., along arrow A) within the sonar beam coverage 1190 (e.g., across the three arrays)—to capture sonar return signals along the sonar beam coverage.

In some embodiments, the transducer assembly 1160 may be used to form a live (or substantially real-time) two-dimensional (2D) sonar image (e.g., time/distance from the transducer assembly and angle) with a horizontal view. For example, FIG. 18C illustrates a live 2D sonar image 1127 presented on a display of a marine electronics device 1159. The live 2D sonar image 1127 is formed as slices of sonar return data corresponding to each sonar return beam extending within that sonar beam coverage extending from the transducer assembly location 1128. In this regard, the live 2D sonar image 1127 can be updated in substantially real-time all at once as they were all received at substantially the same time (e.g., by selecting different frequencies to form all the different sonar return beams that are used to present sonar return data into the image at the proper angle). A detailed bottom surface is shown at 1129.

In some embodiments, the transducer assembly 1160 can be used to form additional different-type sonar images, such as sonar images that anglers are used to seeing. For example, while the arrays provide complex transducer element arrangements that can be used to create the live 2D sonar image, some embodiments contemplate using the same transducer assembly to provide "waterfall" based (or one-dimensional (1D)) sonar images that build-up over time. Notably, the sonar system may select one or more of the sonar return beams to form the sonar images—all without other additional transducer elements.

Referring again to FIGS. 15A-C and 16A-F, to change the orientation of the transducer assembly 1160 from the normal down/down mode (FIGS. 17A-C) to scout mode (FIGS. 18A-C) or to any orientation, a user may rotate the handle member to the desired orientation.

In some embodiments, the handle member may comprise a locking mechanism to ensure the handle member stays in the desired orientation. For example, a pin, a clamp, or other locking mechanism may attach to the handle member to maintain the handle member in the desired orientation (e.g., to prevent inadvertent orientation changes, such as due to waves, watercraft movement, etc.). The locking mechanism may be attached to the mount used to attach the orientation device to the watercraft.

In some embodiments, the handle member may be controlled automatically, such as via a motor. In this regard, the motor may be configured to rotate the handle member to position the transducer assembly in the desired orientation. The motor may respond to user input provided remotely, such as via a foot pedal or through the marine electronic device. The motor may, additionally or alternatively, be configured to respond to control from a remote device performing one or more automated routines (e.g., tracking a target, performing a sweep, switching between user selected modes (e.g., between scout and forward modes), etc.).

Example System Architecture

FIG. 19 shows a block diagram of a sonar system 1300 (e.g., for use with the orientation device) in communication with a transducer assembly 1360. As described herein, it is contemplated that while certain components and functionalities of components may be shown and described as being part of the sonar system 1300 or the transducer assembly 1360, according to some example embodiments, some components (e.g., functionalities of the processors 1370, or the like) may be included in the others of the transducer assembly 1360, the marine electronics device 1359, or one or more remote devices 1313.

As depicted in FIG. 19, the sonar system 1300 may include a marine electronics device 1359. In some embodiments, the marine electronics device 1359 may include a processor 1370, a memory 1374, a position sensor 1384, a display 1376, a user interface 1378, a sonar signal processor 1372, a communication interface 1380, and various other sensors 1382.

In some embodiments, the processor 1370 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 1370 as described herein. In this regard, the processor 1370 may be configured to analyze electrical signals communicated thereto in the form of a directional input signal and instruct a motor 1380 to rotate the handle member 1326 to rotate the transducer assembly 1360 in accordance with a received rotational signal.

The memory 1374 may be configured to store instructions, computer program code, trolling motor steering codes and instructions, sonar steering codes and instructions marine data, such as sonar data, chart data, location/position data, and other data in a non-transitory computer readable medium for use, such as by the processor 1370.

The communication interface 1380 may be configured to enable connection to external systems. In this manner, the processor 1370 may retrieve stored data from remote external servers 1390 via the communication interface 1380, in addition to or as an alternative to the memory 1374.

The processor 1370 of the sonar system 1300 may be in communication with and control the motor 1380. The motor 1380 may be an electronically controlled mechanical actuator (i.e., an electro-mechanical actuator) configured to actuate at various rates (or speeds) in response to respective signals or instructions. The motor 1380 may be configured to rotate the handle member 1326 and, therefore, the transducer assembly 1360, regardless of the means for doing so, in response to electrical signals. Similarly, the motor 1380 may be configured to pivot the first member (FIGS. 14A-B) about the first axis (FIG. 14A), regardless of the means for doing so in response to electrical signals. To do so, the motor 1380 may employ a solenoid, a motor, or the like configured to convert an electrical signal into a mechanical movement. The range of motion to turn the transducer assembly 1360 about the second rotational axis (FIGS. 16A-F) may be 360 degrees, 180 degrees, 90 degrees, 37 degrees, or the like, in a horizontal plane and up to 360 degrees, 270 degrees, 180 degrees, 90 degrees, etc., in a vertical plane.

The sonar system 1300 may include an orientation device 1340 that may be fixed to a watercraft, such that a bracket member 1316 of the orientation device 1340 is disposed underwater. In this regard, the transducer assembly 1360 may be in a housing attached to the bracket member 1316 and configured to gather sonar data from the underwater environment surrounding the watercraft. Accordingly, the processor 1370 (such as through execution of computer program code) or other processor may be configured to receive sonar data from the transducer assembly 1360 and process the sonar data to generate an image based on the gathered sonar data. In some example embodiments, the sonar system 1300 may be used to determine depth and bottom topography, detect fish, locate wreckage, etc. Sonar beams, from one or more transducer arrays 1364*a*, 1364*b*, 1364*c* may be transmitted into the underwater environment and echoes can be detected to obtain information about the environment. In this regard, the sonar signals can reflect off objects in the underwater environment (e.g., fish, structures, sea floor bottom, etc.) and return to the transducer assembly 1360, which converts the sonar returns into sonar data that can be used to produce an image of the underwater environment. According to some example embodiments, the sonar system 1300 may include or be in communication with a display to render the image for display to a user.

In some embodiments, the sonar system 1300 may be configured to track an object as additional sonar data is captured and processed by the sonar signal processor 1372. In some such embodiments, the sonar system 1300 may be configured to present an indicator on the display 1376 of the marine electronics device 1359 in corresponding positions as the object moves (and/or the watercraft moves with respect to the object)—thereby "tracking" the object within a sonar image.

In some embodiments, the processor 1370 may present a user with a recommend maneuver instruction of the handle member 1326 (e.g., turn left 5 degrees). For example, the processor 1370 may determine the object is no longer in the field presented by the transducer assembly 1360 field, and to recapture the object the transducer assembly 1360 and therefore, the handle member 1326 must me moved by a certain amount. In some embodiments, the processor 1370 may present the user, via the user interface 1378, instructions to rotate the handle member 1326, for example 10 degrees clockwise, and 5 degrees vertical.

In some embodiments, the processor 1370 may be configured to send electrical signals to a motor 1380 attached to the handle member 1326 to maneuver the handle member 1326 to cause rotation of the transducer assembly 1360. In some embodiments, a foot pedal 1394 may be in electrical communication with the handle member 1394, such that user input to the foot pedal 1294 causes rotation of the handle member 1326 and thus, the transducer assembly 1360.

In some embodiments, the sonar system 1300 may be configured to rotate the transducer assembly 1360 to a desired orientation corresponding to a mode, or a position between commonly used modes. As discussed above, the transducer assembly 1360 may define differing orientations depending on the sonar image desired, and the operation of the transducer assembly 1360. In some embodiments, the sonar system 1300 may have one or more modes stored in the memory 1374 of the marine electronics device 1359 such that when executed, the processor 1370 may cause the motor 1380 to rotate the handle member 1326 such that the transducer assembly 1360 is in the desired orientation. In some embodiments, the mode may be scout mode, forward mode, and down mode.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A sonar system for a watercraft, the sonar system comprising:
   a shaft defining top end and a bottom end, wherein the shaft defines a shaft axis extending between the top end and the bottom end;
   a first member pivotably connected at the top end of the shaft and pivotable about a first axis, wherein the first axis is perpendicular to the shaft axis, wherein the first member extends along a first rotation axis;

a handle member defining a handle member body extending along the first rotation axis and defining a first guide path;

a first arm attached to the first member and extending through the first guide path, wherein first arm is pivotable about a first dowel axis, wherein the first dowel axis is perpendicular to the first rotation axis, wherein rotation of the handle member about the first rotation axis causes pivoting of the first arm about the first dowel axis due to interaction between the first guide path and the first arm;

a second member pivotably connected at the bottom end of the shaft and pivotable about a second axis, wherein the second axis is parallel to the first axis, wherein the second member extends along a second rotation axis;

a bracket member defining a mounting portion and a bracket member body, wherein the bracket member body extends along the second rotation axis and defines a second guide path;

a second arm attached to the second member and extending through the second guide path, wherein second arm is pivotable about a second dowel axis, wherein the second dowel axis is perpendicular to the second rotation axis, wherein, as the second arm pivots about the second dowel axis, the second arm travels along the second guide path to cause the bracket member to rotate about the second rotation axis;

a first connector secured between the first member and the second member, wherein the first connector rotationally connects the first member to the second member such that rotation of the handle member and the first member about the first axis causes corresponding rotation of the second member and the bracket member about the second axis;

a second connector secured between the first arm and the second arm, wherein the second connector connects movement of the first arm to movement of the second arm such that pivoting of the first arm about the first dowel axis causes corresponding pivoting of the second arm about the second dowel axis such that the bracket member rotates about the second rotation axis; and a transducer assembly secured to the mounting portion of the bracket member, wherein rotation of the handle member about the first axis causes corresponding rotation of the transducer assembly about the second axis, wherein rotation of the handle member about the first rotation axis causes corresponding rotation of the transducer assembly about the second rotation axis.

2. The sonar system of claim 1, wherein the first guide path comprises a first path and a second path, wherein the first path and the second path are symmetrical about the first rotation axis; and wherein the second guide path comprises a third path and a fourth path, wherein the third path and the fourth path are symmetrical about the second rotation axis.

3. The sonar system of claim 2, wherein the first path and the second path extend diagonally along the handle member body; and wherein the third path and the fourth path extend diagonally along the bracket member body.

4. The sonar system of claim 1, wherein the second connector comprises:

a first flexible link extending between a first side of the first arm and a first side of the second arm; and a second flexible link extending between a second side of the first arm and a second side of the second arm.

5. The sonar system of claim 1, further comprising a rod having a top end and a bottom end, the rod being disposed within the shaft, the top end of the rod being operatively connected to the first member, and the bottom end of the rod being operatively connected to the second member.

6. The sonar system of claim 1, wherein the first connector is a flexible connector defining a first opening and a second opening, wherein the first opening is configured to receive the first member, and the second opening is configured to receive the second member.

7. The sonar system of claim 1, further comprising a marine electronics device associated with the watercraft, wherein the marine electronics device is in data communication with the transducer assembly, and wherein the marine electronics device comprises:

a display;

a processor; and a computer program code, wherein the computer program code, when executed, causes the processor to:

receive sonar return data from the transducer assembly; and generate a sonar image of an underwater environment relative to the watercraft using the sonar return data.

8. The sonar system of claim 7, wherein the computer program code is further configured to, when executed, cause the processor to:

present, on the display, indication of rotation instructions, wherein the rotation instructions indicate rotation of the handle member so as to steer the transducer assembly.

9. The sonar system of claim 7, further comprising a motor in data communication with the marine electronics device, wherein the motor is connected to the handle member and configured to rotate the handle member so as to steer the transducer assembly.

10. The sonar system of claim 9, wherein the computer program code is further configured to, when executed, cause the processor to:

store a plurality of preset modes corresponding to orientations of the transducer assembly;

receive a selection mode of one of the preset modes of the transducer assembly; and cause the motor to steer the transducer assembly to an orientation according to the selection mode.

11. The sonar system of claim 10, wherein the plurality of preset modes include scout mode, forward mode, and down mode.

12. The sonar system of claim 9, wherein the computer program code is further configured to, when executed, cause the processor to:

receive selection of an indication of an object within a sonar image;

track the object as additional sonar data is captured by the transducer assembly;

cause rotation of the handle member, via the motor, to rotate the transducer assembly so as to follow the object within an updated sonar image.

13. A sonar system for a watercraft, the sonar system comprising:

a shaft defining top end and a bottom end, wherein the shaft defines a shaft axis extending between the top end and the bottom end;

a first member pivotably connected at the top end of the shaft and pivotable about a first axis, wherein the first axis is perpendicular to the shaft axis, wherein the first member extends along a first rotation axis;

a handle member defining a handle member body extending along the first rotation axis and defining a first guide path;

a first arm attached to the first member and extending through the first guide path, wherein first arm is pivotable about a first dowel axis, wherein the first dowel axis is perpendicular to the first rotation axis, wherein rotation of the handle member about the first rotation axis causes pivoting of the first arm about the first dowel axis due to interaction between the first guide path and the first arm;

a second member pivotably connected at the bottom end of the shaft and pivotable about a second axis, wherein the second axis is parallel to the first axis, wherein the second member extends along a second rotation axis;

a bracket member defining a mounting portion and a bracket member body, wherein the bracket member body extends along the second rotation axis and defines a second guide path;

a second arm attached to the second member and extending through the second guide path, wherein second arm is pivotable about a second dowel axis, wherein the second dowel axis is perpendicular to the second rotation axis, wherein, as the second arm pivots about the second dowel axis, the second arm travels along the second guide path to cause the bracket member to rotate about the second rotation axis;

a first connector secured between the first member and the second member, wherein the first connector rotationally connects the first member to the second member such that rotation of the handle member and the first member about the first axis causes corresponding rotation of the second member and the bracket member about the second axis;

a second connector secured between the first arm and the second arm, wherein the second connector connects movement of the first arm to movement of the second arm such that pivoting of the first arm about the first dowel axis causes corresponding pivoting of the second arm about the second dowel axis such that the bracket member rotates about the second rotation axis;

a transducer assembly secured to the mounting portion of the bracket member, wherein rotation of the handle member about the first axis causes corresponding rotation of the transducer assembly about the second axis, wherein rotation of the handle member about the first rotation axis causes corresponding rotation of the transducer assembly about the second rotation axis;

a motor configured to maneuver the handle member in response to an electrical signal;

a user input assembly, wherein the user input assembly is configured to detect user activity related to controlling the direction of the handle member;

a processor; and a memory having a computer program code stored thereon, configured to when executed, cause the processor to:

determine a desired orientation of transducer assembly based on the user activity detected by the user input assembly;

generate an electrical signal indicating a desired maneuver for the handle member; and direct the motor, via the electrical signal, to maneuver the handle member to the desired orientation of the transducer assembly.

14. The sonar system of claim 13, wherein the first guide path comprises a first path and a second path, wherein the first path and the second path are symmetrical about the first rotation axis; and wherein the second guide path comprises a third path and a fourth, wherein the third path and the fourth path are symmetrical about the second rotation axis.

15. The sonar system of claim 14, wherein the first path and the second path extend diagonally along the handle member body; and wherein the third path and the fourth path extend diagonally along the bracket member body.

16. The sonar system of claim 13, wherein the second connector comprises:

a first flexible link extending between a first side of the first arm and a first side of the second arm; and a second flexible link extending between a second side of the first arm and a second side of the second arm.

17. The sonar system of claim 13, further comprising a rod having a top end and a bottom end, the rod being disposed within the shaft, the top end of the rod being operatively connected to the first member, and the bottom end of the rod being operatively connected to the second member.

18. The sonar system of claim 13, wherein the first connector is a flexible connector defining a first opening and a second opening, wherein the first opening is configured to receive the first member, and the second opening is configured to receive the second member.

* * * * *